US009945456B2

(12) United States Patent
Nichols et al.

(10) Patent No.: US 9,945,456 B2
(45) Date of Patent: Apr. 17, 2018

(54) CONTINUOUSLY VARIABLE TRANSMISSION

(71) Applicant: Fallbrook Intellectual Property Company LLC, Cedar Park, TX (US)

(72) Inventors: Jon M Nichols, Georgetown, TX (US); Daniel J Dawe, Austin, TX (US); Oronde J Armstrong, Austin, TX (US)

(73) Assignee: Fallbrook Intellectual Property Company LLC, Cedar Park, TX (US)

( * ) Notice: Subject to any disclaimer, the term of this patent is extended or adjusted under 35 U.S.C. 154(b) by 697 days.

(21) Appl. No.: 14/170,924

(22) Filed: Feb. 3, 2014

(65) Prior Publication Data
US 2014/0148303 A1 May 29, 2014

Related U.S. Application Data

(62) Division of application No. 12/664,035, filed as application No. PCT/US2008/066200 on Jun. 6, 2008, now Pat. No. 8,641,577.

(60) Provisional application No. 60/943,273, filed on Jun. 11, 2007.

(51) Int. Cl.
*F16H 15/28* (2006.01)
*F16H 15/50* (2006.01)
*F16H 15/52* (2006.01)

(52) U.S. Cl.
CPC .......... *F16H 15/503* (2013.01); *F16H 15/52* (2013.01); *F16H 15/28* (2013.01); *Y10T 29/49464* (2015.01)

(58) Field of Classification Search
CPC .................. F16H 15/28; F16H 15/52

USPC ....................................... 475/189; 476/36–36
See application file for complete search history.

(56) References Cited

U.S. PATENT DOCUMENTS

| 719,595 A | 2/1903 | Huss |
| 1,121,210 A | 12/1914 | Techel |
| 1,175,677 A | 3/1916 | Barnes |
| 1,207,985 A | 12/1916 | Null et al. |

(Continued)

FOREIGN PATENT DOCUMENTS

| CH | 118064 | 12/1926 |
| CN | 1054340 | 9/1991 |

(Continued)

OTHER PUBLICATIONS

Office Action dated Aug. 23, 2006 from Japanese Patent Application No. 2000-517205.

(Continued)

*Primary Examiner* — William C Joyce
(74) *Attorney, Agent, or Firm* — Knobbe Martens Olson & Bear LLP

(57) ABSTRACT

A continuously variable transmissions (CVT), includes a main axle adapted to receive a shift rod that cooperates with a shift rod nut to actuate a ratio change in a CVT. An axial force generating mechanism can include a torsion spring, a traction ring adapted to receive the torsion spring, and a roller cage retainer configured to cooperate with the traction ring to house the torsion spring. Power roller-leg assemblies can be used to facilitate shifting the ratio of a CVT. A hub shell and a hub cover are adapted to house components of a CVT and, in some embodiments, to cooperate with other components of the CVT to support operation and/or functionality of the CVT. Among other things, shift control interfaces and braking features for a CVT are disclosed.

14 Claims, 41 Drawing Sheets

(56) References Cited

U.S. PATENT DOCUMENTS

| | | |
|---|---|---|
| 1,380,006 A | 5/1921 | Nielson |
| 1,390,971 A | 9/1921 | Samain |
| 1,558,222 A | 10/1925 | Beetow |
| 1,629,902 A | 5/1927 | Arter et al. |
| 1,686,446 A | 10/1928 | Gilman |
| 1,774,254 A | 8/1930 | Daukus |
| 1,793,571 A | 2/1931 | Vaughn |
| 1,847,027 A | 2/1932 | Thomsen et al. |
| 1,850,189 A | 3/1932 | Weiss |
| 1,858,696 A | 5/1932 | Weiss |
| 1,865,102 A | 6/1932 | Hayes |
| 1,903,228 A | 3/1933 | Thomson |
| 1,978,439 A | 10/1934 | Sharpe |
| 2,030,203 A | 2/1936 | Gove et al. |
| 2,060,884 A | 11/1936 | Madle |
| 2,086,491 A | 7/1937 | Dodge |
| 2,100,629 A | 11/1937 | Chilton |
| 2,109,845 A | 3/1938 | Madle |
| 2,112,763 A | 3/1938 | Cloudsley |
| 2,131,158 A | 9/1938 | Almen et al. |
| 2,134,225 A | 10/1938 | Christiansen |
| 2,152,796 A | 4/1939 | Erban |
| 2,196,064 A | 4/1940 | Erban |
| 2,209,254 A | 7/1940 | Ahnger |
| 2,259,933 A | 10/1941 | Holloway |
| 2,269,434 A | 1/1942 | Brooks |
| 2,325,502 A | 7/1943 | Auguste |
| RE22,761 E | 5/1946 | Wemp |
| 2,461,258 A | 2/1949 | Brooks |
| 2,469,653 A | 5/1949 | Kopp |
| 2,480,968 A | 9/1949 | Ronai |
| 2,490,525 A | 12/1949 | Koller |
| 2,553,465 A | 5/1951 | Monge |
| 2,586,725 A | 2/1952 | Henry |
| 2,596,538 A | 5/1952 | Dicke |
| 2,597,849 A | 5/1952 | Alfredeen |
| 2,675,713 A | 4/1954 | Acker |
| 2,696,888 A | 12/1954 | Chillson et al. |
| 2,716,357 A | 8/1955 | Rennerfelt |
| 2,730,904 A | 1/1956 | Rennerfelt |
| 2,748,614 A | 6/1956 | Weisel |
| 2,868,038 A | 1/1959 | Billeter |
| 2,873,911 A | 2/1959 | Perrine |
| 2,874,592 A | 2/1959 | Oehrli |
| 2,883,883 A | 4/1959 | Chillson |
| 2,891,213 A | 6/1959 | Kern |
| 2,901,924 A | 9/1959 | Banker |
| 2,913,932 A | 11/1959 | Oehrli |
| 2,931,234 A | 4/1960 | Hayward |
| 2,931,235 A | 4/1960 | Hayward |
| 2,949,800 A | 8/1960 | Neuschotz |
| 2,959,063 A | 11/1960 | Perry |
| 2,959,070 A | 11/1960 | Flinn |
| 2,959,972 A | 11/1960 | Madson |
| 2,964,959 A | 12/1960 | Beck |
| 3,008,061 A | 11/1961 | Mims et al. |
| 3,035,460 A | 5/1962 | Guichard |
| 3,048,056 A | 8/1962 | Wolfram |
| 3,051,020 A | 8/1962 | Hartupee |
| 3,086,704 A | 4/1963 | Hurtt |
| 3,087,348 A | 4/1963 | Kraus |
| 3,154,957 A | 11/1964 | Kashihara |
| 3,163,050 A | 12/1964 | Kraus |
| 3,176,542 A | 4/1965 | Monch |
| 3,184,983 A | 5/1965 | Kraus |
| 3,204,476 A | 9/1965 | Rouverol |
| 3,209,606 A | 10/1965 | Yamamoto |
| 3,211,364 A | 10/1965 | Wentling et al. |
| 3,216,283 A | 11/1965 | General |
| 3,229,538 A | 1/1966 | Schlottler |
| 3,237,468 A | 3/1966 | Schlottler |
| 3,246,531 A | 4/1966 | Kashihara |
| 3,248,960 A | 5/1966 | Schottler |
| 3,273,468 A | 9/1966 | Allen |
| 3,280,646 A | 10/1966 | Lemieux |
| 3,283,614 A | 11/1966 | Hewko |
| 3,292,443 A | 12/1966 | Felix |
| 3,340,895 A | 9/1967 | Osgood, Jr. et al. |
| 3,407,687 A | 10/1968 | Hayashi |
| 3,430,504 A | 3/1969 | Dickenbrock |
| 3,439,563 A | 4/1969 | Petty |
| 3,440,895 A | 4/1969 | Fellows |
| 3,464,281 A | 9/1969 | Hiroshi et al. |
| 3,477,315 A | 11/1969 | Macks |
| 3,487,726 A | 1/1970 | Burnett |
| 3,487,727 A | 1/1970 | Gustafsson |
| 3,574,289 A | 4/1971 | Scheiter et al. |
| 3,661,404 A | 5/1972 | Bossaer |
| 3,695,120 A | 10/1972 | Titt |
| 3,707,888 A | 1/1973 | Schottler |
| 3,727,473 A | 4/1973 | Bayer |
| 3,727,474 A | 4/1973 | Fullerton |
| 3,736,803 A | 6/1973 | Horowitz et al. |
| 3,768,715 A | 10/1973 | Tout |
| 3,800,607 A | 4/1974 | Zurcher |
| 3,802,284 A | 4/1974 | Sharpe et al. |
| 3,810,398 A | 5/1974 | Kraus |
| 3,820,416 A | 6/1974 | Kraus |
| 3,866,985 A | 2/1975 | Whitehurst |
| 3,891,235 A | 6/1975 | Shelly |
| 3,934,493 A | 1/1976 | Hillyer |
| 3,954,282 A | 5/1976 | Hege |
| 3,987,681 A | 10/1976 | Keithley et al. |
| 3,996,807 A | 12/1976 | Adams |
| 4,098,146 A | 7/1978 | McLarty |
| 4,103,514 A | 8/1978 | Grosse-Entrup |
| 4,159,653 A | 7/1979 | Koivunen |
| 4,169,609 A | 10/1979 | Zampedro |
| 4,177,683 A | 12/1979 | Moses |
| 4,227,712 A | 10/1980 | Dick |
| 4,314,485 A | 2/1982 | Adams |
| 4,345,486 A | 8/1982 | Olesen |
| 4,369,667 A | 1/1983 | Kemper |
| 4,382,186 A | 5/1983 | Cronin |
| 4,391,156 A | 7/1983 | Tibbals |
| 4,459,873 A | 7/1984 | Black |
| 4,464,952 A | 8/1984 | Stubbs |
| 4,468,984 A | 9/1984 | Castelli et al. |
| 4,494,524 A | 1/1985 | Wagner |
| 4,496,051 A | 1/1985 | Ortner |
| 4,501,172 A | 2/1985 | Kraus |
| 4,526,255 A | 7/1985 | Hennessey et al. |
| 4,546,673 A | 10/1985 | Shigematsu et al. |
| 4,560,369 A | 12/1985 | Hattori |
| 4,567,781 A | 2/1986 | Russ |
| 4,569,670 A | 2/1986 | McIntosh |
| 4,574,649 A | 3/1986 | Seol |
| 4,585,429 A | 4/1986 | Marier |
| 4,617,838 A | 10/1986 | Anderson |
| 4,630,839 A | 12/1986 | Seol |
| 4,631,469 A | 12/1986 | Tsuboi et al. |
| 4,651,082 A | 3/1987 | Kaneyuki |
| 4,663,990 A | 5/1987 | Itoh et al. |
| 4,700,581 A | 10/1987 | Tibbals, Jr. |
| 4,713,976 A | 12/1987 | Wilkes |
| 4,717,368 A | 1/1988 | Yamaguchi et al. |
| 4,735,430 A | 4/1988 | Tomkinson |
| 4,738,164 A | 4/1988 | Kaneyuki |
| 4,744,261 A | 5/1988 | Jacobson |
| 4,756,211 A | 7/1988 | Fellows |
| 4,781,663 A | 11/1988 | Reswick |
| 4,838,122 A | 6/1989 | Takamiya et al. |
| 4,856,374 A | 8/1989 | Kreuzer |
| 4,869,130 A | 9/1989 | Wiecko |
| 4,881,925 A | 11/1989 | Hattori |
| 4,900,046 A | 2/1990 | Aranceta-Angoitia |
| 4,909,101 A | 3/1990 | Terry |
| 4,918,344 A | 4/1990 | Chikamori et al. |
| 4,964,312 A | 10/1990 | Kraus |
| 5,006,093 A | 4/1991 | Itoh et al. |
| 5,020,384 A | 6/1991 | Kraus |
| 5,025,685 A | 6/1991 | Kobayashi et al. |
| 5,033,322 A | 7/1991 | Nakano |
| 5,033,571 A | 7/1991 | Morimoto |

(56) References Cited

U.S. PATENT DOCUMENTS

| | | |
|---|---|---|
| 5,037,361 A | 8/1991 | Takahashi |
| 5,044,214 A | 9/1991 | Barber |
| 5,059,158 A | 10/1991 | Bellio et al. |
| 5,069,655 A | 12/1991 | Schivelbusch |
| 5,083,982 A | 1/1992 | Sato |
| 5,099,710 A | 3/1992 | Nakano |
| 5,121,654 A | 6/1992 | Fasce |
| 5,125,677 A | 6/1992 | Ogilvie et al. |
| 5,138,894 A | 8/1992 | Kraus |
| 5,156,412 A | 10/1992 | Meguerditchian |
| 5,230,258 A | 7/1993 | Nakano |
| 5,236,211 A | 8/1993 | Meguerditchian |
| 5,236,403 A | 8/1993 | Schievelbusch |
| 5,267,920 A | 12/1993 | Hibi |
| 5,273,501 A | 12/1993 | Schievelbusch |
| 5,303,796 A | 4/1994 | Tanaka |
| 5,318,486 A | 6/1994 | Lutz |
| 5,319,486 A | 6/1994 | Vogel et al. |
| 5,330,396 A | 7/1994 | Lohr et al. |
| 5,355,749 A | 10/1994 | Obara et al. |
| 5,375,865 A | 12/1994 | Terry, Sr. |
| 5,379,661 A | 1/1995 | Nakano |
| 5,383,677 A | 1/1995 | Thomas |
| 5,387,000 A | 2/1995 | Sato |
| 5,391,126 A | 2/1995 | Fukushima |
| 5,401,221 A | 3/1995 | Fellows et al. |
| 5,451,070 A | 9/1995 | Lindsay et al. |
| 5,489,003 A | 2/1996 | Ohyama et al. |
| 5,508,574 A | 4/1996 | Vlock |
| 5,562,564 A | 10/1996 | Folino |
| 5,564,998 A | 10/1996 | Fellows |
| 5,601,301 A | 2/1997 | Liu |
| 5,607,373 A | 3/1997 | Ochiai et al. |
| 5,645,507 A | 7/1997 | Hathaway |
| 5,651,750 A | 7/1997 | Imanishi et al. |
| 5,664,636 A | 9/1997 | Ikuma et al. |
| 5,669,845 A | 9/1997 | Muramoto et al. |
| 5,690,346 A | 11/1997 | Keskitalo |
| 5,722,502 A | 3/1998 | Kubo |
| 5,746,676 A | 5/1998 | Kawase et al. |
| 5,755,303 A | 5/1998 | Yamamoto et al. |
| 5,799,541 A | 9/1998 | Arbeiter |
| 5,823,052 A | 10/1998 | Nobumoto |
| 5,846,155 A | 12/1998 | Taniguchi et al. |
| 5,888,160 A | 3/1999 | Miyata et al. |
| 5,895,337 A | 4/1999 | Fellows et al. |
| 5,899,827 A | 5/1999 | Nakano et al. |
| 5,902,207 A | 5/1999 | Sugihara |
| 5,967,933 A | 10/1999 | Valdenaire |
| 5,976,054 A | 11/1999 | Yasuoka |
| 5,984,826 A | 11/1999 | Nakano |
| 5,995,895 A | 11/1999 | Watt et al. |
| 6,000,707 A | 12/1999 | Miller |
| 6,003,649 A | 12/1999 | Fischer |
| 6,004,239 A | 12/1999 | Tomoaki |
| 6,006,151 A | 12/1999 | Graf |
| 6,015,359 A | 1/2000 | Kunii |
| 6,019,701 A | 2/2000 | Mori et al. |
| 6,029,990 A | 2/2000 | Busby |
| 6,042,132 A | 3/2000 | Suenaga et al. |
| 6,045,477 A | 4/2000 | Schmidt |
| 6,045,481 A | 4/2000 | Kumagai |
| 6,053,833 A | 4/2000 | Masaki |
| 6,053,841 A | 4/2000 | Kolde et al. |
| 6,054,844 A | 4/2000 | Frank |
| 6,066,067 A | 5/2000 | Greenwood |
| 6,071,210 A | 6/2000 | Kato |
| 6,074,320 A | 6/2000 | Miyata et al. |
| 6,076,846 A | 6/2000 | Clardy |
| 6,079,726 A | 6/2000 | Busby |
| 6,083,139 A | 7/2000 | Deguchi |
| 6,086,506 A | 7/2000 | Petersmann et al. |
| 6,095,940 A | 8/2000 | Ai et al. |
| 6,099,431 A | 8/2000 | Hoge et al. |
| 6,113,513 A | 9/2000 | Itoh et al. |
| 6,119,539 A | 9/2000 | Papanicolaou |
| 6,119,800 A | 9/2000 | McComber |
| 6,159,126 A | 12/2000 | Oshidan |
| 6,171,210 B1 | 1/2001 | Miyata et al. |
| 6,174,260 B1 | 1/2001 | Tsukada et al. |
| 6,186,922 B1 | 2/2001 | Bursal et al. |
| 6,210,297 B1 | 4/2001 | Knight |
| 6,217,473 B1 | 4/2001 | Ueda et al. |
| 6,217,478 B1 | 4/2001 | Vohmann et al. |
| 6,241,636 B1 | 6/2001 | Miller |
| 6,243,638 B1 | 6/2001 | Abo et al. |
| 6,251,038 B1 | 6/2001 | Ishikawa et al. |
| 6,258,003 B1 | 7/2001 | Hirano et al. |
| 6,261,200 B1 | 7/2001 | Miyata et al. |
| 6,296,593 B1 | 10/2001 | Gotou |
| 6,311,113 B1 | 10/2001 | Danz et al. |
| 6,312,358 B1 | 11/2001 | Goi et al. |
| 6,322,475 B2 | 11/2001 | Miller |
| 6,325,386 B1 | 12/2001 | Shoge |
| 6,358,174 B1 | 3/2002 | Folsom et al. |
| 6,358,178 B1 | 3/2002 | Wittkopp |
| 6,371,878 B1 | 4/2002 | Bowen |
| 6,375,412 B1 | 4/2002 | Dial |
| 6,390,945 B1 | 5/2002 | Young |
| 6,390,946 B1 | 5/2002 | Hibi et al. |
| 6,406,399 B1 | 6/2002 | Xioalan |
| 6,414,401 B1 | 7/2002 | Kuroda et al. |
| 6,419,608 B1 | 7/2002 | Miller |
| 6,425,838 B1 | 7/2002 | Matsubara et al. |
| 6,434,960 B1 | 8/2002 | Rousseau |
| 6,440,037 B2 | 8/2002 | Takagi et al. |
| 6,459,978 B2 | 10/2002 | Tamiguchi et al. |
| 6,461,268 B1 | 10/2002 | Milner |
| 6,482,094 B2 | 11/2002 | Kefes |
| 6,492,785 B1 | 12/2002 | Kasten et al. |
| 6,494,805 B2 | 12/2002 | Ooyama et al. |
| 6,499,373 B2 | 12/2002 | Van Cor |
| 6,514,175 B2 | 2/2003 | Taniguchi et al. |
| 6,532,890 B2 | 3/2003 | Chen |
| 6,551,210 B2 | 4/2003 | Miller |
| 6,575,047 B2 | 6/2003 | Reik et al. |
| 6,659,901 B2 | 12/2003 | Sakai et al. |
| 6,672,418 B1 | 1/2004 | Makino |
| 6,676,559 B2 | 1/2004 | Miller |
| 6,679,109 B2 | 1/2004 | Gierling et al. |
| 6,682,432 B1 | 1/2004 | Shinozuka |
| 6,689,012 B2 | 2/2004 | Miller |
| 6,721,637 B2 | 4/2004 | Abe et al. |
| 6,723,014 B2 | 4/2004 | Shinso et al. |
| 6,723,016 B2 | 4/2004 | Sumi |
| 6,805,654 B2 | 10/2004 | Nishii |
| 6,808,053 B2 | 10/2004 | Kirkwood et al. |
| 6,839,617 B2 | 1/2005 | Mensler et al. |
| 6,849,020 B2 | 2/2005 | Sumi |
| 6,859,709 B2 | 2/2005 | Joe et al. |
| 6,868,949 B2 | 3/2005 | Braford |
| 6,931,316 B2 | 8/2005 | Joe et al. |
| 6,932,739 B2 | 8/2005 | Miyata et al. |
| 6,942,593 B2 | 9/2005 | Nishii et al. |
| 6,945,903 B2 | 9/2005 | Miller |
| 6,949,049 B2 | 9/2005 | Miller |
| 6,958,029 B2 | 10/2005 | Inoue |
| 6,991,575 B2 | 1/2006 | Inoue |
| 6,991,579 B2 | 1/2006 | Kobayashi et al. |
| 7,011,600 B2 | 3/2006 | Miller et al. |
| 7,011,601 B2 | 3/2006 | Miller |
| 7,014,591 B2 | 3/2006 | Miller |
| 7,029,418 B2 | 4/2006 | Taketsuna et al. |
| 7,032,914 B2 | 4/2006 | Miller |
| 7,036,620 B2 | 5/2006 | Miller et al. |
| 7,044,884 B2 | 5/2006 | Miller |
| 7,063,195 B2 | 6/2006 | Berhan |
| 7,063,640 B2 | 6/2006 | Miller |
| 7,074,007 B2 | 7/2006 | Miller |
| 7,074,154 B2 | 7/2006 | Miller |
| 7,074,155 B2 | 7/2006 | Miller |
| 7,077,777 B2 | 7/2006 | Miyata et al. |
| 7,086,979 B2 | 8/2006 | Frenken |
| 7,086,981 B2 | 8/2006 | Ali et al. |

(56) References Cited

U.S. PATENT DOCUMENTS

| | | |
|---|---|---|
| 7,094,171 B2 | 8/2006 | Inoue |
| 7,111,860 B1 | 9/2006 | Grimaldos |
| 7,112,158 B2 | 9/2006 | Miller |
| 7,112,159 B2 | 9/2006 | Miller et al. |
| 7,125,297 B2 | 10/2006 | Miller et al. |
| 7,131,930 B2 | 11/2006 | Miller et al. |
| 7,140,999 B2 | 11/2006 | Miller |
| 7,147,586 B2 | 12/2006 | Miller et al. |
| 7,153,233 B2 | 12/2006 | Miller et al. |
| 7,156,770 B2 | 1/2007 | Miller |
| 7,160,220 B2 | 1/2007 | Shinojima et al. |
| 7,160,222 B2 | 1/2007 | Miller |
| 7,163,485 B2 | 1/2007 | Miller |
| 7,163,486 B2 | 1/2007 | Miller et al. |
| 7,166,052 B2 | 1/2007 | Miller et al. |
| 7,166,056 B2 | 1/2007 | Miller et al. |
| 7,166,057 B2 | 1/2007 | Miller et al. |
| 7,166,058 B2 | 1/2007 | Miller et al. |
| 7,169,076 B2 | 1/2007 | Miller et al. |
| 7,172,529 B2 | 2/2007 | Miller et al. |
| 7,175,564 B2 | 2/2007 | Miller |
| 7,175,565 B2 | 2/2007 | Miller et al. |
| 7,175,566 B2 | 2/2007 | Miller et al. |
| 7,192,381 B2 | 3/2007 | Miller et al. |
| 7,197,915 B2 | 4/2007 | Luh et al. |
| 7,198,582 B2 | 4/2007 | Miller et al. |
| 7,198,583 B2 | 4/2007 | Miller et al. |
| 7,198,584 B2 | 4/2007 | Miller et al. |
| 7,198,585 B2 | 4/2007 | Miller et al. |
| 7,201,693 B2 | 4/2007 | Miller et al. |
| 7,201,694 B2 | 4/2007 | Miller et al. |
| 7,201,695 B2 | 4/2007 | Miller et al. |
| 7,204,777 B2 | 4/2007 | Miller et al. |
| 7,214,159 B2 | 5/2007 | Miller et al. |
| 7,217,215 B2 | 5/2007 | Miller et al. |
| 7,217,216 B2 | 5/2007 | Inoue |
| 7,217,219 B2 | 5/2007 | Miller |
| 7,217,220 B2 | 5/2007 | Careau et al. |
| 7,232,395 B2 | 6/2007 | Miller et al. |
| 7,234,873 B2 | 6/2007 | Kato et al. |
| 7,235,031 B2 | 6/2007 | Miller et al. |
| 7,238,136 B2 | 7/2007 | Miller et al. |
| 7,238,137 B2 | 7/2007 | Miller et al. |
| 7,238,138 B2 | 7/2007 | Miller et al. |
| 7,238,139 B2 | 7/2007 | Roethler et al. |
| 7,246,672 B2 | 7/2007 | Shirai et al. |
| 7,250,018 B2 | 7/2007 | Miller et al. |
| 7,261,663 B2 | 9/2007 | Miller et al. |
| 7,275,610 B2 | 10/2007 | Kuang et al. |
| 7,285,068 B2 | 10/2007 | Hosoi |
| 7,288,042 B2 | 10/2007 | Miller et al. |
| 7,288,043 B2 | 10/2007 | Shioiri et al. |
| 7,320,660 B2 | 1/2008 | Miller |
| 7,322,901 B2 | 1/2008 | Miller et al. |
| 7,343,236 B2 | 3/2008 | Wilson |
| 7,347,801 B2 | 3/2008 | Guenter et al. |
| 7,383,749 B2 | 6/2008 | Rankin |
| 7,384,370 B2 | 6/2008 | Miller |
| 7,393,300 B2 | 7/2008 | Miller et al. |
| 7,393,302 B2 | 7/2008 | Miller |
| 7,393,303 B2 | 7/2008 | Miller |
| 7,395,731 B2 | 7/2008 | Miller et al. |
| 7,396,209 B2 | 7/2008 | Miller et al. |
| 7,402,122 B2 | 7/2008 | Miller |
| 7,410,443 B2 | 8/2008 | Miller |
| 7,419,451 B2 | 9/2008 | Miller |
| 7,422,541 B2 | 9/2008 | Miller |
| 7,422,546 B2 | 9/2008 | Miller et al. |
| 7,427,253 B2 | 9/2008 | Miller |
| 7,431,677 B2 | 10/2008 | Miller et al. |
| 7,452,297 B2 | 11/2008 | Miller et al. |
| 7,455,611 B2 | 11/2008 | Miller et al. |
| 7,455,617 B2 | 11/2008 | Miller et al. |
| 7,462,123 B2 | 12/2008 | Miller et al. |
| 7,462,127 B2 | 12/2008 | Miller et al. |
| 7,470,210 B2 | 12/2008 | Miller et al. |
| 7,478,885 B2 | 1/2009 | Urabe |
| 7,481,736 B2 | 1/2009 | Miller et al. |
| 7,510,499 B2 | 3/2009 | Miller et al. |
| 7,540,818 B2 | 6/2009 | Miller et al. |
| 7,547,264 B2 | 6/2009 | Usoro |
| 7,574,935 B2 | 8/2009 | Rohs et al. |
| 7,591,755 B2 | 9/2009 | Petrzik et al. |
| 7,632,203 B2 | 12/2009 | Miller |
| 7,651,437 B2 | 1/2010 | Miller et al. |
| 7,654,928 B2 | 2/2010 | Miller et al. |
| 7,670,243 B2 | 3/2010 | Miller |
| 7,686,729 B2 | 3/2010 | Miller et al. |
| 7,727,101 B2 | 6/2010 | Miller |
| 7,727,106 B2 | 6/2010 | Maheu et al. |
| 7,727,107 B2 | 6/2010 | Miller |
| 7,727,108 B2 | 6/2010 | Miller et al. |
| 7,727,110 B2 | 6/2010 | Miller et al. |
| 7,727,115 B2 | 6/2010 | Serkh |
| 7,731,615 B2 | 6/2010 | Miller et al. |
| 7,762,919 B2 | 7/2010 | Smithson et al. |
| 7,762,920 B2 | 7/2010 | Smithson et al. |
| 7,785,228 B2 | 8/2010 | Smithson et al. |
| 7,828,685 B2 | 11/2010 | Miller |
| 7,837,592 B2 | 11/2010 | Miller |
| 7,871,353 B2 | 1/2011 | Nichols et al. |
| 7,882,762 B2 | 2/2011 | Armstrong et al. |
| 7,883,442 B2 | 2/2011 | Miller et al. |
| 7,885,747 B2 | 2/2011 | Miller et al. |
| 7,887,032 B2 | 2/2011 | Malone |
| 7,909,723 B2 | 3/2011 | Triller et al. |
| 7,909,727 B2 | 3/2011 | Smithson et al. |
| 7,914,029 B2 | 3/2011 | Miller et al. |
| 7,959,533 B2 | 6/2011 | Nichols et al. |
| 7,963,880 B2 | 6/2011 | Smithson et al. |
| 7,967,719 B2 | 6/2011 | Smithson et al. |
| 7,976,426 B2 | 7/2011 | Smithson et al. |
| 8,066,613 B2 | 11/2011 | Smithson et al. |
| 8,066,614 B2 | 11/2011 | Miller et al. |
| 8,070,635 B2 | 12/2011 | Miller |
| 8,087,482 B2 | 1/2012 | Miles et al. |
| 8,123,653 B2 | 2/2012 | Smithson et al. |
| 8,133,149 B2 | 3/2012 | Smithson et al. |
| 8,142,323 B2 | 3/2012 | Tsuchiya et al. |
| 8,167,759 B2 | 5/2012 | Pohl et al. |
| 8,171,636 B2 | 5/2012 | Smithson et al. |
| 8,230,961 B2 | 7/2012 | Schneidewind |
| 8,262,536 B2 | 9/2012 | Nichols et al. |
| 8,267,829 B2 | 9/2012 | Miller et al. |
| 8,313,404 B2 | 11/2012 | Carter et al. |
| 8,313,405 B2 | 11/2012 | Bazyn et al. |
| 8,317,650 B2 | 11/2012 | Nichols et al. |
| 8,317,651 B2 | 11/2012 | Lohr |
| 8,321,097 B2 | 11/2012 | Vasiliotis et al. |
| 8,342,999 B2 | 1/2013 | Miller |
| 8,360,917 B2 | 1/2013 | Nichols et al. |
| 8,376,889 B2 | 2/2013 | Hoffman et al. |
| 8,376,903 B2 | 2/2013 | Pohl et al. |
| 8,382,631 B2 | 2/2013 | Hoffman et al. |
| 8,382,637 B2 | 2/2013 | Tange |
| 8,393,989 B2 | 3/2013 | Pohl |
| 8,398,518 B2 | 3/2013 | Nichols et al. |
| 8,469,853 B2 | 6/2013 | Miller et al. |
| 8,469,856 B2 | 6/2013 | Thomassy |
| 8,480,529 B2 | 7/2013 | Pohl et al. |
| 8,496,554 B2 | 7/2013 | Pohl et al. |
| 8,506,452 B2 | 8/2013 | Pohl et al. |
| 8,512,195 B2 | 8/2013 | Lohr et al. |
| 8,517,888 B1 | 8/2013 | Brookins |
| 8,535,199 B2 | 9/2013 | Lohr et al. |
| 8,550,949 B2 | 10/2013 | Miller |
| 8,585,528 B2 | 11/2013 | Carter et al. |
| 8,608,609 B2 | 12/2013 | Sherrill |
| 8,622,866 B2 | 1/2014 | Bazyn et al. |
| 8,626,409 B2 | 1/2014 | Vasiliotis et al. |
| 8,628,443 B2 | 1/2014 | Miller et al. |
| 8,641,572 B2 | 2/2014 | Nichols et al. |
| 8,641,577 B2 | 2/2014 | Nichols et al. |
| 8,678,974 B2 | 3/2014 | Lohr |

(56) References Cited

U.S. PATENT DOCUMENTS

| | | |
|---|---|---|
| 8,784,248 B2 | 7/2014 | Murakami et al. |
| 8,870,711 B2 | 10/2014 | Pohl et al. |
| 8,888,643 B2 | 11/2014 | Lohr et al. |
| 8,924,111 B2 | 12/2014 | Fuller |
| 8,996,263 B2 | 3/2015 | Quinn et al. |
| 9,046,158 B2 | 6/2015 | Miller et al. |
| 2001/0008192 A1 | 7/2001 | Morisawa |
| 2001/0023217 A1 | 9/2001 | Miyagawa et al. |
| 2001/0041644 A1 | 11/2001 | Yasuoka et al. |
| 2001/0044358 A1 | 11/2001 | Taniguchi |
| 2001/0044361 A1 | 11/2001 | Taniguchi et al. |
| 2002/0019285 A1 | 2/2002 | Henzler |
| 2002/0028722 A1 | 3/2002 | Sakai et al. |
| 2002/0037786 A1 | 3/2002 | Hirano et al. |
| 2002/0045511 A1 | 4/2002 | Geiberger et al. |
| 2002/0049113 A1 | 4/2002 | Watanabe et al. |
| 2002/0117860 A1 | 8/2002 | Man et al. |
| 2002/0128107 A1 | 9/2002 | Wakayama |
| 2002/0169051 A1 | 11/2002 | Oshidari |
| 2003/0015358 A1 | 1/2003 | Abe et al. |
| 2003/0015874 A1 | 1/2003 | Abe et al. |
| 2003/0022753 A1 | 1/2003 | Mizuno et al. |
| 2003/0036456 A1 | 2/2003 | Skrabs |
| 2003/0132051 A1 | 7/2003 | Nishii et al. |
| 2003/0135316 A1 | 7/2003 | Kawamura et al. |
| 2003/0144105 A1 | 7/2003 | O'Hora |
| 2003/0160420 A1 | 8/2003 | Fukuda |
| 2003/0216216 A1 | 11/2003 | Inoue et al. |
| 2003/0221892 A1 | 12/2003 | Matsumoto et al. |
| 2004/0038772 A1 | 2/2004 | McIndoe et al. |
| 2004/0058772 A1 | 3/2004 | Inoue et al. |
| 2004/0067816 A1 | 4/2004 | Taketsuna et al. |
| 2004/0082421 A1 | 4/2004 | Wafzig |
| 2004/0092359 A1 | 5/2004 | Imanishi et al. |
| 2004/0119345 A1 | 6/2004 | Takano |
| 2004/0171457 A1 | 9/2004 | Fuller |
| 2004/0204283 A1 | 10/2004 | Inoue |
| 2004/0231331 A1 | 11/2004 | Iwanami et al. |
| 2004/0254047 A1 | 12/2004 | Frank et al. |
| 2005/0037876 A1 | 2/2005 | Unno et al. |
| 2005/0085979 A1 | 4/2005 | Carlson et al. |
| 2005/0181905 A1 | 8/2005 | Ali et al. |
| 2005/0184580 A1 | 8/2005 | Kuan et al. |
| 2005/0227809 A1 | 10/2005 | Bitzer et al. |
| 2005/0229731 A1 | 10/2005 | Parks et al. |
| 2006/0000684 A1 | 1/2006 | Agner |
| 2006/0006008 A1 | 1/2006 | Brunemann et al. |
| 2006/0052204 A1 | 3/2006 | Eckert et al. |
| 2006/0108956 A1 | 5/2006 | Clark |
| 2006/0111212 A9 | 5/2006 | Ai et al. |
| 2006/0154775 A1 | 7/2006 | Ali et al. |
| 2006/0172829 A1 | 8/2006 | Ishio |
| 2006/0180363 A1 | 8/2006 | Uchisasai |
| 2006/0223667 A1 | 10/2006 | Nakazeki |
| 2006/0234822 A1 | 10/2006 | Morscheck et al. |
| 2006/0234826 A1 | 10/2006 | Moehlmann et al. |
| 2006/0276299 A1 | 12/2006 | Imanishi |
| 2007/0004552 A1 | 1/2007 | Matsudaira et al. |
| 2007/0004556 A1 | 1/2007 | Rohs et al. |
| 2007/0099753 A1 | 5/2007 | Matsui et al. |
| 2007/0149342 A1 | 6/2007 | Guenter et al. |
| 2007/0155552 A1 | 7/2007 | De Cloe |
| 2007/0155567 A1 | 7/2007 | Miller et al. |
| 2007/0193391 A1 | 8/2007 | Armstrong et al. |
| 2007/0228687 A1 | 10/2007 | Parker |
| 2008/0009389 A1 | 1/2008 | Jacobs |
| 2008/0032852 A1 | 2/2008 | Smithson et al. |
| 2008/0032854 A1 | 2/2008 | Smithson et al. |
| 2008/0039269 A1 | 2/2008 | Smithson et al. |
| 2008/0039273 A1 | 2/2008 | Smithson et al. |
| 2008/0039274 A1 | 2/2008 | Smithson et al. |
| 2008/0039276 A1 | 2/2008 | Smithson et al. |
| 2008/0081728 A1 | 4/2008 | Faulring et al. |
| 2008/0139363 A1 | 6/2008 | Williams |
| 2008/0141809 A1 | 6/2008 | Miller et al. |
| 2008/0149407 A1 | 6/2008 | Shibata et al. |
| 2008/0183358 A1 | 7/2008 | Thomson et al. |
| 2008/0200300 A1 | 8/2008 | Smithson et al. |
| 2008/0228362 A1 | 9/2008 | Muller et al. |
| 2008/0284170 A1 | 11/2008 | Cory |
| 2008/0305920 A1 | 12/2008 | Nishii et al. |
| 2009/0023545 A1 | 1/2009 | Beaudoin |
| 2009/0082169 A1 | 3/2009 | Kolstrup |
| 2009/0107454 A1 | 4/2009 | Hiyoshi et al. |
| 2009/0251013 A1 | 10/2009 | Vollmer et al. |
| 2010/0093479 A1 | 4/2010 | Carter et al. |
| 2010/0145573 A1 | 6/2010 | Vasilescu |
| 2011/0088503 A1 | 4/2011 | Armstrong et al. |
| 2011/0127096 A1 | 6/2011 | Schneidewind |
| 2011/0184614 A1 | 7/2011 | Keilers et al. |
| 2011/0230297 A1 | 9/2011 | Shiina et al. |
| 2011/0237385 A1 | 9/2011 | Parise |
| 2011/0291507 A1 | 12/2011 | Post |
| 2011/0319222 A1 | 12/2011 | Ogawa et al. |
| 2012/0035015 A1 | 2/2012 | Ogawa et al. |
| 2012/0258839 A1 | 10/2012 | Smithson et al. |
| 2013/0035200 A1 | 2/2013 | Noji et al. |
| 2013/0053211 A1 | 2/2013 | Fukuda et al. |
| 2013/0079191 A1 | 3/2013 | Lohr |
| 2013/0095977 A1 | 4/2013 | Smithson et al. |
| 2013/0102434 A1 | 4/2013 | Nichols et al. |
| 2013/0146406 A1 | 6/2013 | Nichols et al. |
| 2013/0152715 A1 | 6/2013 | Pohl et al. |
| 2013/0190123 A1 | 7/2013 | Pohl et al. |
| 2013/0288844 A1 | 10/2013 | Thomassy |
| 2013/0288848 A1 | 10/2013 | Carter et al. |
| 2013/0310214 A1 | 11/2013 | Pohl et al. |
| 2013/0324344 A1 | 12/2013 | Pohl et al. |
| 2013/0331218 A1 | 12/2013 | Lohr et al. |
| 2013/0337971 A1 | 12/2013 | Kostrup |
| 2014/0011619 A1 | 1/2014 | Pohl et al. |
| 2014/0011628 A1 | 1/2014 | Lohr et al. |
| 2014/0038771 A1 | 2/2014 | Miller |
| 2014/0073470 A1 | 3/2014 | Carter et al. |
| 2014/0121922 A1 | 5/2014 | Vasiliotis et al. |
| 2014/0128195 A1 | 5/2014 | Miller et al. |
| 2014/0141919 A1 | 5/2014 | Bazyn et al. |
| 2014/0144260 A1 | 5/2014 | Nichols et al. |
| 2014/0179479 A1 | 6/2014 | Nichols et al. |
| 2014/0206499 A1 | 7/2014 | Lohr |
| 2014/0248988 A1 | 9/2014 | Lohr et al. |
| 2014/0257650 A1 | 9/2014 | Carter et al. |
| 2014/0274536 A1 | 9/2014 | Versteyhe |
| 2014/0323260 A1 | 10/2014 | Miller et al. |
| 2014/0329637 A1 | 11/2014 | Thomassy et al. |
| 2014/0335991 A1 | 11/2014 | Lohr et al. |
| 2014/0365059 A1 | 12/2014 | Keilers et al. |
| 2015/0018154 A1 | 1/2015 | Thomassy |
| 2015/0039195 A1 | 2/2015 | Pohl et al. |
| 2015/0051801 A1 | 2/2015 | Quinn et al. |
| 2015/0072827 A1 | 3/2015 | Lohr et al. |
| 2015/0080165 A1 | 3/2015 | Pohl et al. |
| 2015/0226323 A1 | 8/2015 | Pohl et al. |
| 2015/0233473 A1 | 8/2015 | Miller et al. |
| 2015/0260284 A1 | 9/2015 | Miller et al. |
| 2015/0337928 A1 | 11/2015 | Smithson |
| 2015/0345599 A1 | 12/2015 | Ogawa |
| 2015/0369348 A1 | 12/2015 | Nichols et al. |
| 2015/0377305 A1 | 12/2015 | Nichols et al. |
| 2016/0003349 A1 | 1/2016 | Kimura et al. |
| 2016/0040763 A1 | 2/2016 | Nichols et al. |
| 2016/0061301 A1 | 3/2016 | Bazyn et al. |
| 2016/0146342 A1 | 5/2016 | Vasiliotis et al. |
| 2016/0178037 A1 | 6/2016 | Pohl |
| 2016/0186847 A1 | 6/2016 | Nichols et al. |
| 2016/0201772 A1 | 7/2016 | Lohr et al. |
| 2016/0244063 A1 | 8/2016 | Carter et al. |
| 2016/0273627 A1 | 9/2016 | Miller et al. |
| 2016/0281825 A1 | 9/2016 | Lohr et al. |
| 2016/0290451 A1 | 10/2016 | Lohr |
| 2016/0298740 A1 | 10/2016 | Carter et al. |
| 2016/0362108 A1 | 12/2016 | Keilers et al. |

(56) References Cited

U.S. PATENT DOCUMENTS

| | | | |
|---|---|---|---|
| 2017/0072782 A1 | 3/2017 | Miller et al. | |
| 2017/0103053 A1 | 4/2017 | Nichols et al. | |

FOREIGN PATENT DOCUMENTS

| | | |
|---|---|---|
| CN | 2245830 | 1/1997 |
| CN | 1157379 | 8/1997 |
| CN | 1167221 | 12/1997 |
| CN | 1178751 | 4/1998 |
| CN | 1204991 | 1/1999 |
| CN | 1281540 A | 1/2001 |
| CN | 1283258 | 2/2001 |
| CN | 1300355 | 6/2001 |
| CN | 1412033 | 4/2003 |
| CN | 1434229 | 8/2003 |
| CN | 1474917 | 2/2004 |
| CN | 1483235 | 3/2004 |
| CN | 1568407 | 1/2005 |
| CN | 1654858 | 8/2005 |
| CN | 2714896 | 8/2005 |
| CN | 1736791 | 2/2006 |
| CN | 1847702 | 10/2006 |
| CN | 1860315 | 11/2006 |
| CN | 1940348 | 4/2007 |
| CN | 101016076 | 8/2007 |
| DE | 498 701 | 5/1930 |
| DE | 1171692 | 6/1964 |
| DE | 2 310880 | 9/1974 |
| DE | 2 136 243 | 1/1975 |
| DE | 2436496 | 2/1975 |
| DE | 39 40 919 A1 | 6/1991 |
| DE | 19851738 | 5/2000 |
| DE | 10155372 A1 | 5/2003 |
| DE | 102011016672 | 10/2012 |
| DE | 102012023551 | 6/2014 |
| DE | 102014007271 | 12/2014 |
| EP | 0 432 742 | 12/1990 |
| EP | 0 528 381 | 2/1993 |
| EP | 0 528 382 | 2/1993 |
| EP | 0 635 639 | 1/1995 |
| EP | 0 638 741 | 2/1995 |
| EP | 0 831 249 | 3/1998 |
| EP | 0 832 816 | 4/1998 |
| EP | 0 976 956 | 2/2000 |
| EP | 1 136 724 | 9/2001 |
| EP | 1 251 294 | 10/2002 |
| EP | 1 366 978 | 3/2003 |
| EP | 1 433 641 | 6/2004 |
| EP | 1 624 230 | 2/2006 |
| EP | 1 811 202 | 7/2007 |
| EP | 2 893 219 | 7/2015 |
| FR | 620375 | 4/1927 |
| FR | 2460427 | 1/1981 |
| FR | 2590638 | 5/1987 |
| FR | 2909938 | 6/2008 |
| GB | 391448 | 4/1933 |
| GB | 592320 | 9/1947 |
| GB | 906002 | 9/1962 |
| GB | 919430 | 2/1963 |
| GB | 1132473 | 11/1968 |
| GB | 1165545 | 10/1969 |
| GB | 1376057 | 12/1974 |
| GB | 2031822 | 4/1980 |
| GB | 2035482 | 6/1980 |
| GB | 2080452 | 8/1982 |
| JP | 44-1098 | 1/1944 |
| JP | 38-025315 | 11/1963 |
| JP | 41-3126 | 2/1966 |
| JP | 42-2843 | 2/1967 |
| JP | 42-2844 | 2/1967 |
| JP | 47-207 | 6/1972 |
| JP | 47-000448 | 7/1972 |
| JP | 47-00962 | 11/1972 |
| JP | 47-29762 | 11/1972 |
| JP | 48-54371 | 7/1973 |
| JP | 49-012742 | 3/1974 |
| JP | 49-12742 | 3/1974 |
| JP | 49-013823 | 4/1974 |
| JP | 49-041536 | 11/1974 |
| JP | 50-114581 | 9/1975 |
| JP | 51-25903 | 8/1976 |
| JP | 51-150380 | 12/1976 |
| JP | 47-20535 | 8/1977 |
| JP | 53-048166 | 1/1978 |
| JP | 55-135259 | 4/1979 |
| JP | 56-047231 | 4/1981 |
| JP | 56-127852 | 10/1981 |
| JP | 58-065361 | 4/1983 |
| JP | 59-069565 | 4/1984 |
| JP | 59-144826 | 8/1984 |
| JP | 59-190557 | 10/1984 |
| JP | 60-247011 | 12/1985 |
| JP | 61-031754 | 2/1986 |
| JP | 61-053423 | 3/1986 |
| JP | 61-144466 | 7/1986 |
| JP | 61-173722 | 10/1986 |
| JP | 61-270552 | 11/1986 |
| JP | 62-075170 | 4/1987 |
| JP | 63-219953 | 9/1988 |
| JP | 63-160465 | 10/1988 |
| JP | 01-039865 | 11/1989 |
| JP | 01-286750 | 11/1989 |
| JP | 01-308142 | 12/1989 |
| JP | 02-130224 | 5/1990 |
| JP | 02-157483 | 6/1990 |
| JP | 02-271142 | 6/1990 |
| JP | 02-182593 | 7/1990 |
| JP | 03-223555 | 10/1991 |
| JP | 04-166619 | 6/1992 |
| JP | 04-272553 | 9/1992 |
| JP | 04-327055 | 11/1992 |
| JP | 4-351361 | 12/1992 |
| JP | 5-87154 | 4/1993 |
| JP | 52-35481 | 9/1993 |
| JP | 06-050169 | 2/1994 |
| JP | 6-50358 | 2/1994 |
| JP | 7-42799 | 2/1995 |
| JP | 07-133857 | 5/1995 |
| JP | 7-139600 | 5/1995 |
| JP | 07-259950 | 10/1995 |
| JP | 08-170706 | 7/1996 |
| JP | 08-270772 | 10/1996 |
| JP | 09-024743 | 1/1997 |
| JP | 09-089064 | 3/1997 |
| JP | 10-061739 | 3/1998 |
| JP | 10-078094 | 3/1998 |
| JP | 10-089435 | 4/1998 |
| JP | 10-115355 | 5/1998 |
| JP | 10-115356 | 5/1998 |
| JP | 10-194186 | 7/1998 |
| JP | 10-511621 | 11/1998 |
| JP | 41-1063130 | 3/1999 |
| JP | 11-091411 | 4/1999 |
| JP | 11-257479 | 9/1999 |
| JP | 2000-46135 | 2/2000 |
| JP | 2000-177673 | 6/2000 |
| JP | 2001-027298 | 1/2001 |
| JP | 2001-071986 | 3/2001 |
| JP | 2001-107827 | 4/2001 |
| JP | 2001-165296 | 6/2001 |
| JP | 2001-328466 | 11/2001 |
| JP | 2001-521109 | 11/2001 |
| JP | 2002-147558 | 5/2002 |
| JP | 2002-250421 | 6/2002 |
| JP | 2002-307956 | 10/2002 |
| JP | 2002-533626 | 10/2002 |
| JP | 2002-372114 | 12/2002 |
| JP | 56-101448 | 1/2003 |
| JP | 2003-028257 | 1/2003 |
| JP | 2003-56662 | 2/2003 |
| JP | 2003-161357 | 6/2003 |
| JP | 2003-194206 | 7/2003 |
| JP | 2003-524119 | 8/2003 |
| JP | 2003-320987 | 11/2003 |

(56) References Cited

FOREIGN PATENT DOCUMENTS

| | | |
|---|---|---|
| JP | 2003-336732 | 11/2003 |
| JP | 2004-011834 | 1/2004 |
| JP | 2004-162652 | 6/2004 |
| JP | 2004-189222 | 7/2004 |
| JP | 8-247245 | 9/2004 |
| JP | 2004-526917 | 9/2004 |
| JP | 2004-301251 | 10/2004 |
| JP | 2005-003063 | 1/2005 |
| JP | 2005-096537 | 4/2005 |
| JP | 2005-188694 | 7/2005 |
| JP | 2005-240928 | 9/2005 |
| JP | 2005-312121 | 11/2005 |
| JP | 2006-015025 | 1/2006 |
| JP | 2003-194207 | 10/2006 |
| JP | 2006-283900 | 10/2006 |
| JP | 2006-300241 | 11/2006 |
| JP | 2007-321931 | 12/2007 |
| JP | 2008-002687 | 1/2008 |
| JP | 03-149442 | 1/2009 |
| JP | 2010-069005 | 4/2010 |
| JP | 2007-535715 | 7/2012 |
| KR | 10-2002-0071699 | 9/2002 |
| NE | 98467 | 7/1961 |
| TW | 74007 | 1/1984 |
| TW | 175100 | 12/1991 |
| TW | 218909 | 1/1994 |
| TW | 227206 | 7/1994 |
| TW | 275872 | 5/1996 |
| TW | 360184 | 6/1999 |
| TW | 366396 | 8/1999 |
| TW | 510867 | 11/2002 |
| TW | 512211 | 12/2002 |
| TW | 582363 | 4/2004 |
| TW | 590955 | 6/2004 |
| TW | I225129 | 12/2004 |
| TW | I225912 | 1/2005 |
| TW | I235214 | 1/2005 |
| TW | M294598 | 7/2006 |
| TW | 200637745 | 11/2006 |
| TW | 200821218 | 5/2008 |
| WO | WO 99/08024 | 2/1999 |
| WO | WO 99/20918 | 4/1999 |
| WO | WO 01/73319 | 10/2001 |
| WO | WO 03/100294 | 12/2003 |
| WO | WO 05/015061 | 2/2005 |
| WO | WO 05/083305 | 9/2005 |
| WO | WO 05/108825 | 11/2005 |
| WO | WO 05/111472 | 11/2005 |
| WO | WO 06/091503 | 8/2006 |
| WO | WO 08/078047 | 7/2008 |
| WO | WO 08/095116 | 8/2008 |
| WO | WO 08/100792 | 8/2008 |
| WO | WO 08/154437 | 12/2008 |
| WO | WO 10/017242 | 2/2010 |
| WO | WO 10/135407 | 11/2010 |
| WO | WO 11/101991 | 8/2011 |
| WO | WO 11/121743 | 10/2011 |
| WO | WO 12/030213 | 3/2012 |
| WO | WO 13/112408 | 8/2013 |
| WO | WO 14/186732 | 11/2014 |
| WO | WO 16/062461 | 4/2016 |

OTHER PUBLICATIONS

Supplementary European Search Report dated Apr. 1, 2009, for European Application No. 04715691.4, filed Feb. 7, 2004.
Office Action dated Feb. 17, 2010 from Japanese Patent Application No. 2009-294086.
Extended European Search Report dated Feb. 7, 2012 for European Patent Application No. 11184545.9.
Japanese Office Action dated Jun. 19, 2012 for Japanese Patent Application No. 2009-294348.
Office Action dated Sep. 6, 2011 for Japanese Patent Application No. 2007-535715.
Taiwan Search Report and Preliminary Notice of First Office Action dated Oct. 30, 2008 for Taiwanese Patent Application No. 094134761.
International Search Report and Written Opinion dated Dec. 20, 2006 from International Patent Application No. PCT/US2006/033104, filed on Aug. 23, 2006.
Office Action dated Jun. 28, 2011 from Japanese Patent Application No. 2009-518168.
International Search Report and Written Opinion dated Apr. 16, 2008, for PCT Application No. PCT/US2007/023315, filed Nov. 6, 2007.
International Search Report and Written Opinion dated Sep. 22, 2008 for PCT Application No. PCT/US2008/066200.
International Preliminary Report on Patentability dated Dec. 11, 2009 for PCT Application No. PCT/US2008/066200.
International Search Report and Written Opinion dated Feb. 2, 2010 from International Patent Application No. PCT/US2008/068929, filed on Jan. 7, 2008.
Thomassy: An Engineering Approach to Simulating Traction EHL. CVT-Hybrid International Conference Mecc/Maastricht/The Netherlands, Nov. 17-19, 2010, p. 97.
Preliminary Notice of First Office Action dated Jan. 14, 2014 in Taiwan Patent Application No. 097121560.
Office Action dated Mar. 14, 2013 for U.S. Appl. No. 12/664,035.
First Office Action dated Sep. 17, 2014 in Taiwan Patent Applicaton No. 097121560.

DETAIL A

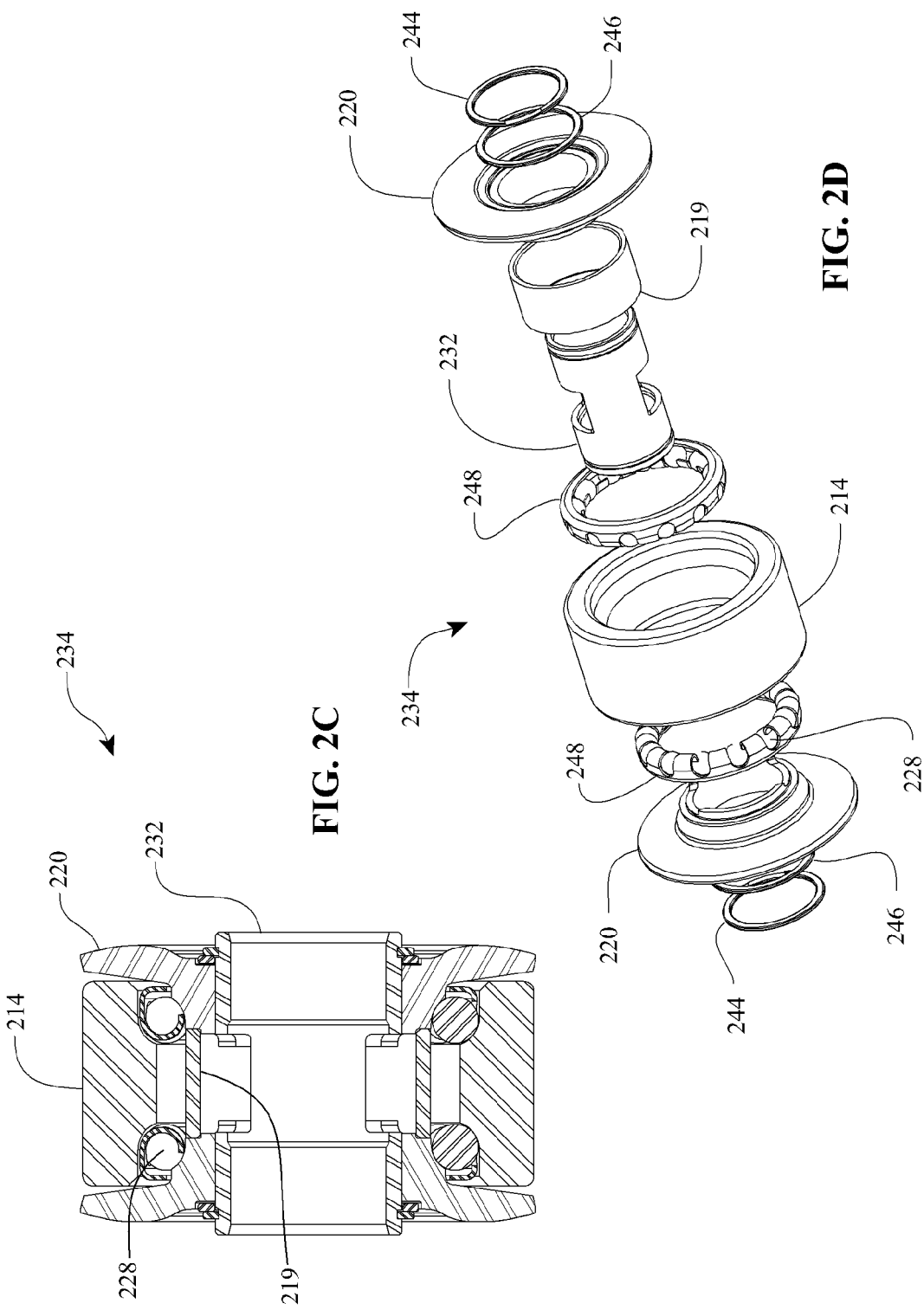

DETAIL B

DETAIL C

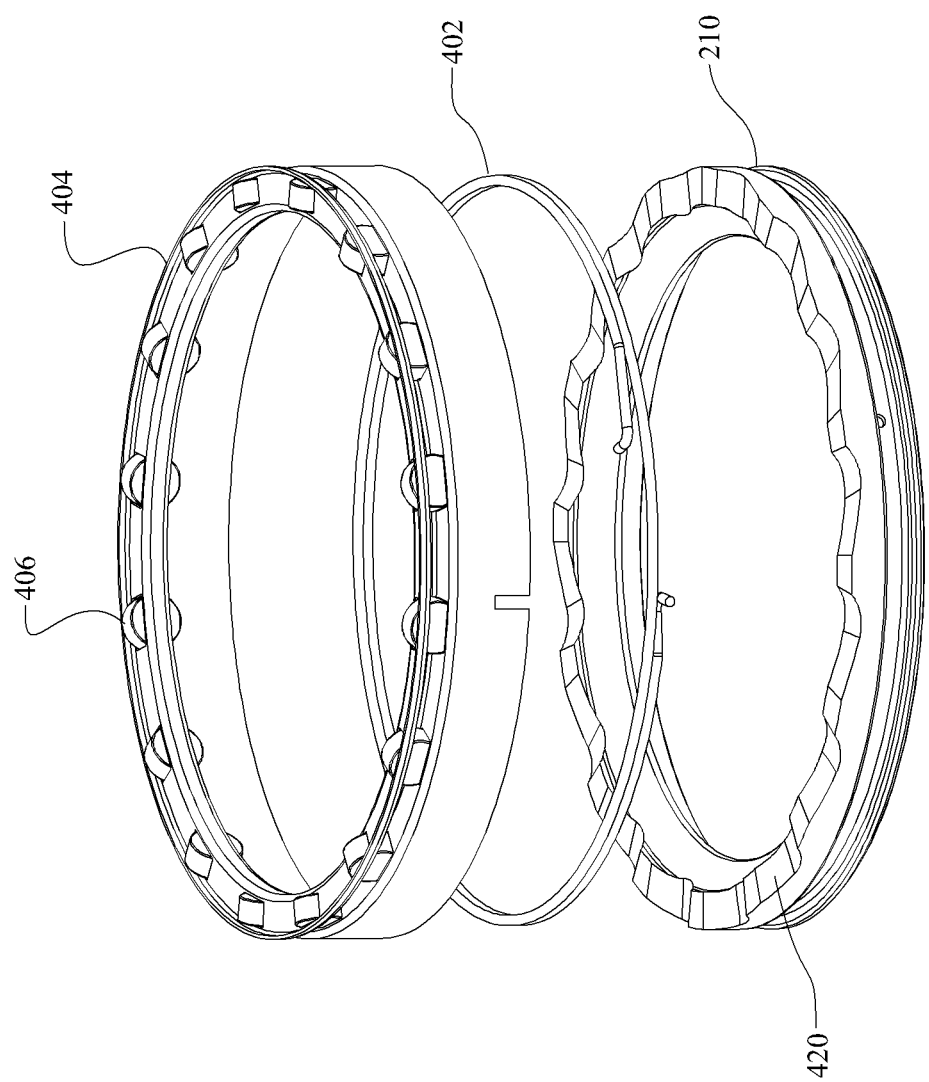

DETAIL D

DETAIL E

DETAIL F

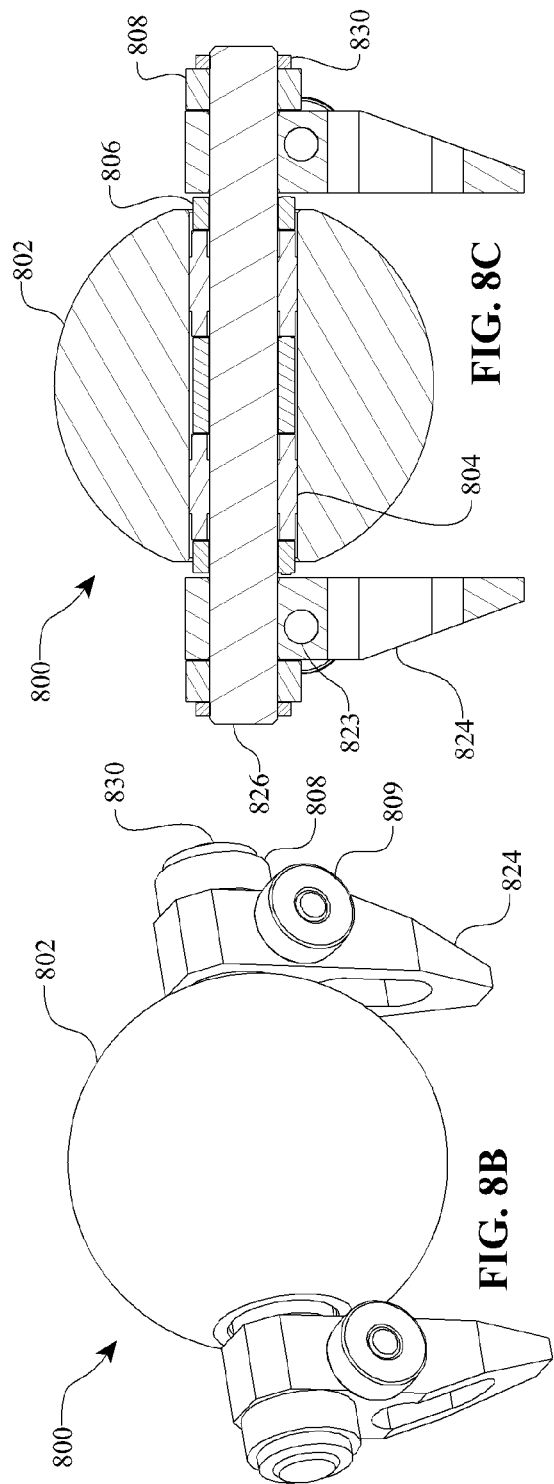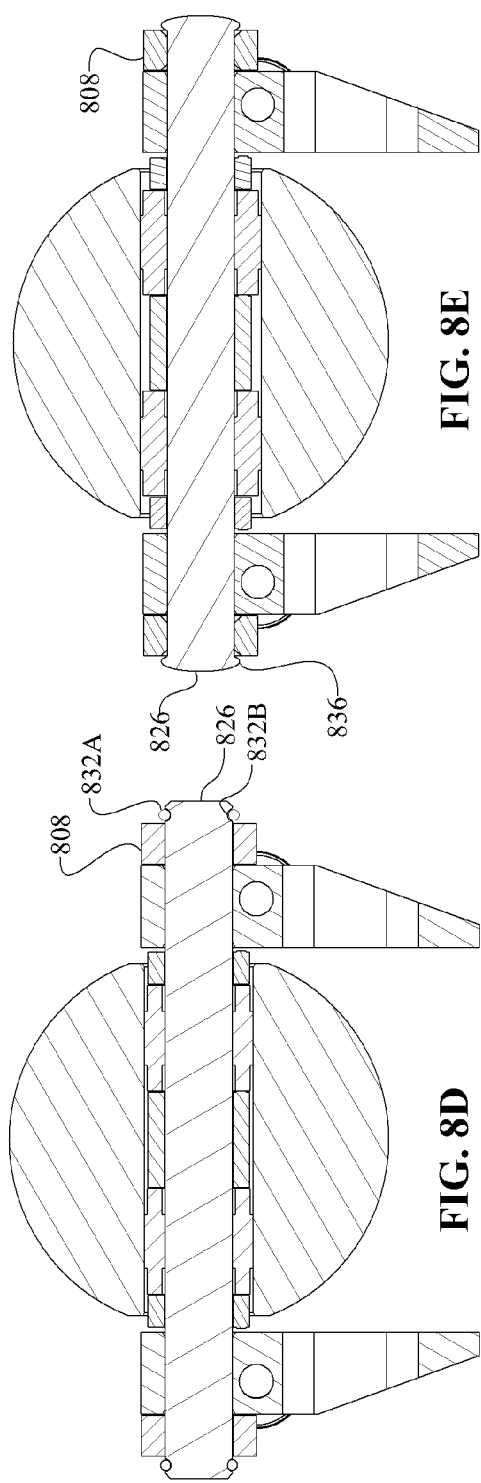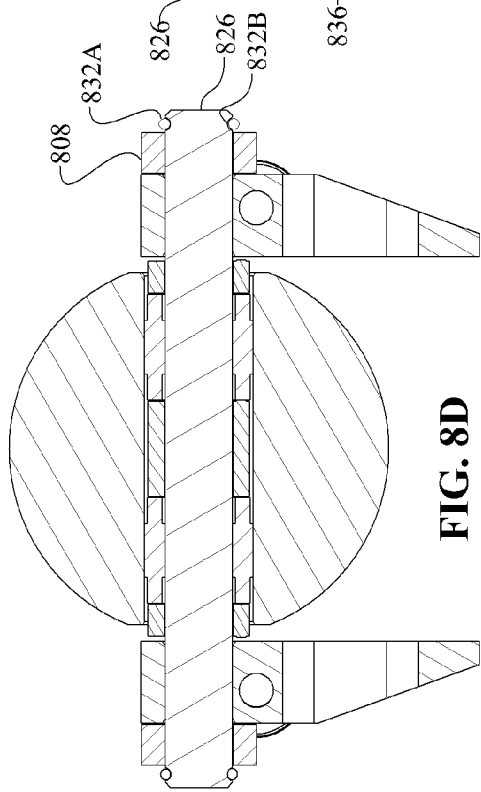

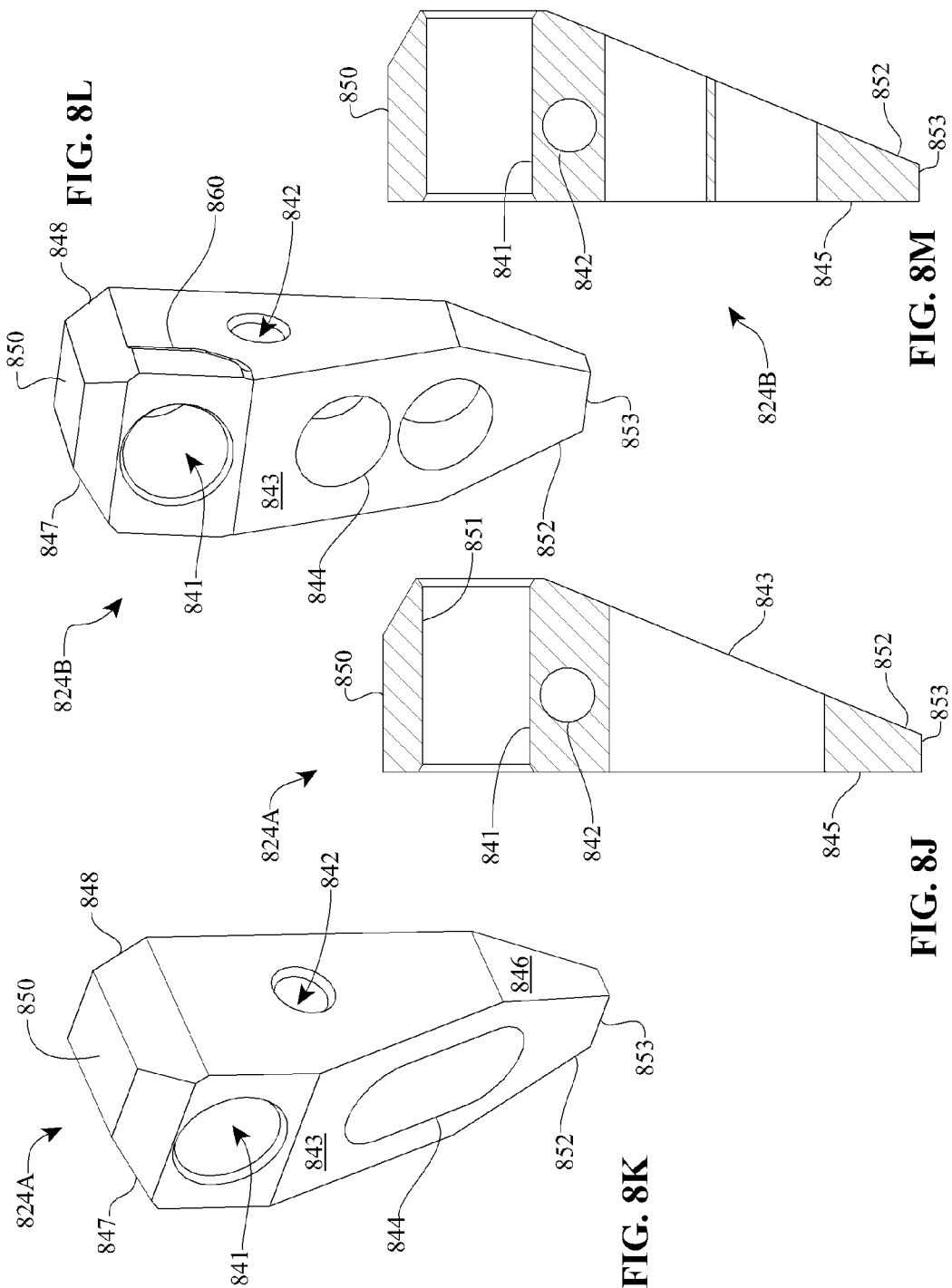

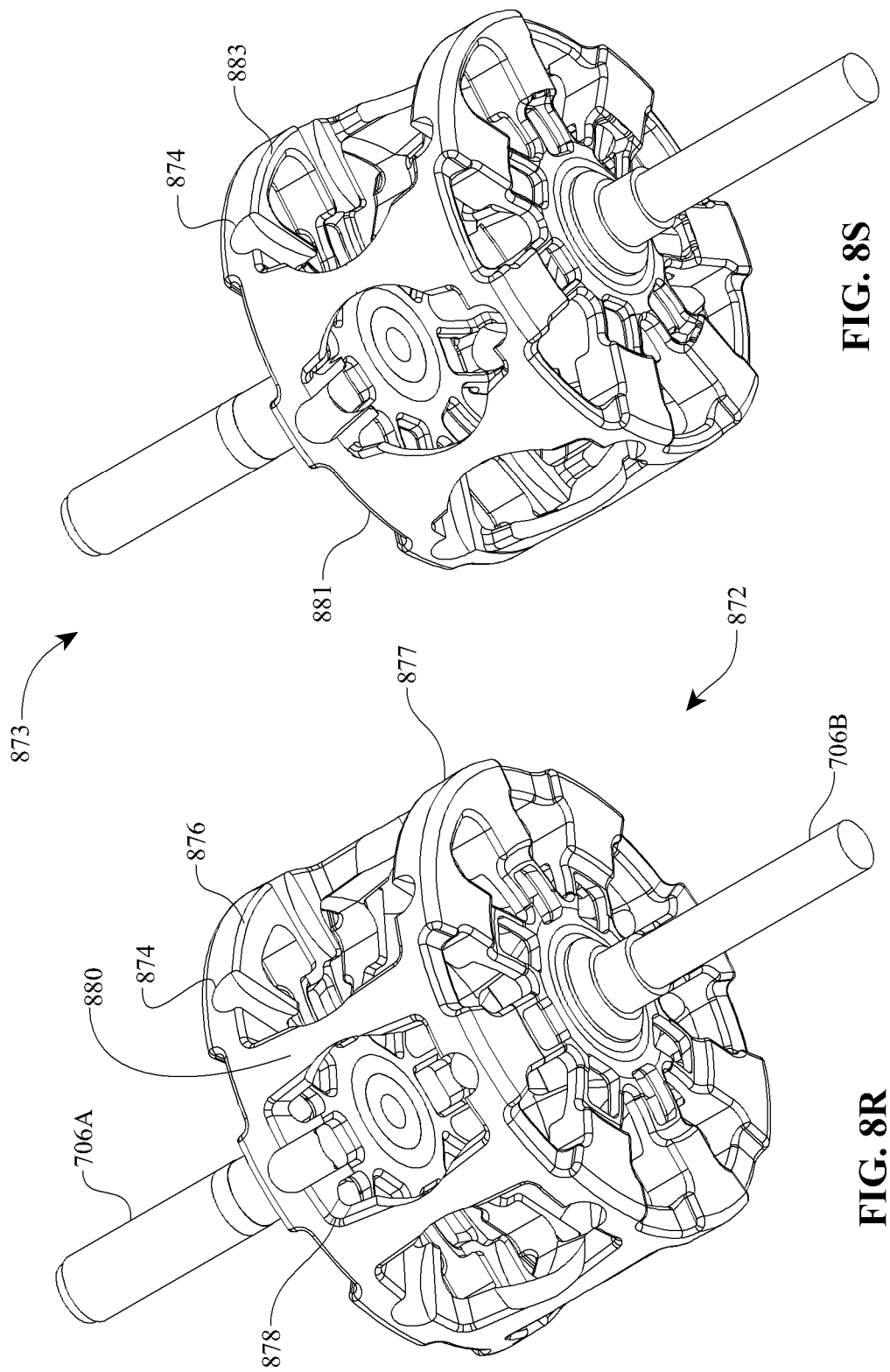

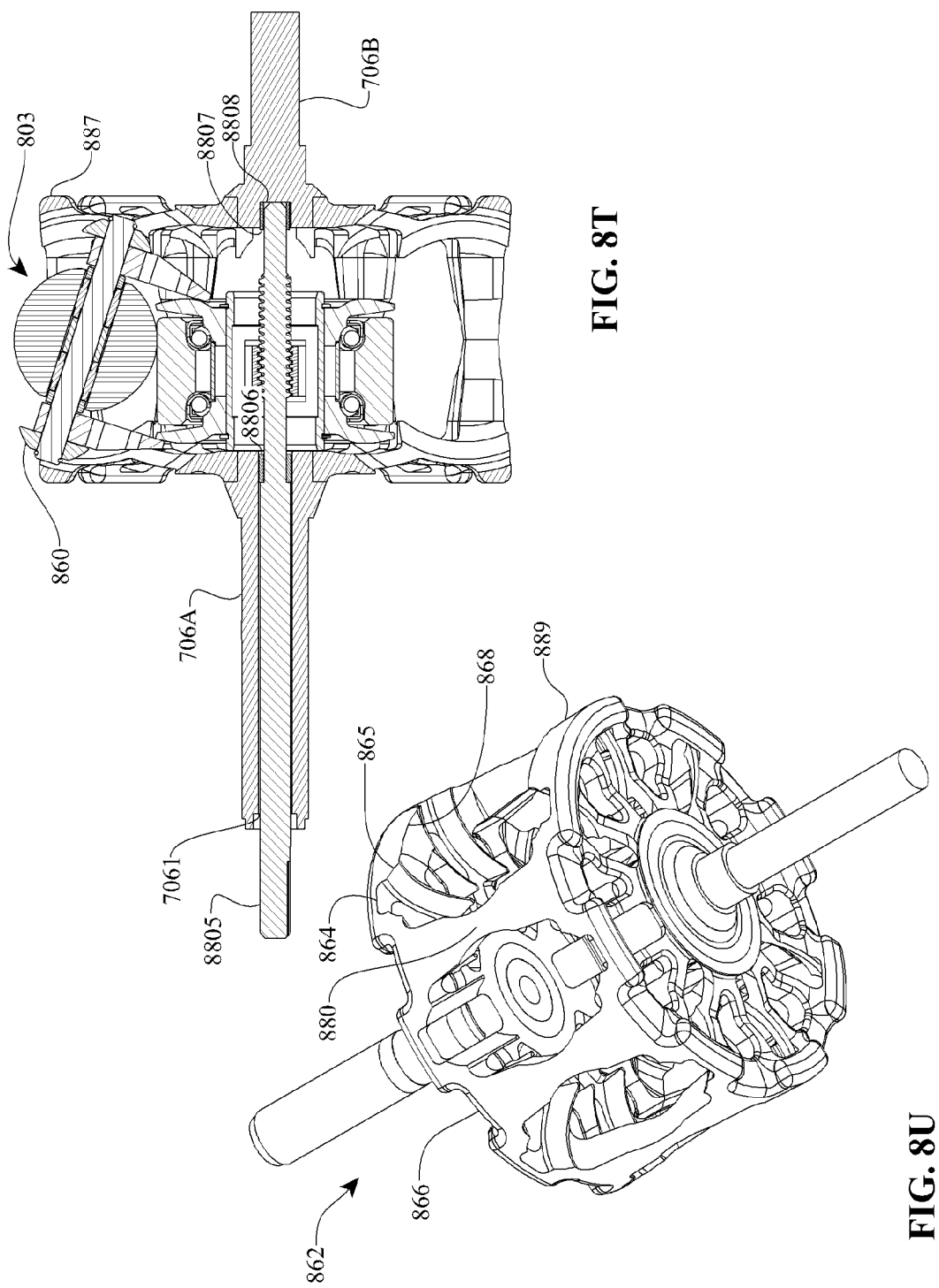

DETAIL G

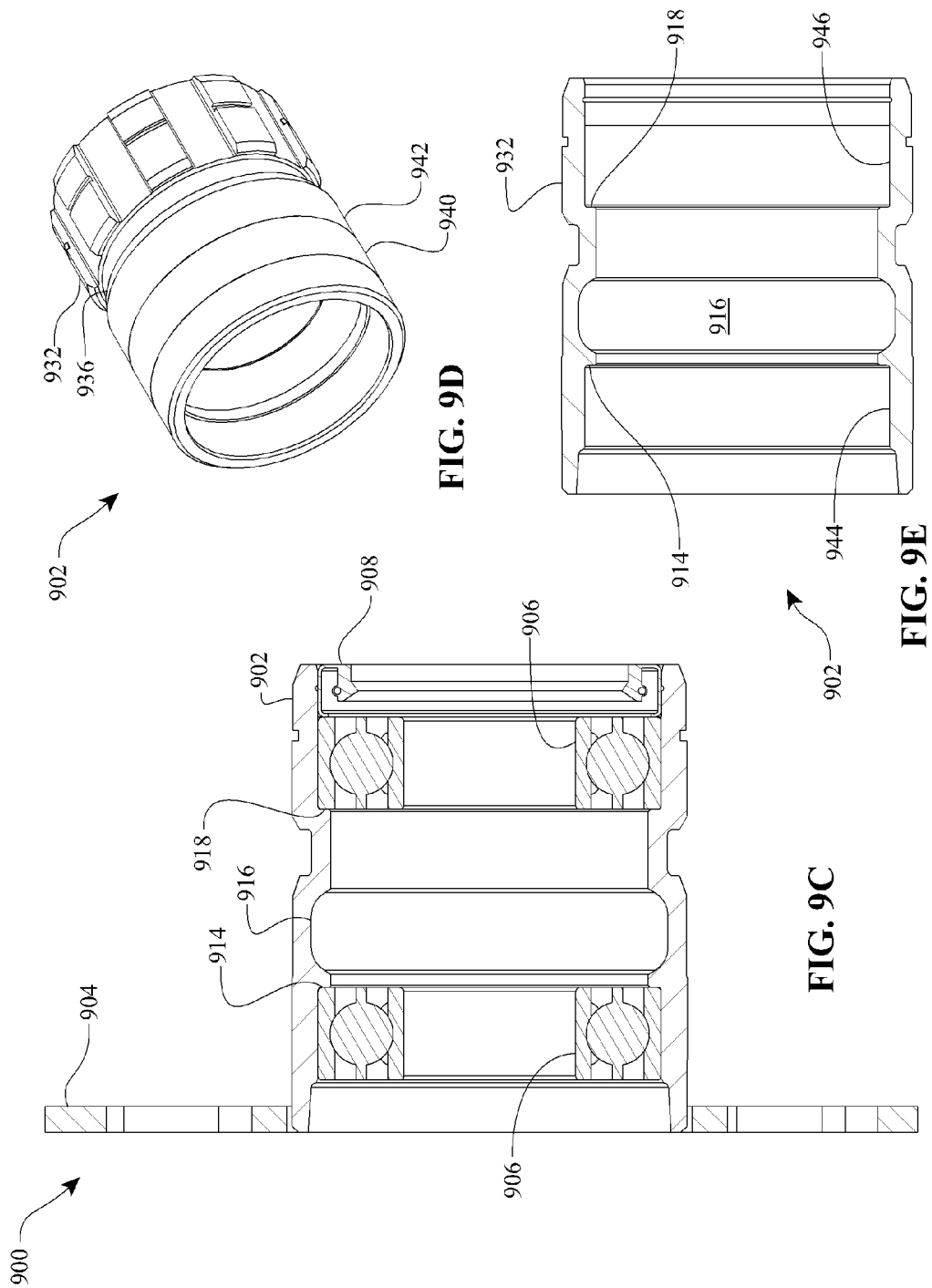

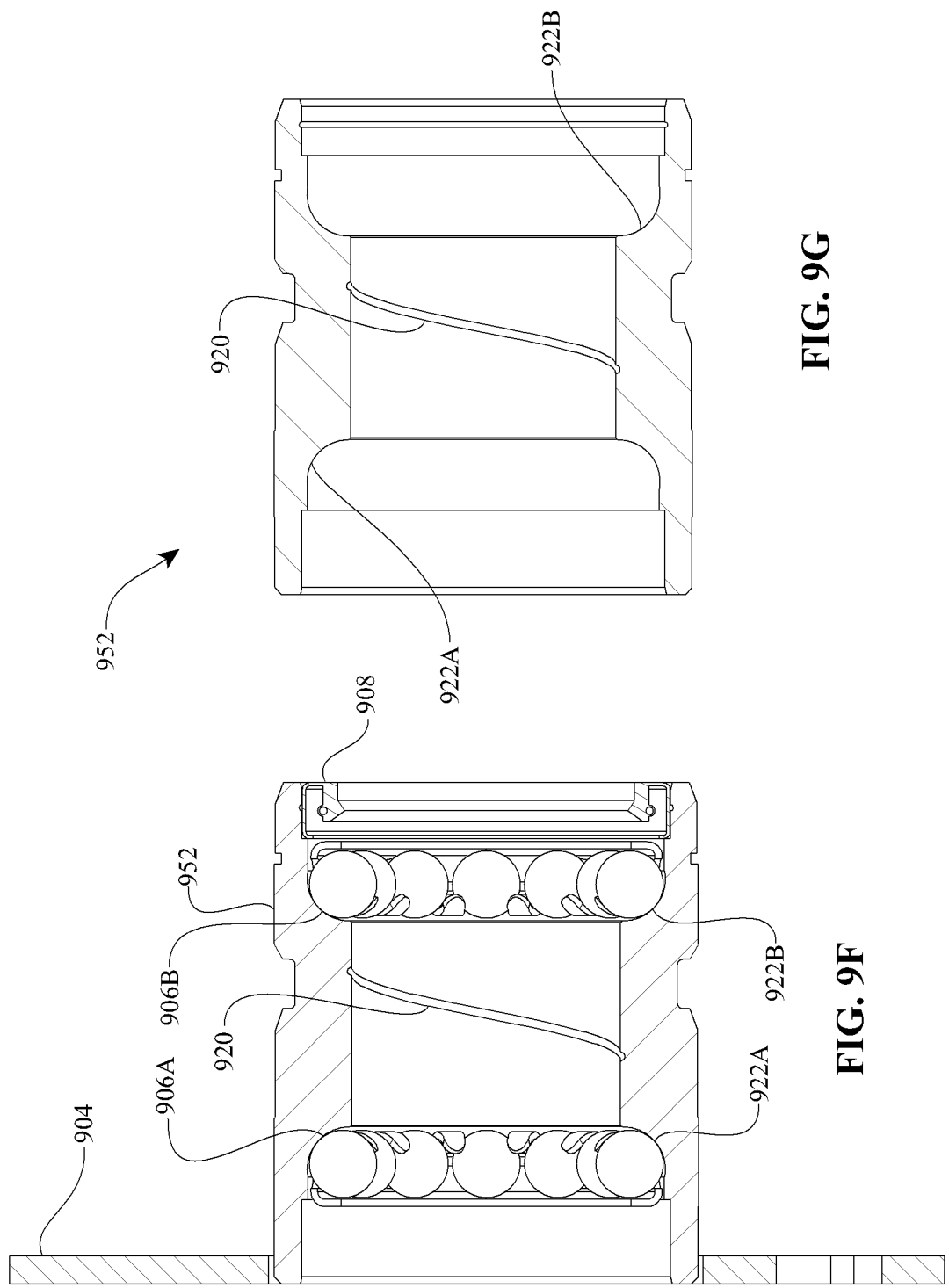

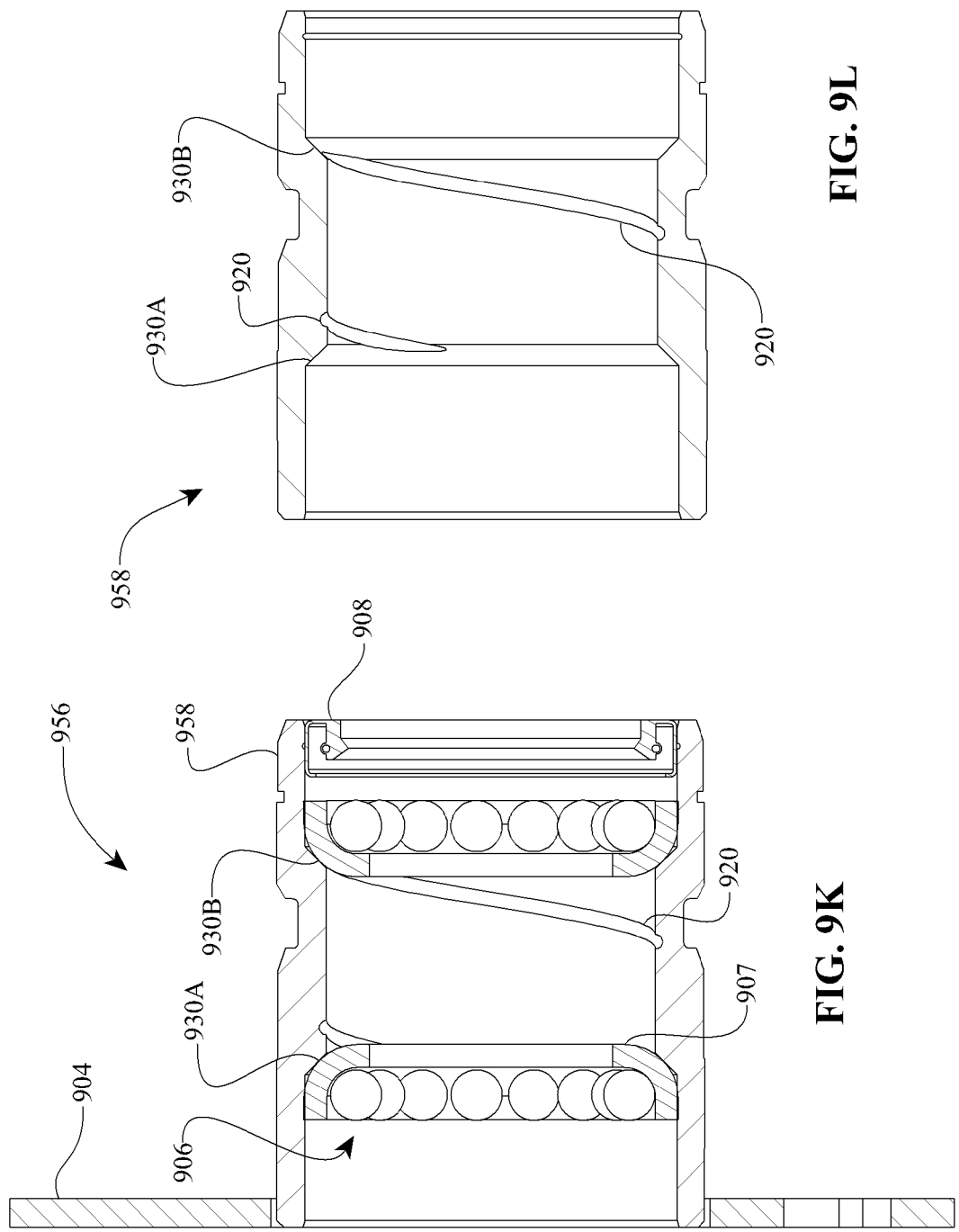

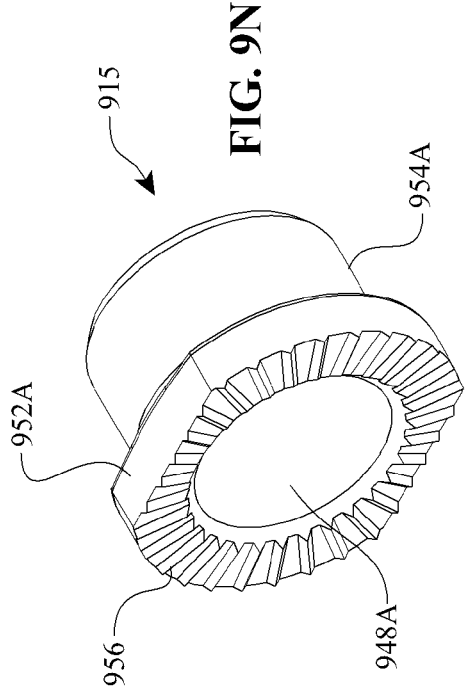
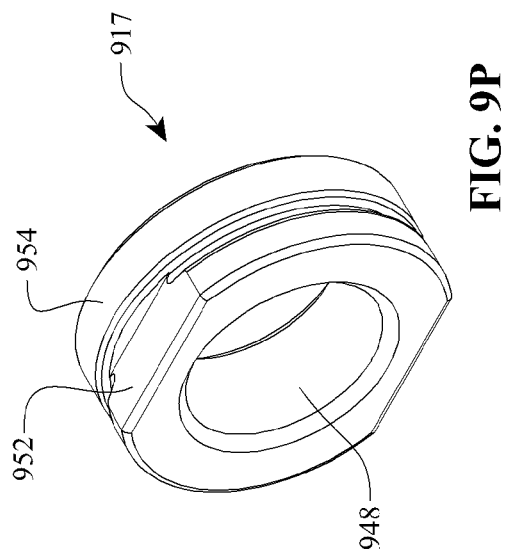
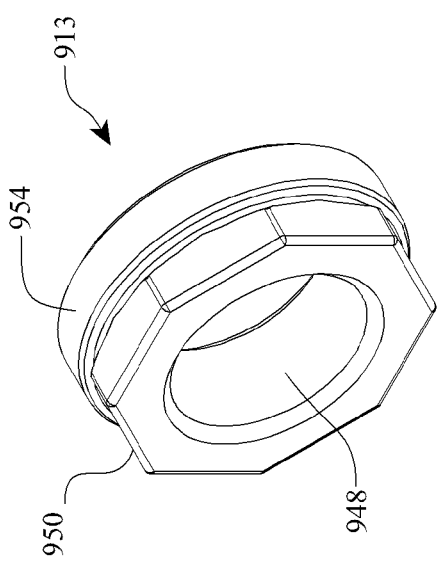

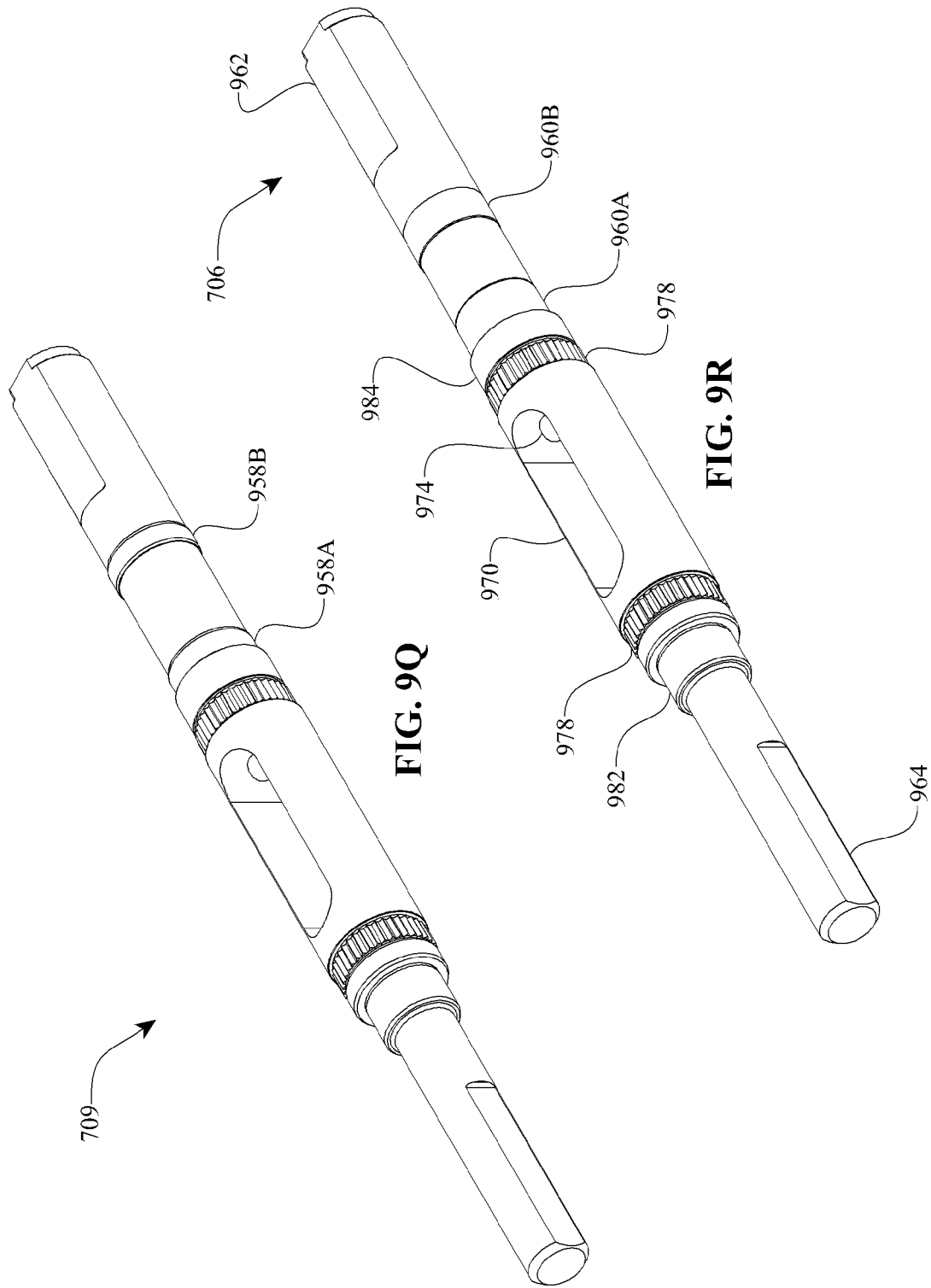

DETAIL H

DETAIL I

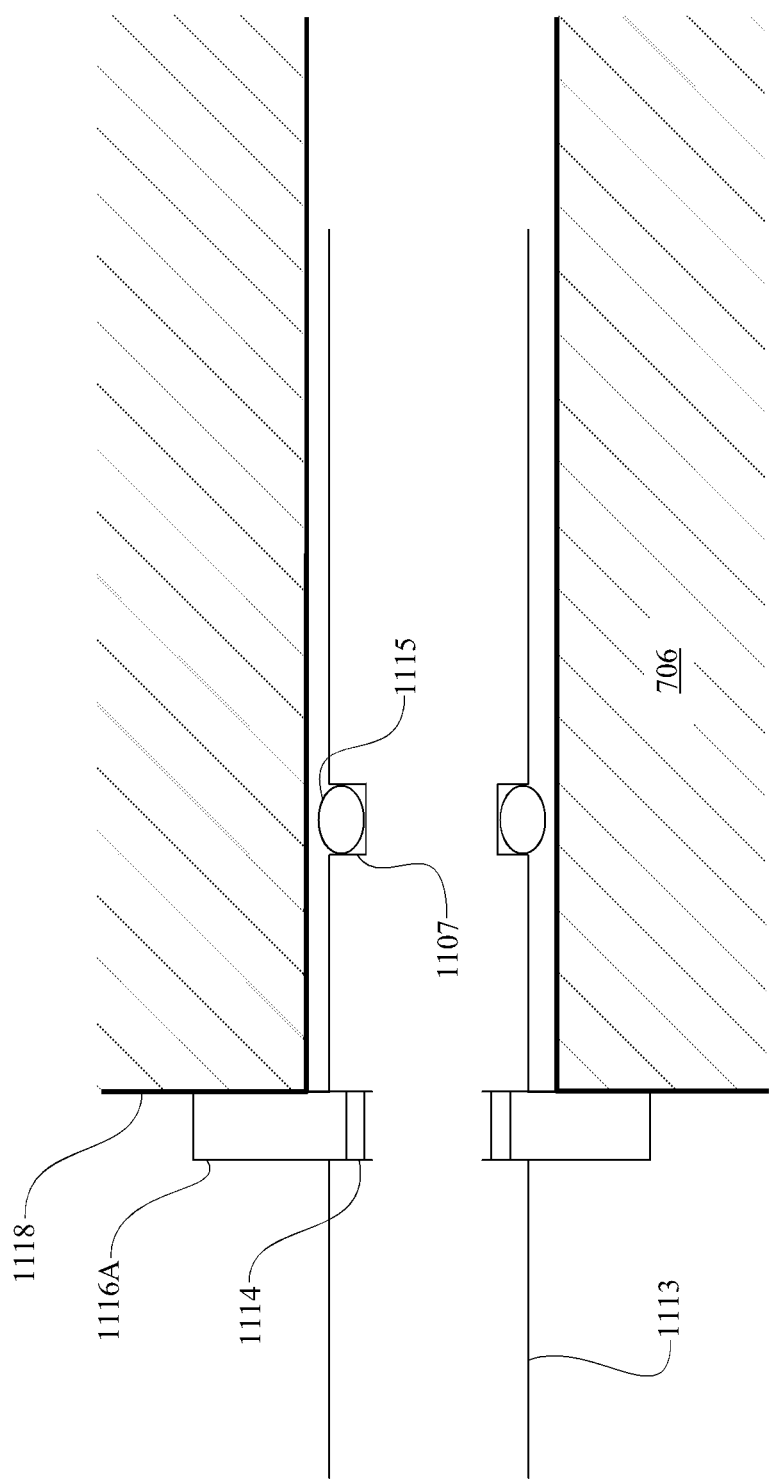

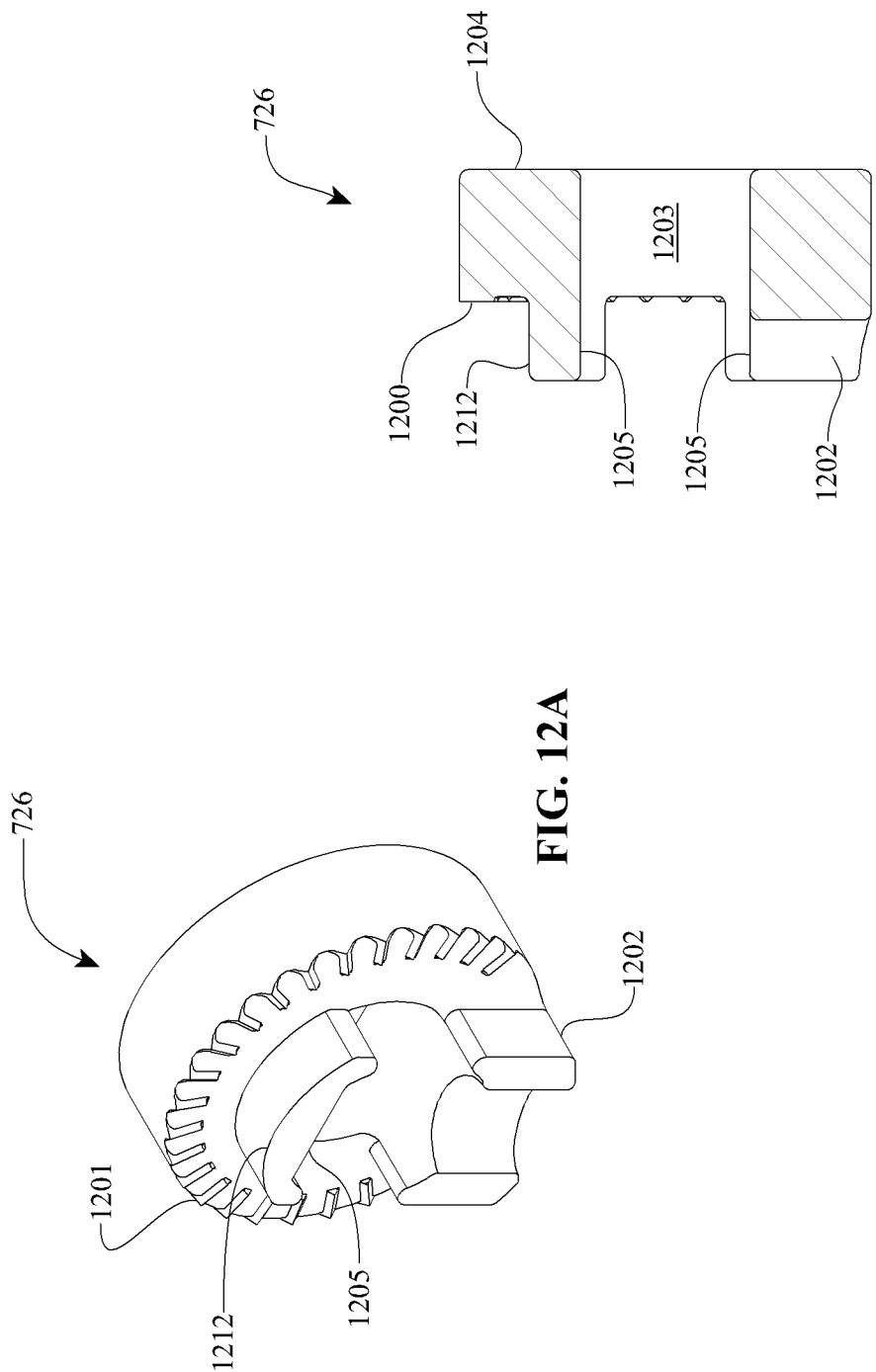

CONTINUOUSLY VARIABLE TRANSMISSION

CROSS REFERENCE TO RELATED APPLICATIONS

This application is a continuation of U.S. application Ser. No. 12/664,035, filed on Dec. 10, 2009 and scheduled to issue on Feb. 4, 2014 as U.S. Pat. No. 8,641,577, which is a national phase application of International Application No. PCT/US2008/066200, filed Jun. 6, 2008, which claims the benefit of U.S. Provisional Application No. 60/943,273, filed Jun. 11, 2007. The disclosures of all of the above-referenced prior applications, publications, and patents are considered part of the disclosure of this application, and are incorporated by reference herein in their entirety.

BACKGROUND OF THE INVENTION

Field of the Invention

The field of the invention relates generally to transmissions, and more particularly to continuously variable transmissions (CVTs).

Description of the Related Art

There are well-known ways to achieve continuously variable ratios of input speed to output speed. The mechanism for adjusting an input speed from an output speed in a CVT is known as a variator. In a belt-type CVT, the variator consists of two adjustable pulleys having a belt between them. The variator in a single cavity toroidal-type CVT has two partially toroidal transmission discs rotating about a shaft and two or more disc-shaped power rollers rotating on respective axes that are perpendicular to the shaft and clamped between the input and output transmission discs.

Embodiments of the invention disclosed here are of the spherical-type variator utilizing spherical speed adjusters (also known as power adjusters, balls, sphere gears or rollers) that each has a tiltable axis of rotation; the speed adjusters are distributed in a plane about a longitudinal axis of a CVT. The speed adjusters are contacted on one side by an input disc and on the other side by an output disc, one or both of which apply a clamping contact force to the rollers for transmission of torque. The input disc applies input torque at an input rotational speed to the speed adjusters. As the speed adjusters rotate about their own axes, the speed adjusters transmit the torque to the output disc. The input speed to output speed ratio is a function of the radii of the contact points of the input and output discs to the axes of the speed adjusters. Tilting the axes of the speed adjusters with respect to the axis of the variator adjusts the speed ratio.

SUMMARY OF THE INVENTION

The systems and methods herein described have several features, no single one of which is solely responsible for its desirable attributes. Without limiting the scope as expressed by the claims that follow, its more prominent features will now be discussed briefly. After considering this discussion, and particularly after reading the section entitled "Detailed Description of Certain Inventive Embodiments" one will understand how the features of the system and methods provide several advantages over traditional systems and methods.

One aspect of the invention relates to a power roller assembly for a continuously variable transmission (CVT). The power roller assembly includes a generally spherical power roller having a central bore. In one embodiment, the power roller assembly has a roller axle operably coupled to the central bore. The power roller assembly can include a leg coupled to the roller axle. The leg has a first end and a second end. The first end has a roller axle bore and the second end has a shift cam guide surface. The leg has a tapered surface between the first end and the second end.

Another aspect of the invention concerns a continuously variable transmission (CVT) having a plurality of power roller-leg assemblies. Each power roller-leg assembly has a skew-shift reaction roller. In one embodiment, the CVT has a single-piece carrier having a substantially cylindrical hollow body. The carrier operably couples to each of the power roller-leg assemblies. Each of the power roller-leg assemblies are arranged at least in part on an interior of the hollow body. The carrier can be configured to contact each of the skew-shift reaction rollers on the interior of the hollow body.

Yet another aspect of the invention involves a carrier for a continuously variable transmission (CVT). The carrier has a generally cylindrical hollow body having a first end and a second end. In one embodiment, the carrier includes a first support axle coupled to the first end. The first support axle extends axially from a first end exterior surface. The carrier can include a second support axle coupled to the second end. The second support axle extends axially from a second end exterior surface. The carrier has a number of openings arranged radially about the outer periphery of the cylindrical hollow body. The carrier also has a first set of radial grooves formed on a first end interior surface, and a second set of radial grooves formed on a second end interior surface. The first and second sets of radial grooves are each configured to couple to a respective plurality of skew-shift reaction rollers of the CVT.

One aspect of the invention concerns a power input assembly for a continuously variable transmission (CVT). The power input assembly includes a cam driver having a first face, a second face, and an inner bore. The first face has a set of ramps. The power input assembly includes a torsion plate operably coupled to the cam driver. In one embodiment, the power input assembly has a group of pawls operably coupled to the torsion plate. Each of the pawls are operably coupled to the inner bore of the cam driver. The pawls are configured to facilitate a transfer of torque from the torsion plate to the cam driver in a first direction.

Another aspect of the invention relates to a power input assembly for a continuously variable transmission (CVT). The power input assembly includes a traction ring and a load cam roller cage operably coupled to the traction ring. The load cam roller cage has a group of load cam rollers. In one embodiment, the power input assembly includes a load cam driver operably coupled to the load cam roller cage. The load cam driver has a set of ramps operably coupled to the load cam rollers. The load cam driver has a groove formed on an outer circumference. The power input assembly also includes a torsion spring coupled to the load cam roller cage and to the load cam driver. The torsion spring is located in the groove of the load cam driver.

Yet one more aspect of the invention addresses a method of assembling a continuously variable transmission (CVT) having a set of power roller-leg assemblies, a housing cover, and a traction ring coupled to each of the power roller-leg assemblies. The method includes providing a roller cage operably coupled to the traction ring. In one embodiment, the method includes providing a drive washer operably coupled to the roller cage. The method also includes installing a shim between the drive washer and the housing cover. The shim is configured to provide an axial pre-load force of the CVT.

In another aspect, the invention concerns a shifter interface assembly for a continuously variable transmission (CVT) having a main axle. The shifter interface assembly includes a shift rod arranged at least in part in a hollow bore of the main axle. In one embodiment, the shifter interface has a ball bearing coupled to the shift rod and to the main axle. The shifter interface also includes a shift retainer nut coupled to the ball bearing and coupled to the main axle.

Another aspect of the invention relates to a shifter interface assembly for a continuously variable transmission (CVT) having a main axle arranged along a longitudinal axis. The shifter interface assembly includes a shift rod having an elongated body. The shift rod can be positioned in a hollow bore of the main axle wherein at least a portion of the shift rod is enclosed by the main axle. The shifter interface assembly includes a clip coupled to the shift rod. In one embodiment, the shifter interface assembly has a first groove formed on the shift rod. The first groove can be configured to receive an o-ring. The shifter interface assembly can also include a second groove formed on the shift rod. The second groove can be configured to receive the clip. The shift rod and the main axle are configured relative to each other such that the first groove is located inside the hollow bore of the main axle and the second groove is located outside of the hollow bore.

One aspect of the invention relates to a method of assembling a continuously variable transmission (CVT). The method includes providing a brake adapter having a first substantially flat surface, a shoulder extending radially outward from the first flat surface, and a piloting surface arranged at least partly on an inner circumference of the flat surface. The piloting surface extends axially from the first flat surface. In one embodiment, the method includes providing a housing cover having a second substantially flat surface, an annular recess substantially surrounding the second flat surface, and an inner bore. The method can include placing the piloting surface in the inner bore. The method can also include aligning the first flat surface with the second flat surface. The first flat surface is in contact with the second flat surface. The method include providing a retaining ring. In one embodiment, the method includes aligning the retaining ring to surround the shoulder and the annular recess. The method can also include fastening the retaining ring to enclose the shoulder and the annular recess such that the retaining ring rigidly couples the brake adapter to the housing cover.

BRIEF DESCRIPTION OF THE FIGURES

FIG. 2C is a cross-section of one embodiment of an idler subassembly for the CVT shown in FIG. 1.

FIG. 2D is a perspective, exploded view of the idler subassembly of FIG. 2C.

FIG. 4B is an exploded, perspective view of various components of the axial force generation subassembly of FIG. 4A.

FIG. 8B is a perspective view of certain components of the variator subassembly shown in FIG. 8A.

FIG. 8C is a perspective, cross-sectional view of the components shown in FIG. 8B.

FIG. 8D is a perspective, cross-sectional view of an alternative embodiment of certain components of the variator subassembly shown in FIG. 8A.

FIG. 8E is a perspective, cross-sectional view of an alternative embodiment of certain components of the variator subassembly shown in FIG. 8A.

FIG. 8J is a cross-sectional view of an alternative embodiment of a leg.

FIG. 8K is a perspective view of the leg of FIG. 8G.

FIG. 8L is a cross-sectional view of an alternative embodiment of a leg.

FIG. 8M is a perspective view of the leg of FIG. 8I.

FIG. 8R is a perspective view of one embodiment of a carrier assembly that can be used with the variator subassembly shown in FIG. 8Q.

FIG. 8S is a perspective view of an alternative embodiment of a carrier that can be used with the variator subassembly shown in FIG. 8Q.

FIG. 8T is a cross-sectional view of one embodiment of certain components of an alternative variator subassembly.

FIG. 8U is a perspective view of an embodiment of a carrier that can be used with the variator subassembly shown in FIG. 8T.

FIG. 9C is a cross-sectional view of an alternative power input subassembly.

FIG. 9D is a perspective view of an input driver that can be used with the power input subassembly shown in FIG. 9C.

FIG. 9E is a cross-sectional view of an input driver that can be used with the power input subassembly shown in FIG. 9A.

FIG. 9F is a cross-sectional view of yet another alternative power input subassembly.

FIG. 9G is a cross-sectional view of an input driver that can be used with the power input subassembly shown in FIG. 9D.

FIG. 9K is a cross-sectional view of certain components of a power input subassembly.

FIG. 9L is a cross-sectional view of an input driver that can be used with the power input subassembly shown in FIG. 9G.

FIG. 9M is a perspective view of a bearing nut that can be used with the power input subassembly shown in FIG. 9A.

FIG. 9N is a perspective view of another embodiment of a bearing nut that can be used with the power input subassembly shown in FIG. 9A.

FIG. 9P is a perspective view of yet another embodiment of a bearing nut that can be used with the power input subassembly shown in FIG. 9A.

FIG. 9Q is a perspective view of one embodiment of a main shaft that can be used with the variator of FIG. 7.

FIG. 9R is a perspective view of another embodiment of a main shaft that can be used with the variator FIG. 7.

FIG. 11C is a cross-sectional view of certain components of one more alternative shifter interface subassembly.

FIG. 12A is a perspective view of an anti-rotation washer that can be used with the variator of FIG. 7.

FIG. 12B is a cross-sectional view of the anti-rotation washer of FIG. 12A.

DETAILED DESCRIPTION OF CERTAIN INVENTIVE EMBODIMENTS

The preferred embodiments will be described now with reference to the accompanying figures, wherein like numerals refer to like elements throughout. The terminology used in the descriptions below is not to be interpreted in any limited or restrictive manner simply because it is used in conjunction with detailed descriptions of certain specific embodiments of the invention. Furthermore, embodiments of the invention can include several novel features, no single one of which is solely responsible for its desirable attributes or which is essential to practicing the inventions described. The CVT embodiments described here are generally of the type disclosed in U.S. Pat. Nos. 6,241,636; 6,419,608; 6,689,012; 7,011,600; 7,166,052; and U.S. patent application Ser. Nos. 11/243,484 and 11/543,311. The entire disclosure of each of these patents and patent applications is hereby incorporated herein by reference.

As used here, the terms "operationally connected," "operationally coupled", "operationally linked", "operably connected", "operably coupled", "operably linked," and like terms, refer to a relationship (mechanical, linkage, coupling, etc.) between elements whereby operation of one element results in a corresponding, following, or simultaneous operation or actuation of a second element. It is noted that in using said terms to describe inventive embodiments, specific structures or mechanisms that link or couple the elements are typically described. However, unless otherwise specifically stated, when one of said terms is used, the term indicates that the actual linkage or coupling may take a variety of forms, which in certain instances will be readily apparent to a person of ordinary skill in the relevant technology.

For description purposes, the term "radial" is used here to indicate a direction or position that is perpendicular relative to a longitudinal axis of a transmission or variator. The term "axial" as used here refers to a direction or position along an axis that is parallel to a main or longitudinal axis of a transmission or variator. For clarity and conciseness, at times similar components labeled similarly (for example, control piston 582A and control piston 582B) will be referred to collectively by a single label (for example, control pistons 582).

Figure 1:
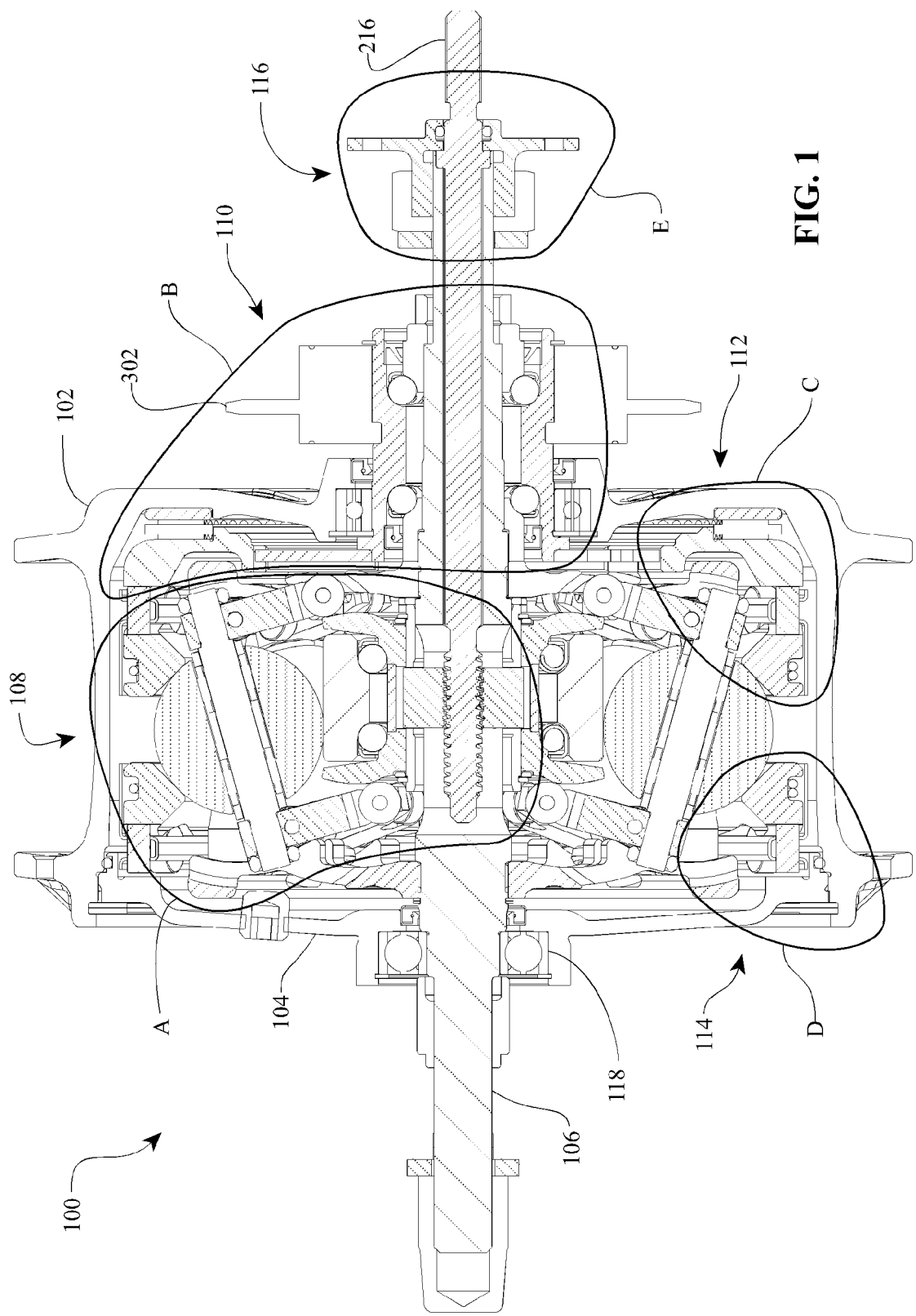
FIG. 1 is a cross-section of one embodiment of a continuously variable transmission (CVT).

Embodiments of a continuously variable transmission (CVT), and components and subassemblies therefor, will be described now with reference to FIGS. 1-12D. FIG. 1 shows a CVT 100 that can be used in many applications including, but not limited to, human powered vehicles (for example, bicycles), light electrical vehicles, hybrid human-, electric-, or internal combustion powered vehicles, industrial equipment, wind turbines, etc. Any technical application that requires modulation of mechanical power transfer between a power input and a power sink (for example, a load) can implement embodiments of a CVT 100 in its power train.

As illustrated in FIG. 1, in one embodiment the CVT 100 includes a shell 102 that couples to a cover 104. The shell 102 and the cover 104 form a housing that, among other things, functions to enclose most of the components of the CVT 100. A main axle 106 provides axial and radial positioning and support for other components of the CVT 100. For descriptive purposes only, the CVT 100 can be seen as having a variator subassembly 108 as shown in detail view A, an input subassembly 110 as shown in detail view B, an input-side axial force generation subassembly 112 as shown in detail view C, an output-side axial force generation subassembly 114 as shown in detail view D, and a shift rod and/or shifter interface subassembly 116 as shown in detail view E. It should be understood that characterization of the CVT 100 in terms of these subassemblies is for illustration purposes only and does not necessarily establish that these subassemblies, or components included therein, must all be present or configured exactly as shown in the CVT 100. These subassemblies will now be described in further detail.

Figure 2A:
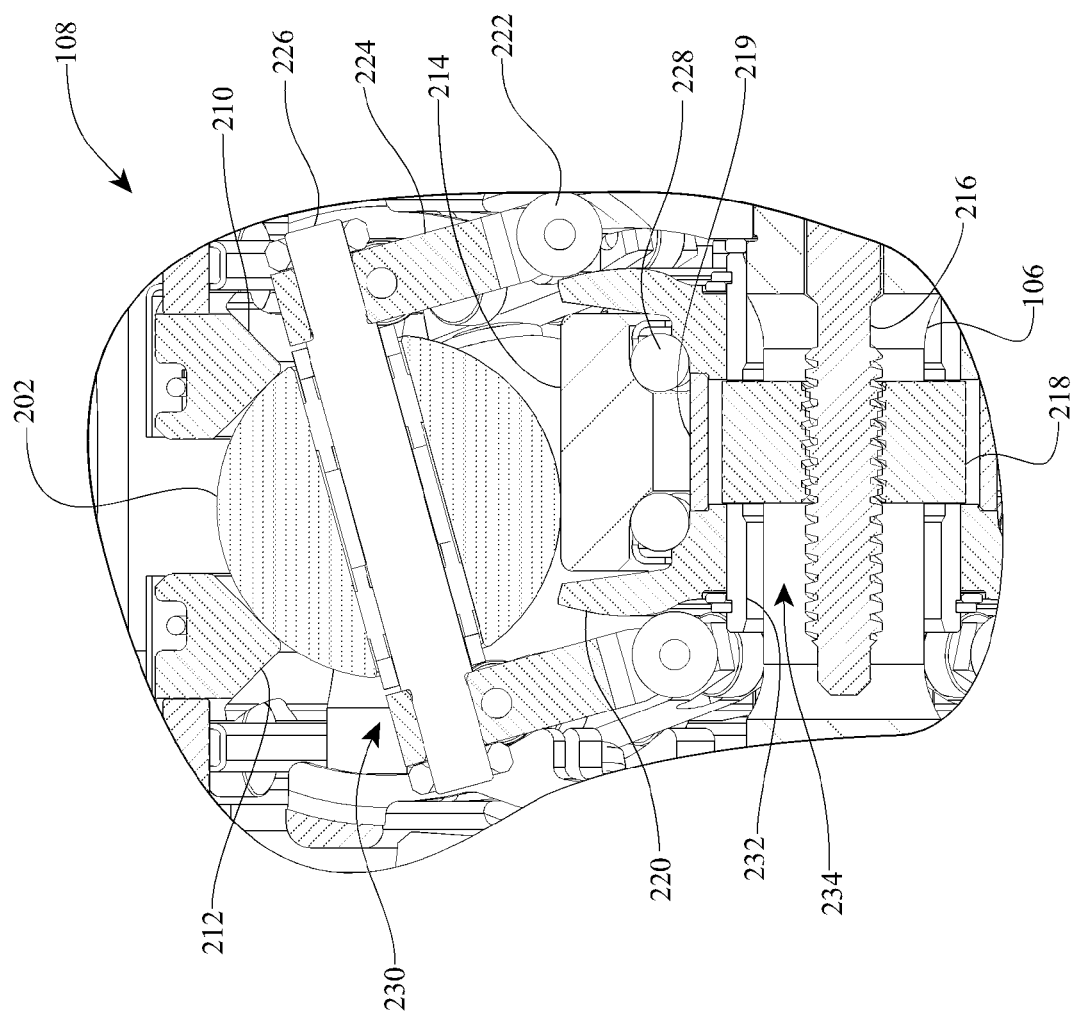
FIG. 2A is a detail view A, of the cross-section shown in FIG. 1, showing generally a variator subassembly.
Figure 2B:
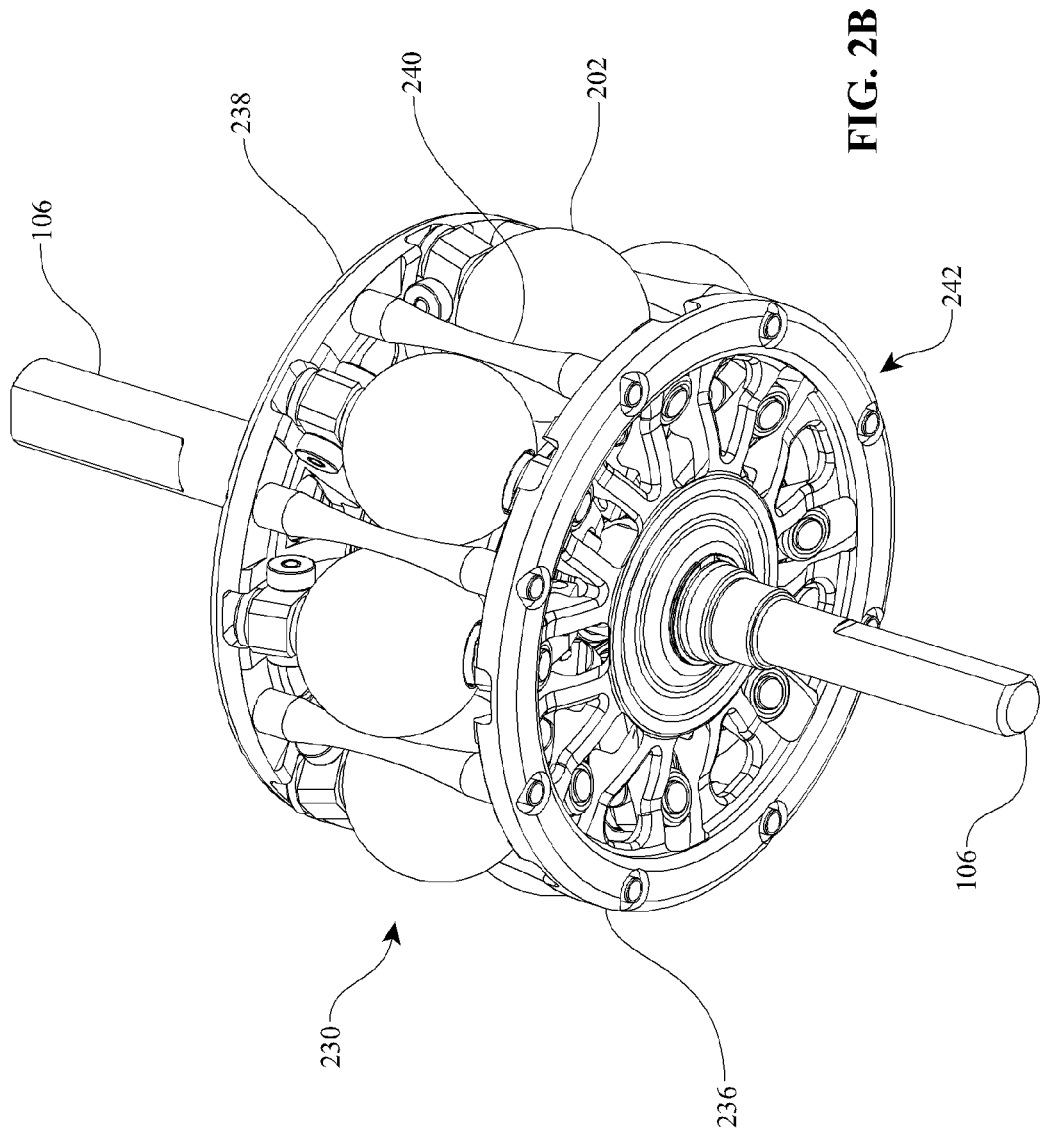
FIG. 2B is a perspective view of certain components of the CVT, shown in FIG. 1, generally illustrating a cage subassembly of the variator subassembly.

Referring now to FIGS. 2A-2E, in one embodiment the variator subassembly 108 includes a number of traction power rollers 202 placed in contact with an input traction ring 210, output traction ring 212, and a support member 214. A shift rod 216 threads into a shift rod nut 218, which is located between and is adapted to interact with the shift cams 220. A support member bushing 232 is piloted by the main axle 106 and interfaces with the shift rod nut 218. When the materials selected for the main axle 106 and the shift rod nut 218 differ, it is preferable to avoid rough surface finishes on the harder of the two materials. A shift rod nut collar 219 is mounted coaxially about the main axle 106 and is positioned between the shift cams 220. The shift cams 220 contact the cam rollers 222. Each of several legs 224 couples on one end to a cam roller 222. Another end of each leg 224 couples to a power roller axle 226, which provides a tiltable axis of rotation for the power roller 202. In some embodiments, the power roller axles 226 rotate freely with respect to the legs 224, by the use of bearings for example, but in other embodiments the power roller axles 226 are fixed rotationally with respect to the legs 224. As best seen in FIG. 2B, a stator plate 236 and a stator plate 238 couple to a number of stator rods 240 to form a carrier 242. In some embodiments, the number of stator rods 240 of the carrier 242 is preferably less than 9, more preferably less than 7, even more preferably less than 6, and most preferably less than 5. The carrier 242 is configured to facilitate the axial and radial support of the power rollers 202 and the legs 224, among other things. In some embodiments, the carrier 242 is configured to be rotatable and to, thus, facilitate the transfer of power into or out of the CVT 100.

Figure 2E:
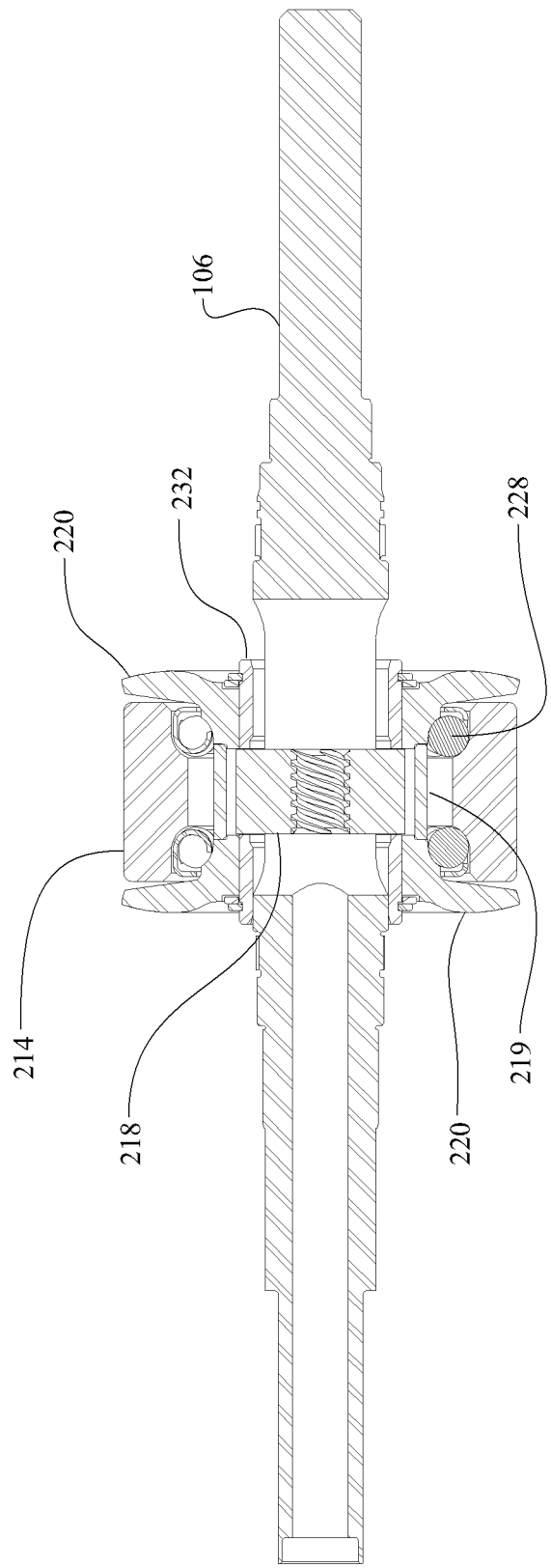
FIG. 2E is a cross-section of one embodiment of the idler subassembly of FIG. 2C as implemented with other components of the CVT shown in FIG. 1.

In the embodiment shown in FIG. 2A, the support member 214 rides on bearing balls 228 that are positioned between the support member 214 and the shift cams 220. In some instances, for description purposes only, the power roller 202, power roller axle 226, leg 224, and cam roller 222 are referred to collectively as the power roller-leg assembly 230. Similarly, at times, the support member 214, shift cams 220, support member bushing 232, shift rod nut collar 219, and other components related thereto, are referred to collectively as the idler assembly 234. FIGS. 2C-2D show one embodiment of the idler assembly 234. In addition to components already mentioned above, the idler assembly 234 in some embodiments includes retaining rings 244 and thrust washers 246. The retaining rings 244 fit in snap ring grooves of the support bushing 232, and the thrust washers 246 are positioned between the retaining rings 244 and the shift cams 220. In some embodiments, as shown in FIG. 2D, the ball bearings 228 may be encased in bearing cages 248. FIG. 2E shows the idler assembly assembled on the main axle 106.

Figure 3A:
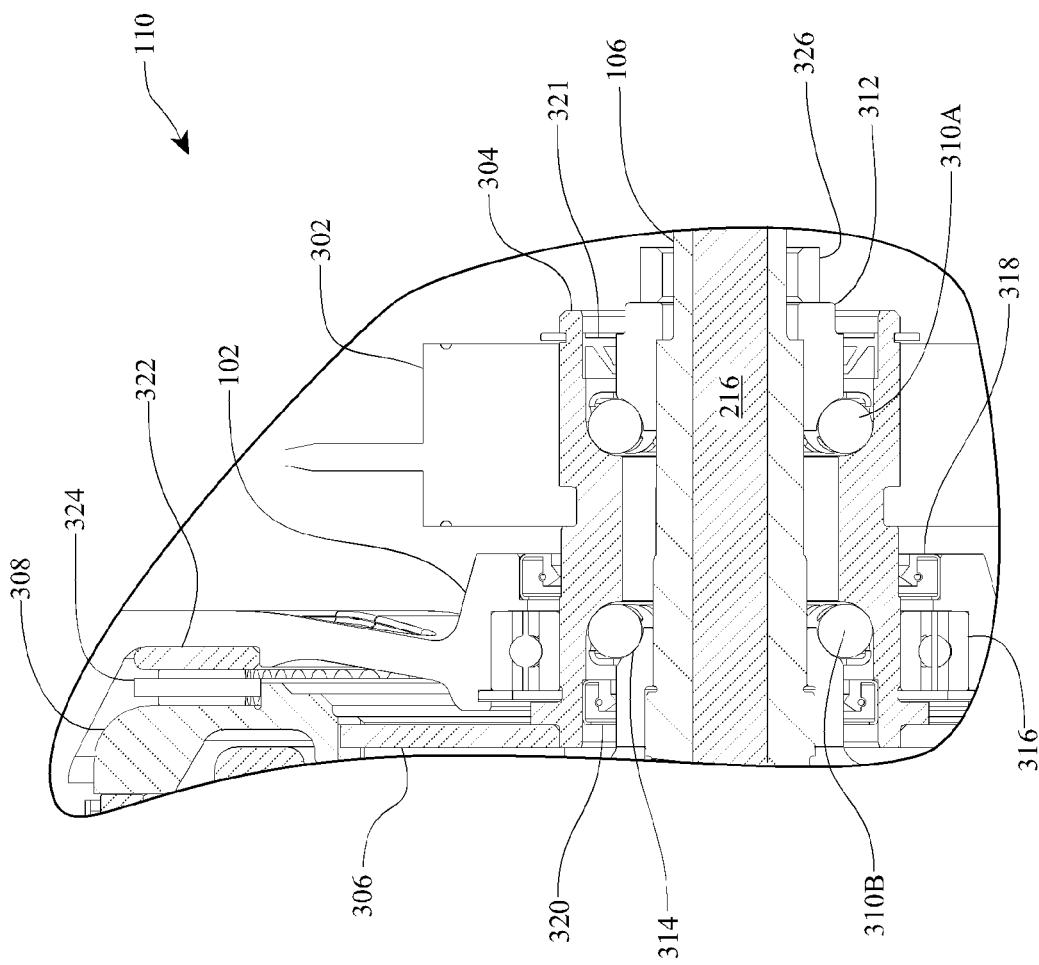
FIG. 3A is a detail view B, of the cross-section shown in FIG. 1, generally illustrating a power input subassembly.
Figure 3B:
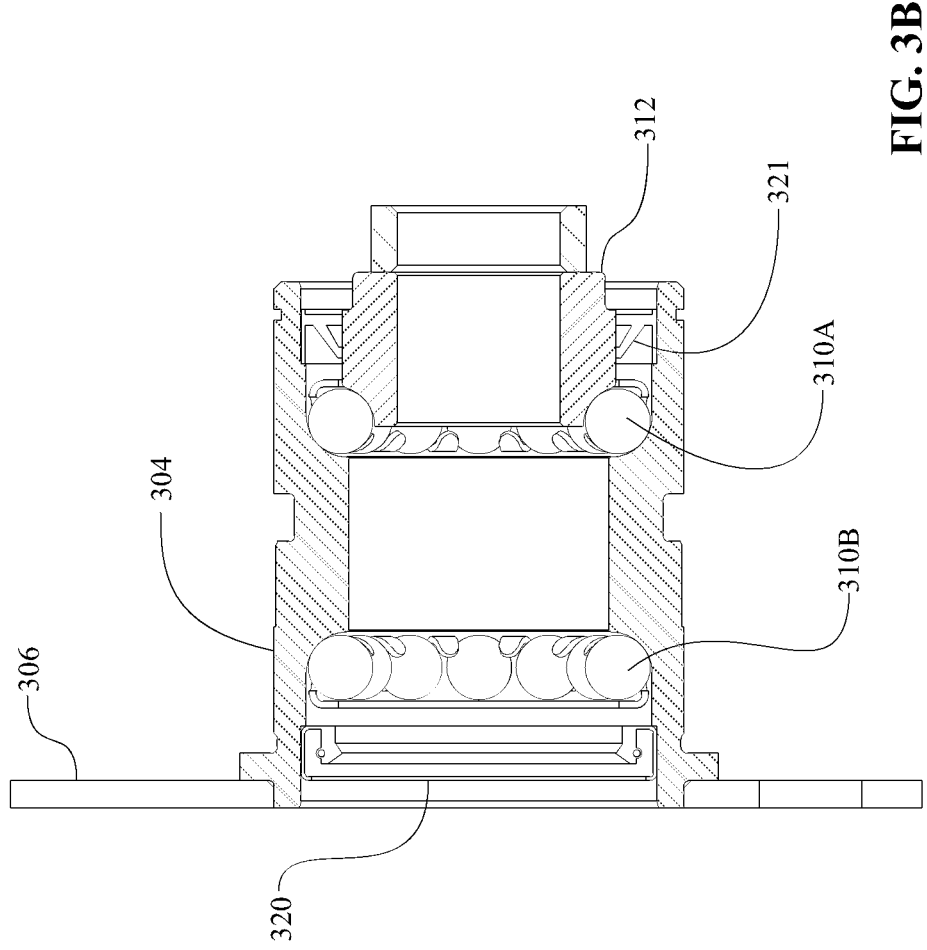
FIG. 3B is a perspective, cross-sectional view of certain CVT components shown in FIG. 3A.
Figure 3C:
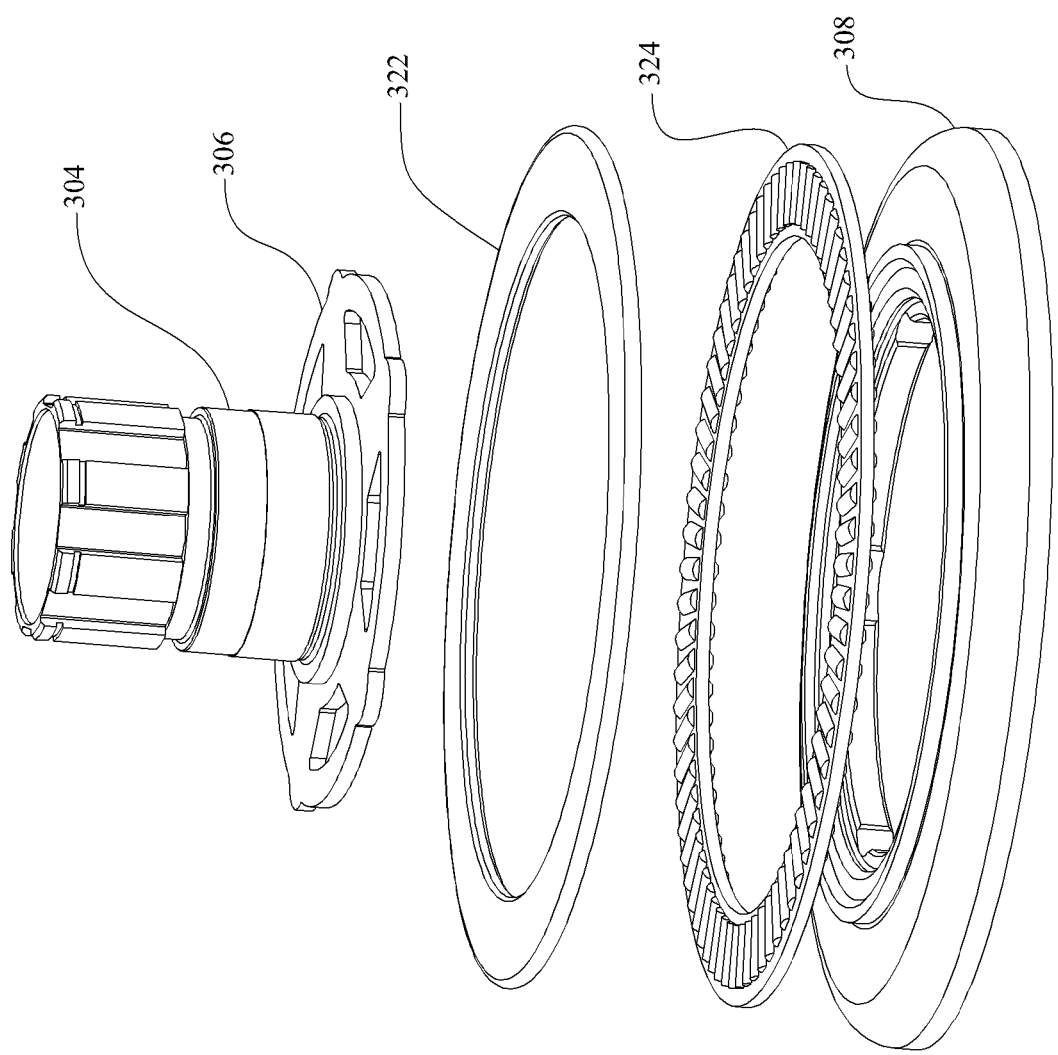
FIG. 3C is a cross-sectional view of certain components of the power input subassembly shown in FIG. 3A.

Turning now to FIGS. 3A-3C, one embodiment of a power input subassembly 110 is depicted and will be described now. In one embodiment, the input subassembly 110 includes a freewheel 302 that couples to one end of an input driver 304. In some embodiments, the freewheel 302 can be a one-way clutch, for example. A torsion plate 306 couples to another end of the input driver 304. A cam driver 308 couples to the torsion plate 306. In the embodiment shown, the cam driver 308 and the torsion plate 306 have mating splines and the cam driver 308 mounts coaxially with the torsion plate 306.

In the embodiment illustrated, the input driver 304 rides on ball bearings 310A, 310B. One set of ball bearings 310A rides on a race provided by a bearing nut 312. A second set of ball bearings 310B rides on a race provided by a bearing race 314. The bearing nut 312 and the bearing race 314 fit over the main axle 106. In one embodiment, the bearing nut 312 threads onto the main axle 106, while the bearing race 314 is pressed fit onto the main axle 106. As shown in FIG. 3A, the input driver 304, the bearing nut 312, and the bearing race 314 are configured to provide the functionality of, for example, angular contact bearings.

The shell 102 rides on a radial ball bearing 316, which is supported on the input driver 304. A seal 318 is placed between the shell 102 and the input driver 304. A seal 320 is placed between the bearing race 314 and the input driver 304. Another seal 321 is placed between the input driver 304 and the bearing nut 312. To react certain axial loads that arise in the CVT 100, interposed between the cam driver 308 and the shell 102 there is a thrust washer 322 and a needle roller bearing 324. In this embodiment, the shell 102 is adapted to transmit torque into or out of the CVT 100. Hence, the shell 102, in certain embodiments, can be configured to both transfer torque and to react axial loads, since the thrust washer 322 and/or the needle roller bearing 324 transmit axial force to the shell 102.

Figure 4A:
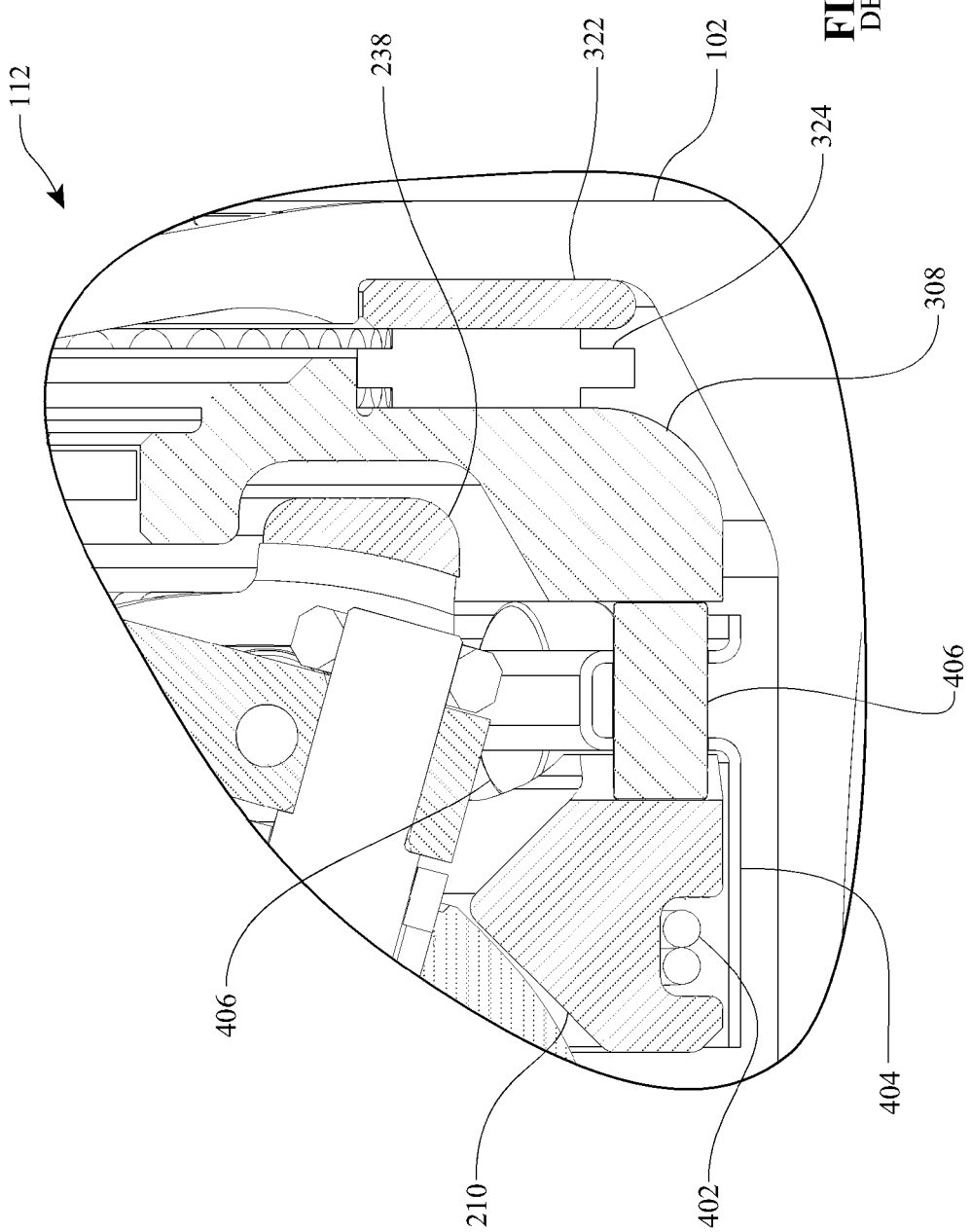
FIG. 4A is a detail view C, of the cross-section shown in FIG. 1, generally showing an input side axial force generation subassembly.

Referencing FIGS. 4A-4B now, one embodiment of an input-side axial force generation subassembly (input AFG) 112 will be described now. The input AFG 112 includes a cam driver 308 in contact with a number of load cam rollers 406. The load cam rollers 406 are positioned and supported by a roller cage 404. The rollers 406 also contact a set of ramps 420 that are, in this embodiment, integral with the input traction ring 210 (see FIG. 4B for an illustration of exemplary ramps 420). As the cam driver 308 rotates about the main axle 106, the cam driver 308 causes the rollers 406 to ride up the ramps 420. This roll-up action energizes the rollers 406 and thereby generates an axial force, as the rollers 406 are compressed between the cam driver 308 and the ramps 420. The axial force serves to clamp, or urge the input traction ring 210 against, the power rollers 202. In this embodiment, the axial force generated is reacted to the shell 102 through a needle bearing 324 and a thrust washer 322; in some embodiments, however, the thrust washer 322 is not used, but rather an equivalent bearing race can be provided integral to the shell 102. As illustrated, the needle bearing 324 is placed between the load cam driver 308 and the thrust washer 322. Preferably, the surfaces of the thrust washer 322 in contact with the shell 102 and the needle bearing 324 are flat. In some embodiments, the needle bearing 324 includes needles having profiles on the surfaces in contact with the thrust washer 322 and the load cam driver 308. In one embodiment, the needles of the needle bearing 324 have a straight, center portion and radiused, or curved, end portions (not shown).

Figure 5:
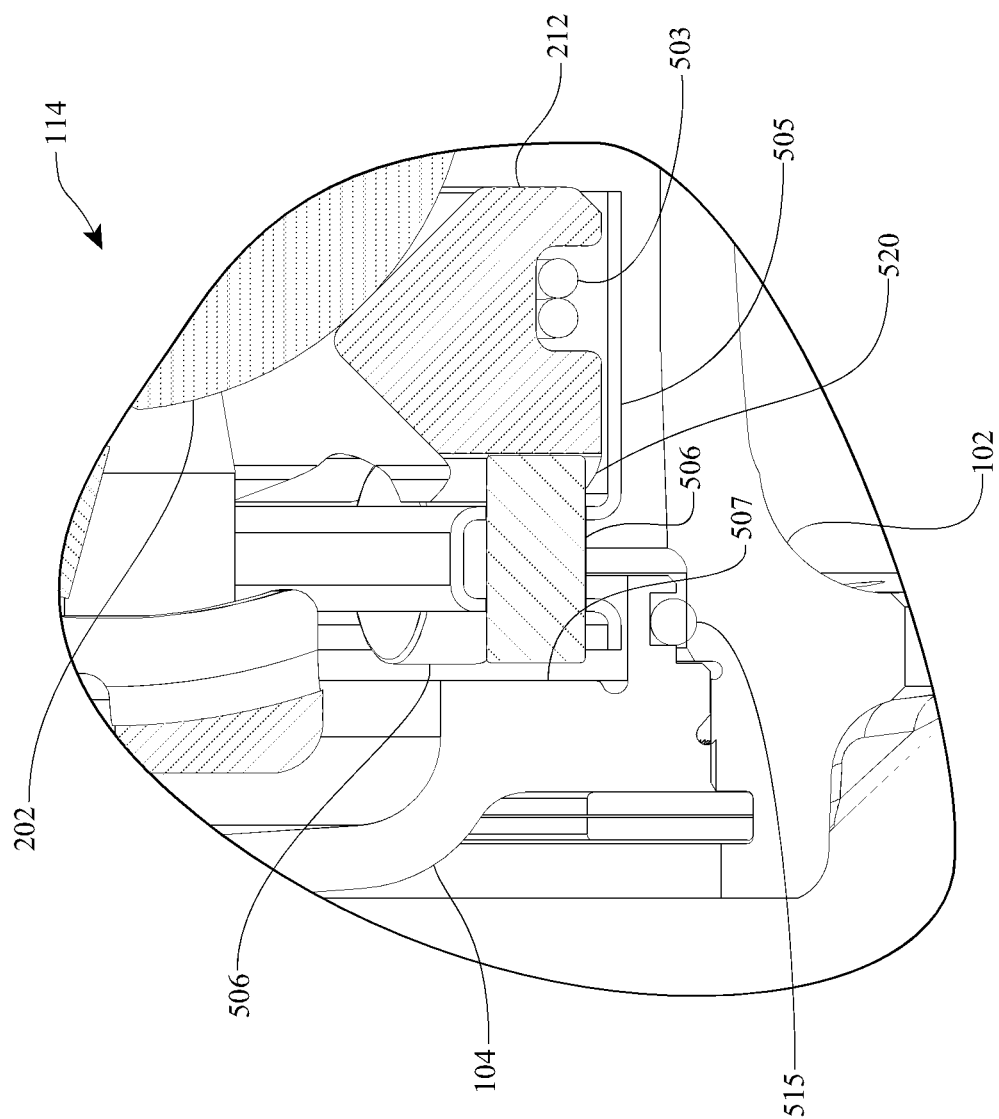
FIG. 5 is a detail view D, of the cross-section shown in FIG. 1, generally showing an output side axial force generation subassembly.

Turning to FIG. 5 now, one embodiment of an output-side axial force generation subassembly (output AFG) 114 is shown. A set of load cam rollers 506, similar to the load cam rollers 406 discussed above, is positioned and supported in a roller cage 505, which is similar to the roller cage 404. The rollers 506 are interposed between the output traction ring 212 and the shell cover 104. In some embodiments the number of load cam rollers 506 retained in the roller cage 404 can be between 8 and 16. In some embodiments, a surface 507 of the shell cover 104 is adapted to react the rollers 506. In one embodiment, the reaction surface 507 is flat; however, in other embodiments, the reaction surface 507 has load cam ramps, such as ramps 420. FIG. 5 shows a gap between the rollers 506 and the shell cover 104; however, after assembly of the CVT 100, the gap closes as the torsion springs 402, 503 cause the rollers 406, 506 to ride up ramps 420, 520 on the input traction ring 210 and output traction ring 212, respectively. Once the output traction ring 212 rotates about the main axle 106 under torque transfer from the power roller 202, the rollers 506 travel further up the ramps 520, which generates additional axial force as the rollers 506 are further compressed between the output traction ring 212 and the shell cover 104.

Figure 6:
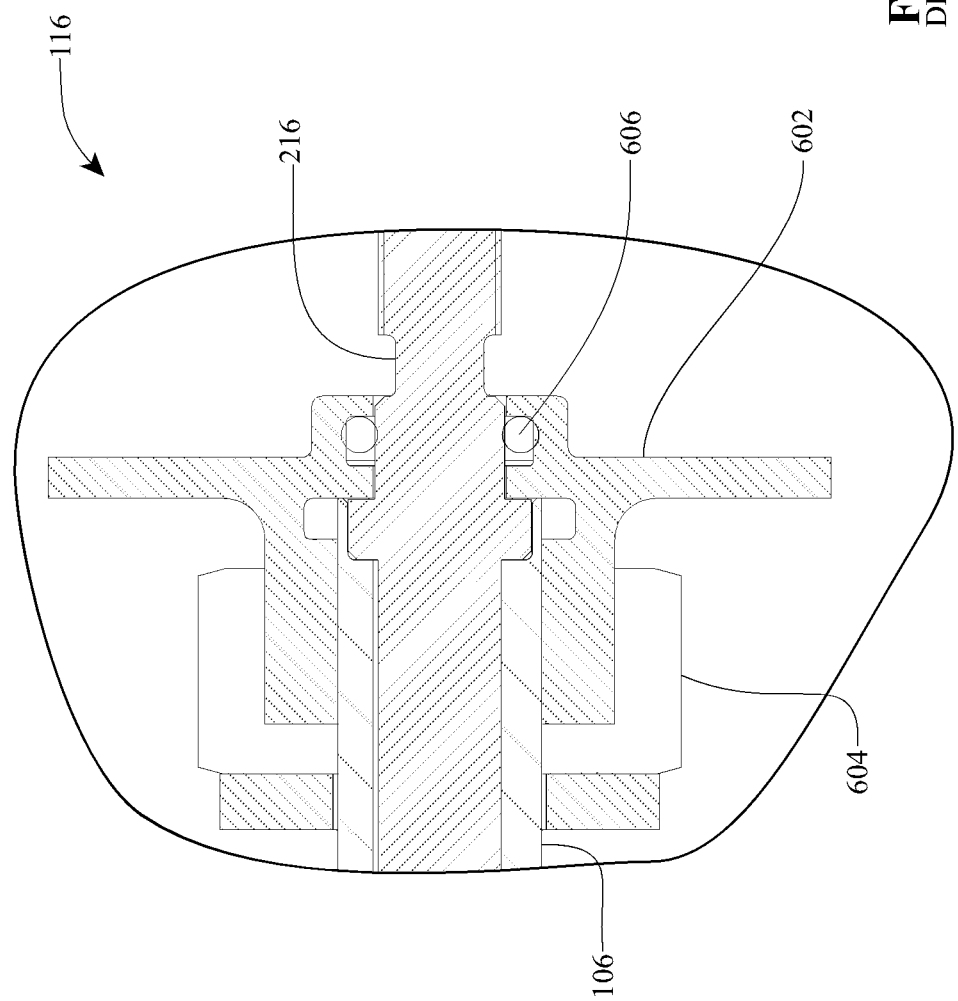
FIG. 6 is a detail view E, of the cross-section shown in FIG. 1, generally showing a shifter interface subassembly for a CVT.

A shifter and/or shift rod interface subassembly 116 will be described now with reference to FIG. 6. The shifter interface 116 serves, among other things, to cooperate with a shifting mechanism (not shown) to actuate the shift rod 216 for changing the transmission ratio of the CVT 100. The shifter interface 116 also serves to retain the shift rod 216 and constrain the axial displacement of the shift rod 216. In the embodiment illustrated, the shifter interface 116 includes a shift rod retainer nut 602 adapted to receive the shift rod 216 and to mount about the main axle 106. The shifter interface 116 can also include a nut 604 adapted to be threaded on the shift rod retainer nut 602 for, among other things, coupling the main axle 106 to a dropout (not shown) of a bicycle and to prevent the shift rod retainer nut 602 from unthreading off the main axle 106 during operation of the shifter mechanism. As shown in FIG. 6, the shifter interface 116 can also include an o-ring 606 for providing a seal between the shift rod retainer nut 602 and the shift rod 216.

Referring to FIG. 1, the input assembly 110 allows torque transfer into the variator 108. The input assembly 110 has a sprocket 156 that converts linear motion from a chain (not shown) into rotational motion. Although a sprocket is used here, other embodiments of the CVT 100 may use a pulley that accepts motion from a belt, for example. The sprocket 156 transmits torque to an axial force generating mechanism, which in the illustrated embodiment is an axial force generation assembly 112 that transmits the torque to the input ring 210. The axial force generation mechanism 112 transmits torque from the sprocket 156 to the input ring 210 and generates an axial force that resolves into the contact force for the input disc 210, the balls 202, the idler assembly 234 and the output ring 212. The axial force is generally proportional to the amount of torque applied to the axial force generating mechanism 112. In some embodiments, the sprocket 156 applies torque to the axial force generating mechanism 112 via a one-way clutch (detail not shown) that acts as a coasting mechanism when the CVT 100 spins but the sprocket 156 is not supplying torque.

In the embodiment of FIG. 1, a shift rod 1105 actuates a transmission ratio shift of the CVT 100. The shift rod 1105, coaxially located inside the main shaft 106, is an elongated rod having a threaded end that extends out one side of the main shaft 106 to connect to a shifter interface assembly 116. The other end of the shift rod extends into the idler assembly 234, which mounts generally transversely in the shift rod nut 218, as shown in FIG. 2A. The shift rod nut 218 engages the idler assembly 234 so that the shift rod 1105 can control the axial position of the idler assembly 234.

Figure 7:
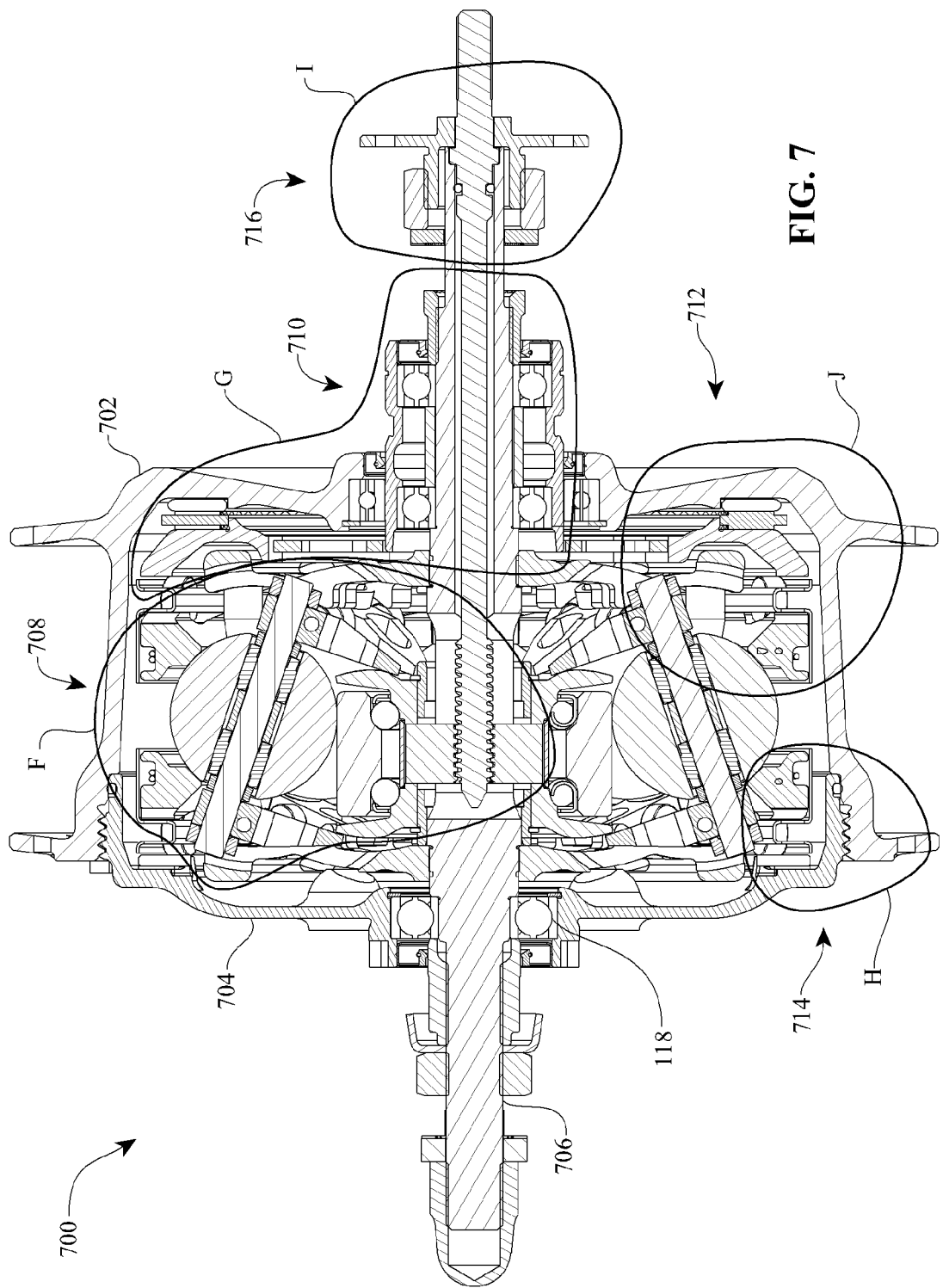
FIG. 7 is a cross-section of yet another embodiment of a continuously variable transmission (CVT).

An alternative embodiment of a CVT 700, and components and subassemblies therefor, will be described now with reference to FIGS. 7-12H. FIG. 7 shows a cross-section view of CVT 700 similar in function to the CVT 100 illustrated and described with reference to FIG. 1. In one embodiment, the CVT 700 includes a shell 702 that couples to a cover 704. The shell 702 and the cover 704 form a housing to enclose most of the components of the CVT 700. A main axle 706 provides axial and radial positioning and support for other components of the CVT 700. The CVT 700 can be described as having a variator subassembly 708 as shown in detail view F, power input subassembly 710 as shown in detail view G, an input-side axial force generation 712 subassembly as shown in detail view J, an output-side axial force generation 714 as shown in detail view H, and a shift rod and/or shifter interface subassembly 716 as shown in detail view I. Alternative embodiments of these subassemblies will be described now in further detail.

Figure 8A:
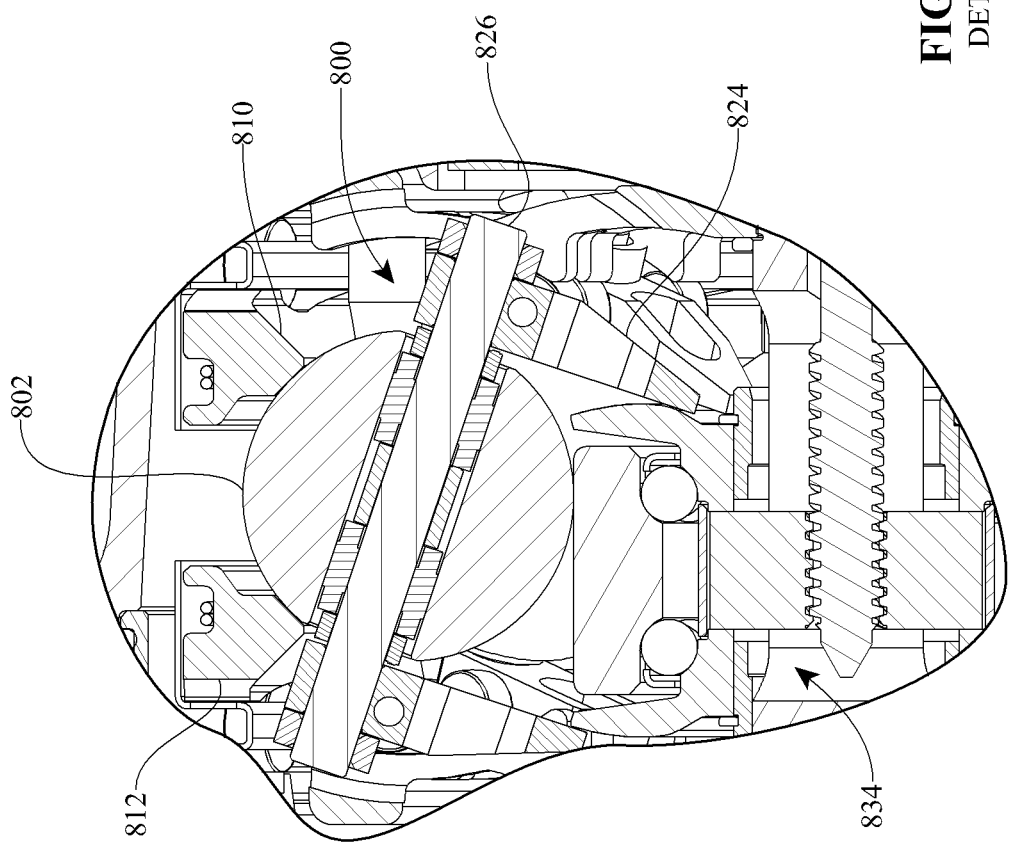
FIG. 8A is a detail view F, of the cross-section shown in FIG. 7, showing generally a variator subassembly.

Referencing FIG. 8A, in one embodiment, the subassembly 708 includes a number of traction power rollers 802 placed in contact with an input traction ring 810, output traction ring 812, and an idler subassembly 834. Various embodiments of a power roller-leg assembly 800 and associated components are shown and described with reference to FIGS. 8B-8I.

One embodiment of the power roller-leg assembly 800 is illustrated in FIGS. 8B and 8C. The power roller-leg assembly 800 includes the traction power roller 802 supported on needle roller bearings 804 and a roller axle 826 having, in one embodiment, a constant diameter along the length of the roller axle 826. Spacers 806 are placed on each end of the roller bearings 804, and one of the spacers 806 is located between the roller bearings 804. The ends of the roller axle 826 extend beyond legs 824 and receive skew rollers 808. The skew rollers 808 can be secured by a retaining washer 830 pressed onto the roller axle 826. The legs 824 can be adapted to support shift guide rollers 809, which (among other things) provide a reaction surface to support a tilt motion of the power roller-leg assembly 800 when the transmission ratio of the CVT 700 is adjusted.

Passing to FIGS. 8D and 8E, alternative ways to retain the skew roller 808 onto the roller axle 826 will be described now. The skew roller 808 can be retained with a clip 832A fixed to the roller axle 826 in a groove 832B formed into the roller axle 826, as shown in FIG. 8D. Alternatively, as shown in FIG. 8E, the skew roller 808 can be retained on the roller axle 826 by deforming the ends of the roller axle 826 to create a cap 836. The cap 836 can be manufactured with an orbit forming technique well known in the relevant technology, for example. In some embodiments, the leg 824 is constructed to enclose substantially most of the end of the roller axle 826, as illustrated in FIG. 8F. In this latter embodiment, the roller axle 826 is not provided with the skew rollers 808 as the leg 824 can directly provide the skew support function. The skew roller 808 shown in FIGS. 8D and 8E are generally cylindrical with a central through bore mating with the roller axle 826.

Figure 8G:
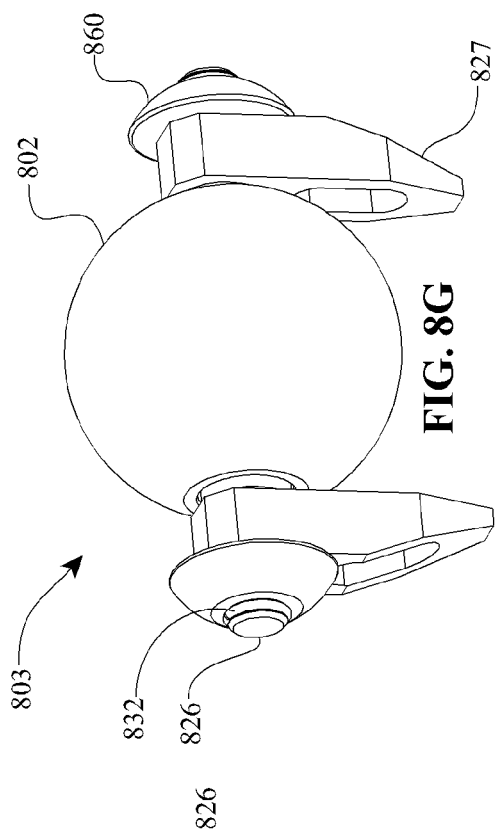
FIGS. 8G-I are perspective and cross-sectional views of an alternative embodiment of certain components of the variator subassembly shown in FIG. 8A.
Figure 8I:
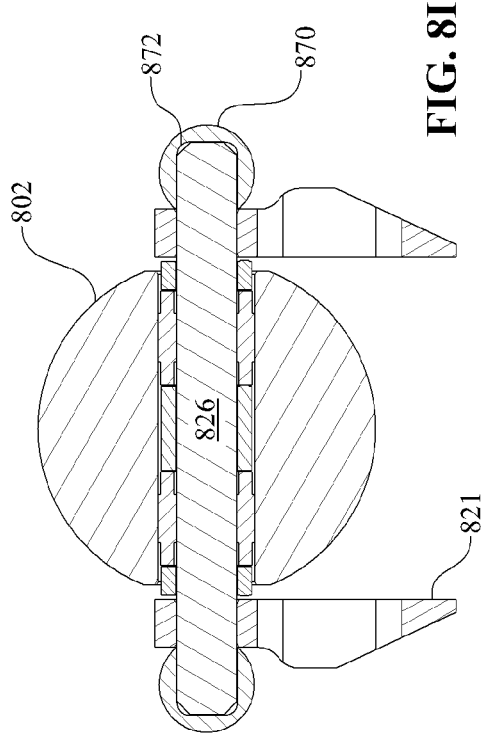
Figure 8F:
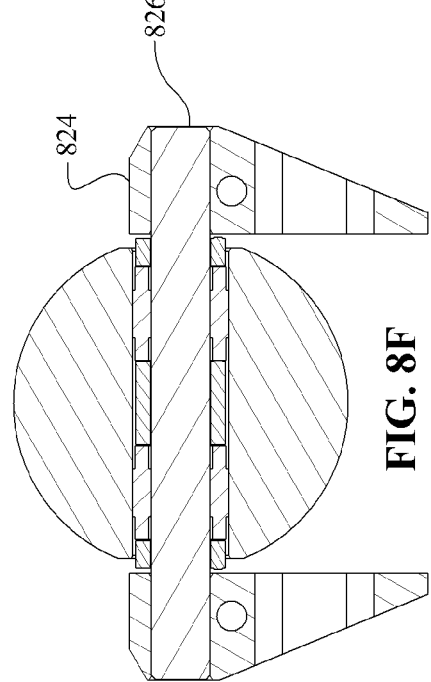
FIG. 8F is a perspective, cross-sectional view of an alternative embodiment of certain components of the variator subassembly shown in FIG. 8A.
Figure 8H:
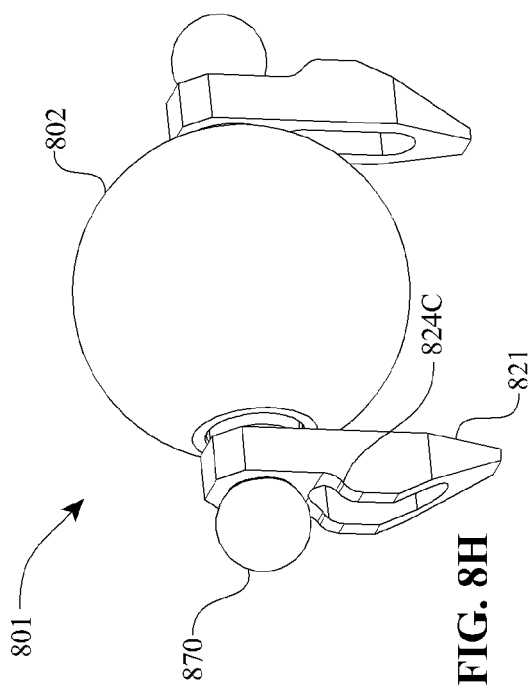

Referring now to FIGS. 8G-8I, in one embodiment, a skew-shift reaction roller 860 includes a generally toriconical-shaped external surface and a central through bore, which central bore facilitates mating the skew-shift reaction roller 860 with the roller axle 826. In some embodiments, the skew-shift reaction roller 860 can be retained on the roller axle 826 with, for example, a clip 832. The skew-shift reaction roller 860 is preferably configured to provide simultaneously the support for reactions forces that arise from shifting and for reaction forces that arise from the phenomenon of skew. As discussed below with reference to FIGS. 8T and 8U, a carrier 862 can be configured to cooperate with the skew-shift reaction roller 860 so that the reaction forces from shifting and skewing can be reacted by a single skew-shift reaction roller 860, rather than a combination of (for example) a skew roller 808 and a shift guide roller 809. Hence, a leg 827 that can be used with the skew-shift reaction roller 860 need not be provided with a bore 823 (see FIG. 8C) for receiving an axle (not shown) for supporting the shift guide roller 809. In some embodiments, a skew-shift roller 870 can be generally spherical with a countersunk bore 872 to mate with the roller axle 826, as shown in FIGS. 8H and 8I. The leg 821 in this embodiment can include a filleted shoulder 824C to provide clearance for the skew-shift roller 870.

Referencing FIGS. 8K-8M now, in one embodiment a leg 824A can be a body having one end 850 and a second end 852, a roller axle bore 841, a guide roller axle bore 842, a shift cam guide surface 845, and a tapered side surface 843. In the embodiment illustrated in FIGS. 8K-8J, the roller axle bore 841 is substantially perpendicular to the guide roller bore 842 and parallel to the central bore 844. In some embodiments, the tapered side surface 843 has very little taper (in some instances even no taper at all) and is substantially parallel to the shift cam guide surface 845; in other embodiments, the tapered side surface 843 is angled relative to the shift cam guide surface 845, resulting in the end 850 having a width 851 larger than a width 853 of the second end 852. In some embodiments, the end 850 and the tapered surface 845 can include chamfers 847, 848 and 846, as shown in FIG. 8J. The length of the roller axle bore 841 can be adjusted in embodiments of power roller-leg assemblies using the skew rollers 808 as illustrated in FIGS. 8B-8E and 8G-8I; however, in some embodiments, the power roller-leg assemblies do not use the skew rollers 808, as illustrated in FIG. 8F. In another embodiment, the leg 824B, shown in FIGS. 8L and 8M, includes a face 860 located near one end 850 that is in contact with the stators 236 and 238. Preferably, the power roller-leg assemblies 800 are configured to maintain geometric compatibility with the associated interfaces in the variator assembly 708.

Figures 8N, 8P:
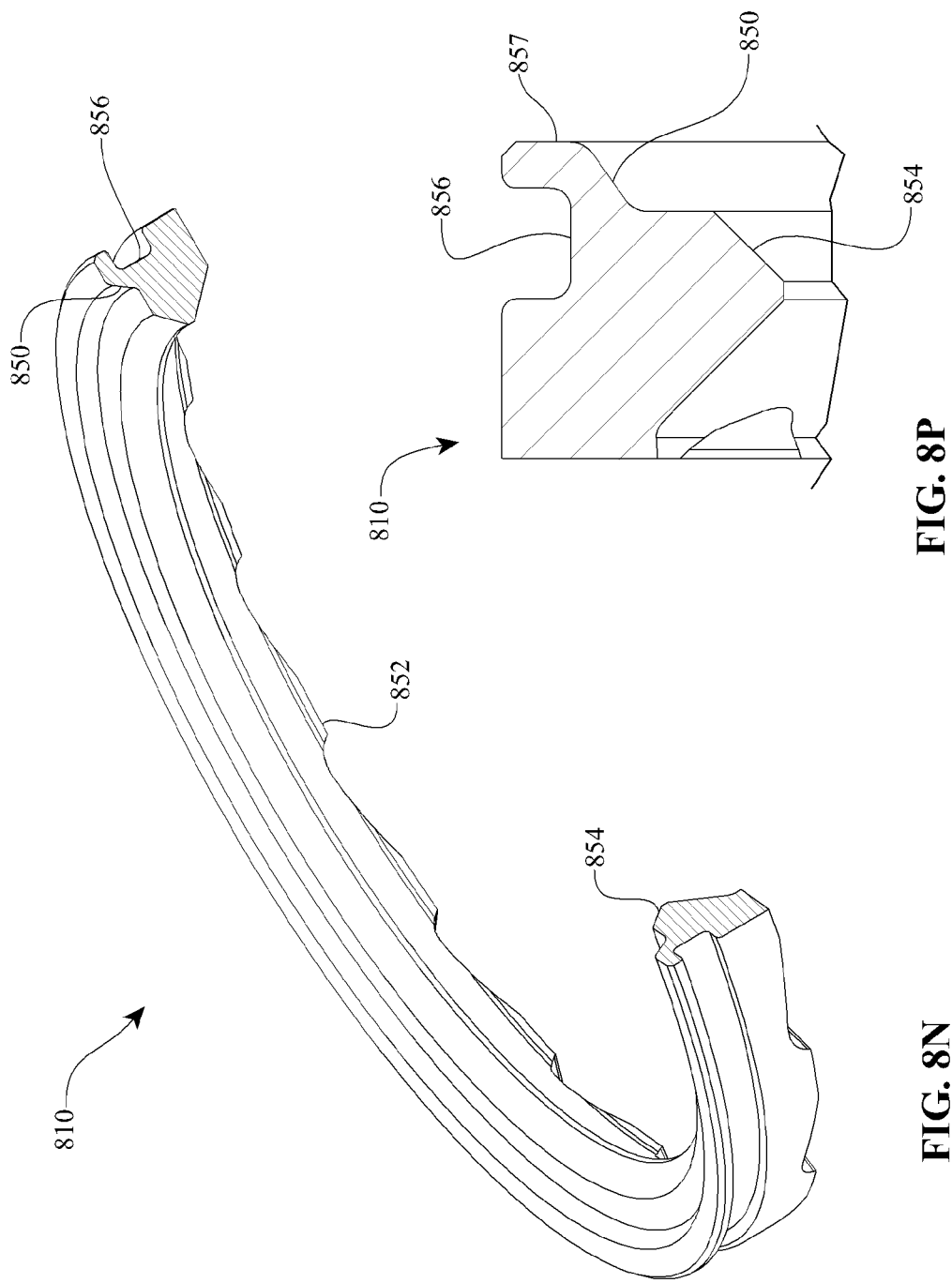
FIG. 8N is a perspective, cross-sectional view of one embodiment of a traction ring.
FIG. 8P is a cross-sectional view of the traction ring of FIG. 8I.

Passing to FIGS. 8N-8P now, in one embodiment a traction ring 810 is similar to the traction ring 812. The traction ring 810 can be a generally annular ring having a set of ramps 852 on one side of the traction ring 810. In certain embodiments, the ramps 852 can be unidirectional as shown; however, in other embodiments, the ramps 852 can be bidirectional. A side of the traction ring 810 opposite to the ramps 852 includes a conical, traction or friction surface 854 for transmitting power to or receiving power from the power roller 802. In the embodiment shown in FIGS. 8N-8P, the traction ring 810 includes a recess 856 for receiving and supporting a torsion spring, such as the torsion spring 402, for example. In some embodiments, a step 850 is formed into the traction ring 810 to, among other reasons; reduce the weight of the traction ring 810. In one embodiment, the step 850 is an annular recess that extends from one edge of the traction surface 854 to a lateral surface 857 of the traction ring 810. That is, in some embodiments, the traction surface 854 of the traction ring 810 does not extend to the lateral surface 857.

Turning now to FIGS. 8Q-8U, embodiments of a carrier will be described now. As described previously, and illustrated in FIG. 2B, a carrier 242 can be, among other things, an assembly having stator plates 236 and 238 connected with rods 240 and having, among other attributes, grooves to guide the power roller-leg assembly 230, and can be rigidly connected to a central main axle 706. In other embodiments, carriers 872, 873 depicted in FIGS. 8Q-8S can be used in a substantially similar manner as the carrier 242.

Figure 8Q:
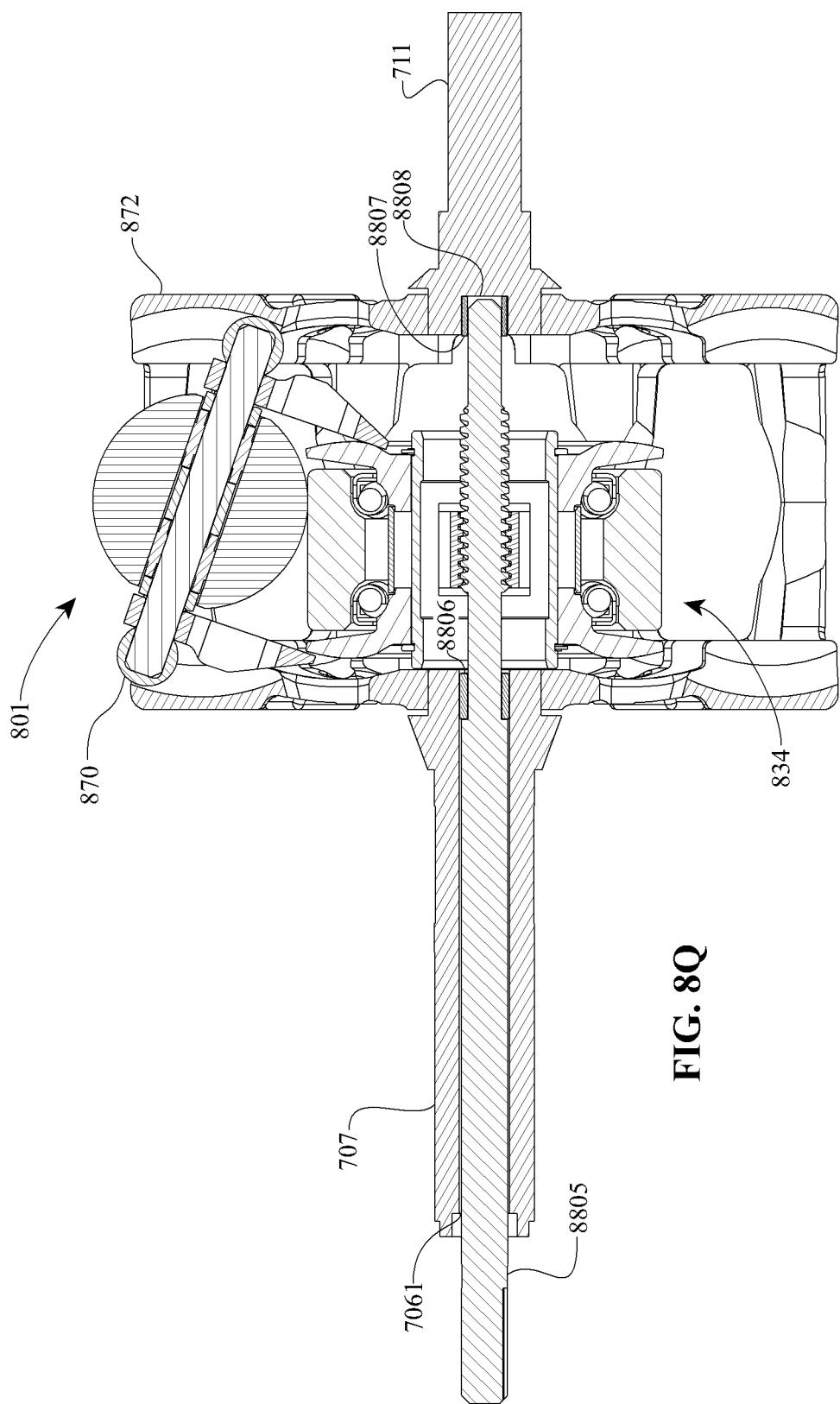
FIG. 8Q is a cross-sectional view of one embodiment of certain components of a variator subassembly.

As shown in FIG. 8Q, the power roller-leg assembly 801 having skew-shift reaction rollers 870 can be configured to cooperate with the carrier 872 and the idler assembly 834. In the embodiment illustrated, a first support axle 707 can be coupled to one side of the carrier 872 and have a central through bore 7061 to allow, among other things, access for coupling the shift rod 8805 with the idler assembly 834; a second support axle 711 is coupled to a second side of the carrier 872. In this embodiment, the shift rod 8805 is used to radially align and support the idler assembly 834 and is supported on one section by a bushing 8806 constrained in the bore of the support axle 707 and on one end by a bushing 8807 constrained in a bore 8808 of the second support axle 711.

The carrier 872, as shown in FIG. 8R, can be a generally cylindrical and hollow body 877 having openings 878 on the circumferential walls of the body 877. In some embodiments, the first and second support axles 707, 711 are formed (for example, by casting) as one integral piece with the body 877. Preferably, the openings 878 are configured to form carrier legs 880 that substantially provide a similar function to the stator rods 240. The openings 878 can be symmetrically arranged around the circumference of the body 877; in some embodiments, the openings 878 are asymmetrically arranged so that an opening 876 provides, among other things, clearance for installing the idler assembly 834. In some embodiments, as shown in FIG. 8S, it is preferable for the openings 881 and 883 to be configured to provide carrier legs 885 which are dimensionally larger than the carrier legs 880 and can structurally strengthen the carrier 872, in particular, the carrier legs 885 are configured to provide torsional strength to the carrier 872. A number of radial grooves 874 can be formed in the carrier 872 to guide the skew-shift rollers 870. In this embodiment, the radial grooves 874 have a substantially hemi-cylindrical profile for mating with the skew-shift rollers 870. The radial grooves 874 react shift and skew forces transmitted by the skew-shift rollers 870 that are generated either while shifting a CVT 700 or operating a CVT 700.

Referring to FIG. 8T, in one embodiment a carrier 862 that can be used with power roller-leg assemblies 803 having skew-shift rollers 860 is described. The carrier 862 includes a generally hollow cylindrical body 889 with openings 866 formed on the circumference of the body 889 to form carrier legs 880 and an access opening 868 and similar in function to carrier 872. Preferably, a number of grooves 864 are formed into the body 889 to guide and otherwise cooperate with the skew-shift rollers 860. The grooves 865 in this embodiment can have a profile that generally conforms to the toriconical shape of the skew-shift rollers 860 with an adequate clearance groove 864 for the roller axle 826. The grooves 864 provide substantially similar function as the grooves 874 for reacting skew and shift forces transmitted by the skew-shift rollers 860. It should be readily apparent to the person having ordinary skill in the relevant technology that embodiments of the carriers 862, 872, and 873 can be modified for use with substantially cylindrical skew rollers 808 and shift guide roller 809 as shown in FIGS. 8B-8E; with the legs 824, 824A, and 824B shown in FIGS. 8F and 8K-8M.

Figure 9A:
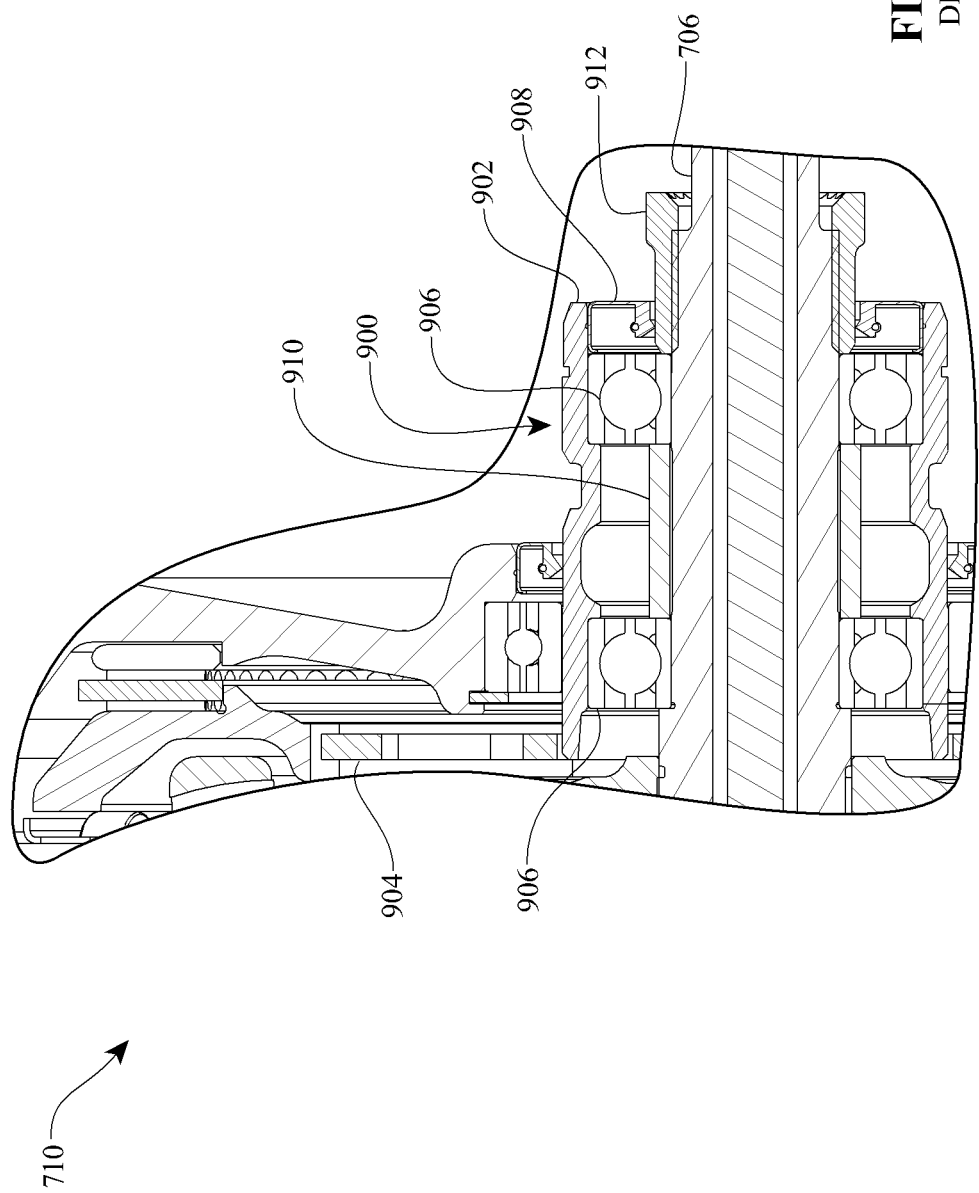
FIG. 9A is a detail view G, of the cross-section shown in FIG. 7, generally illustrating a power input subassembly.
Figure 9B:
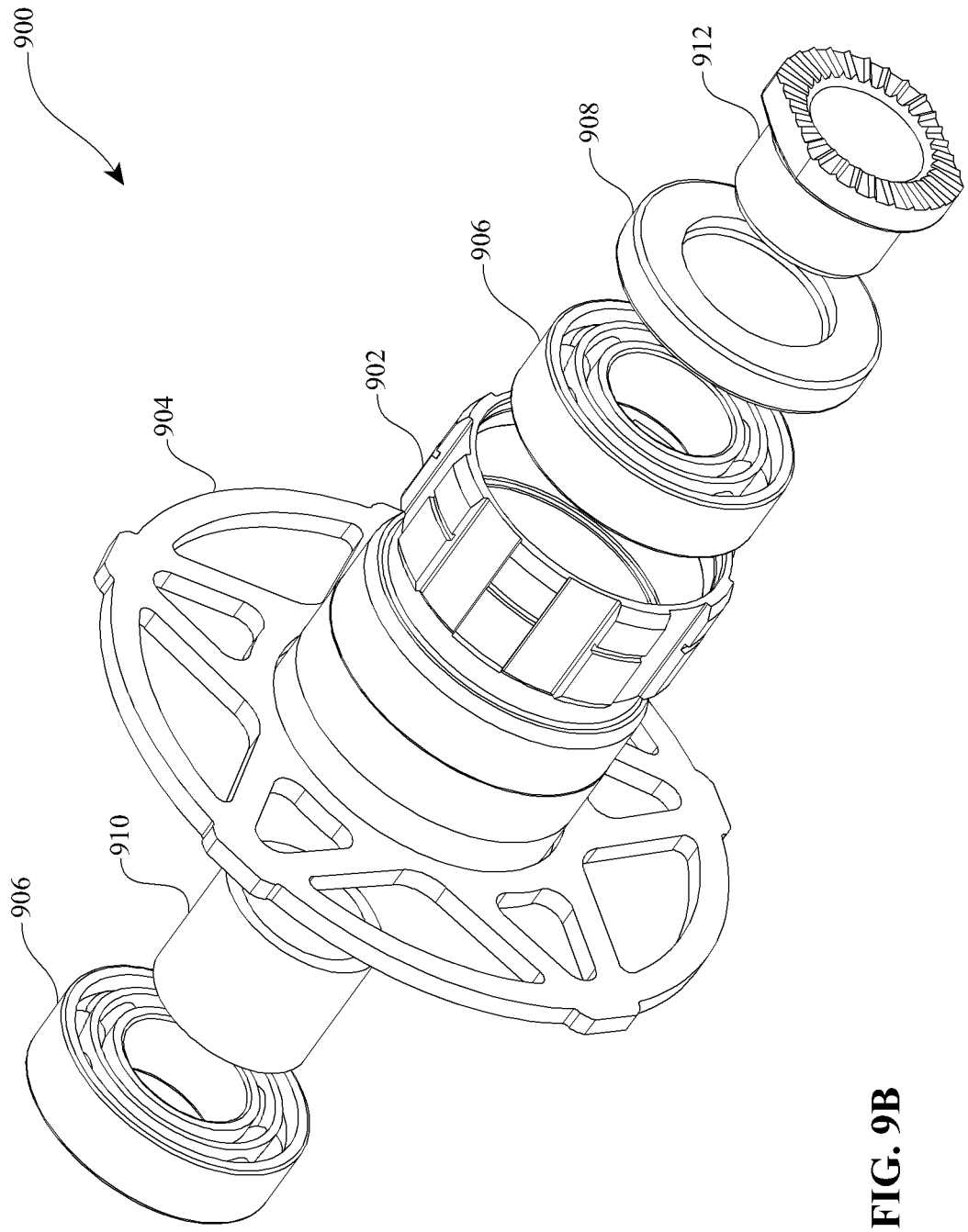
FIG. 9B is a perspective, exploded view of certain components of the power input subassembly shown in FIG. 9A.
Figure 9J:
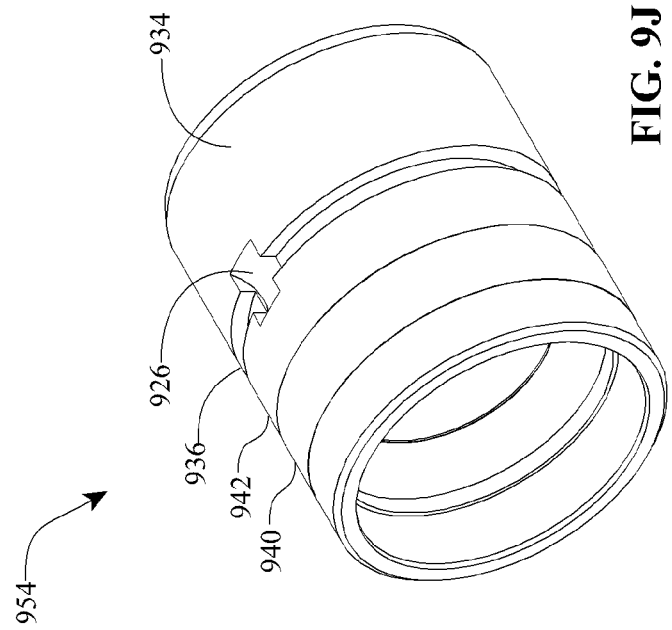
FIG. 9J is a perspective view of an input driver that can be used with the power input subassembly shown in FIG. 9H.
Figure 9H:
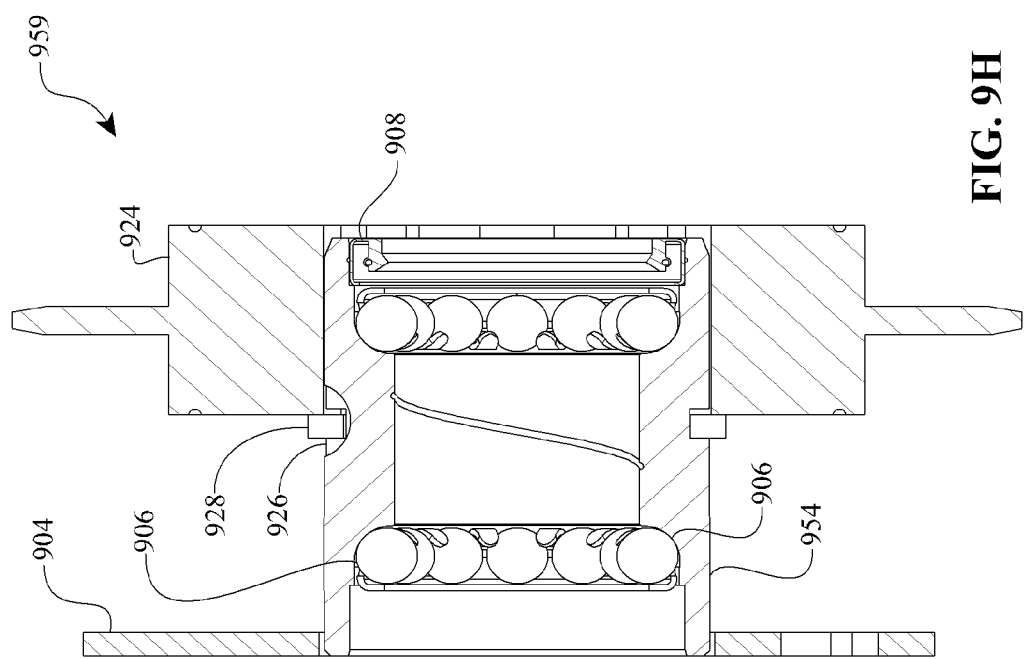
FIG. 9H is a cross-sectional view of yet another alternative power input subassembly.
Figure 9S:
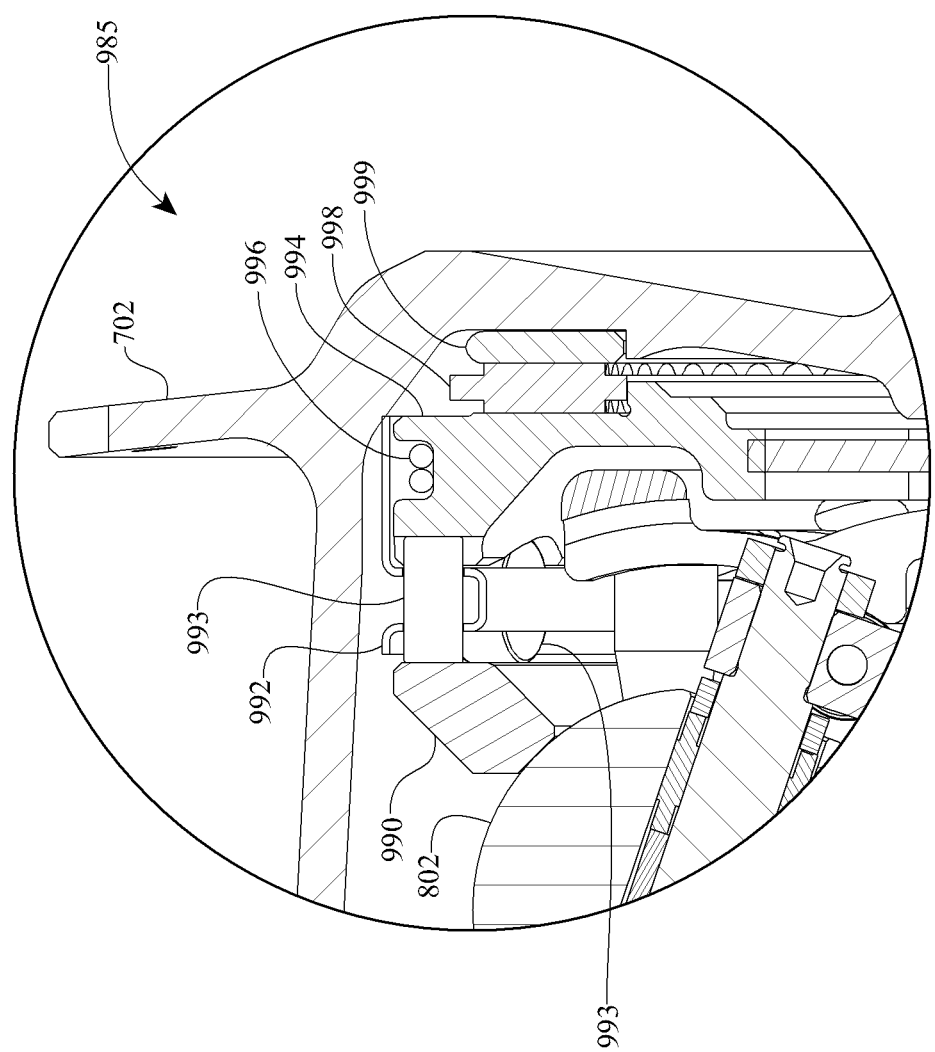
FIG. 9S is a cross-sectional detail view of certain components of an alternative power input subassembly that can be used with the variators described.
Figure 9T:
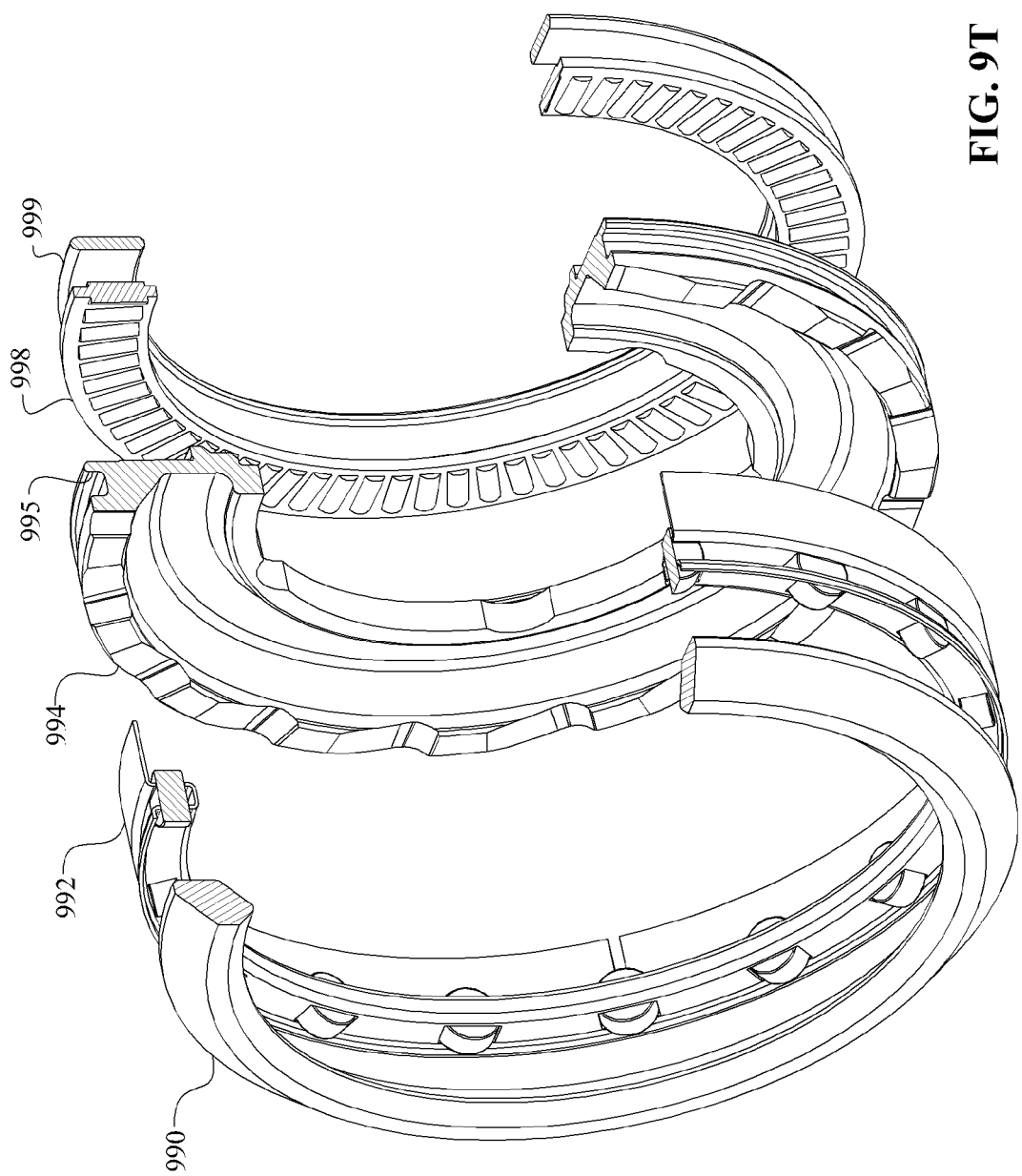
FIG. 9T is a perspective, sectioned, exploded view of certain components of a power input subassembly.
Figure 9X:
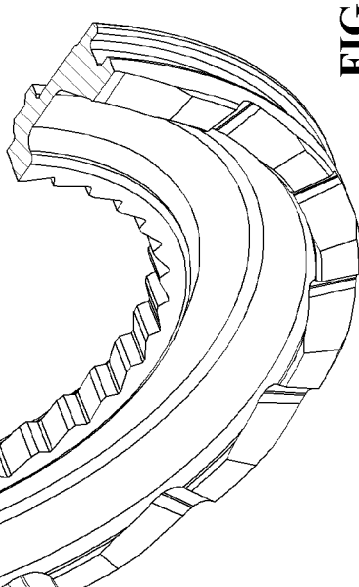
FIG. 9X is a perspective view of an embodiment of a pawl that can be used with the torsion plate of FIG. 9U.

Turning to FIGS. 9A-9T, various embodiments of the power input assemblies 710 are illustrated and will be described now. For descriptive purposes only, an input driver subassembly 900 can include an input driver 902, torsion plate 904, bearings 906, seal 908, spacer 910, and bearing nut 912. In one embodiment, the torsion plate 904 is affixed to the input driver 902, which has cartridge bearings 906 pressed and retained on an inner diameter of the input driver 902 by shoulders 914 and 918 formed into the input driver 902 (see FIG. 9C). A cavity 916 can be formed on the inner diameter of the input driver 902 in order to reduce component weight among other things. A seal 908 is pressed or affixed on the inner diameter of the input driver 902.

As shown in FIG. 9G, in one embodiment an input driver 952 is provided with bearing races 922A and 922B. FIG. 9H shows an embodiment of an input driver assembly 959 having a freewheel 924 threaded onto the input driver 954 and retained with a clip 928. In one embodiment, a slot 926 is formed into the input driver 954. In yet another embodiment, an input driver assembly 956 (shown in FIG. 9K) includes ball bearings 906 with outer races 907. An input driver 958 has chamfers 930A and 930B on the inner diameter to retain the outer races 907 of the ball bearings 906.

FIGS. 9D, 9E, 9G, 9J, and 9L show alternative embodiments of an input driver. As shown in FIG. 9D, in one embodiment the outer diameter of the input driver 902 has splines 932, a groove 936, and bearing surface 940 and seal surface 942. In another embodiment, as shown in FIG. 9J, an outer diameter of an input driver 954 includes a threaded section 934, a groove 936, a key slot 926, and bearing surfaces 940 and seal surface 942. Referencing FIG. 9G, in one embodiment, the inner diameter of the input driver 952 can include bearing races 922A and 922B and a spiral groove 920, which is preferably configured for delivering lubrication to the bearings 906. As illustrated in FIG. 9E, the inner diameter of the input driver 902 can be provided with bearing recesses 944 and 946 for receiving cartridge bearings 906, which can be press fit, for example, onto the bearing recesses 944 and 946. In some embodiments, a groove 916 is formed in the inner diameter of the input driver 902 to reduce weight, among other reasons. In one embodiment, the input driver 902 includes shoulders 914 and 918 to locate the bearings 906. With reference to FIG. 9L, for some applications the inner diameter of an input driver 958 includes a spiral groove 920 between the two chamfers 930A and 930B that retain and locate bearings 906. It should be readily apparent to the person having ordinary skill in the relevant technology that any one specific embodiment of an input driver suitable for use with the transmissions described here can include any combination of aspects described with reference to the various, exemplary embodiments of input drivers described. For example, in one embodiment an input driver can include an outer diameter having the threaded portion 934 and an inner diameter having the bearing races 922A, 922B or, alternatively, the chamfers 930A, 930B.

Passing to FIGS. 9N-9R, various alternative embodiments of a bearing nut will be described now. As shown in FIG. 9A, the bearing nut 912 is positioned relative to the seal 908 in the input driver assembly 900 and threads onto the main axle 706. Various embodiments of the bearing nut can be provided to accommodate seal 908, or other components. In one embodiment shown in FIG. 9M, a bearing nut 913 includes a threaded inner bore 948, a sealing surface 954, and flats 950 in an octagonal, arrangement. The sealing surface 954 is on the outer diameter of the bearing nut 913 and is configured to cooperate with the seal 908. In some embodiments, the sealing surface 954 can also provide an inner bearing race for the input driver assembly 710. As shown in FIG. 9N, in another embodiment, a bearing nut 915 can have a sealing shoulder 954A, parallel flats 952A, a threaded inner diameter 948A; and friction teeth 956. The sealing shoulder 954A is configured to cooperate with the seal 908 in some embodiments. The friction teeth 956 in some embodiments are in contact with a frame or structure, such as the dropouts of a bike frame, and can be used as an anti-rotation member for the main axle 706 during torque reaction. In an another embodiment, shown in FIG. 9P, a bearing nut 917 has a threaded inner bore 948, parallel flats 952, and a sealing surface 954, on the outer diameter of the bearing nut 917. The embodiments of the bearing nut described can be modified to maintain geometric compatibility at the interface between the bearing nut and the frame or a structure, such as dropouts of a bike frame.

Passing now to FIGS. 9Q and 9R, one embodiment of a main axle 706 will be described. The main axle 706 has a first end having a flat 962 and a second end having a flat 964 for, among other things, receiving the mounting bracket, chassis or frame members such as the dropouts of a bicycle, for example. A central portion of the main axle 706 has a through slot 970 for receiving the shift rod nut 218. In certain embodiments, the main axle 706 is provided with a central bore 974 adapted to receive, for example, the shift rod 1105. The central bore 974 need not go through the entire length of the main axle 706. However, in other embodiments, the central bore 974 may extend through the entire length of the main axle 706 for providing, for example, an access port or lubrication port. The main axle 706 also includes knurled or splined surfaces 978 that engage the stator plates 236 and 238. In one embodiment, illustrated in FIG. 9Q, a main axle 709 includes two bearing surfaces 958A and 958B for use with various embodiments of an input driver, such as those shown and described with reference to FIGS. 9D, 9F, and 9G. Referencing FIG. 9R, in an alternative embodiment, a main axle 706 includes two bearing race seats 960A, 960B for use with, for example, input driver embodiments shown in FIGS. 9B, 9C, and 9E. The bearing race seats 960A, 960B are preferably formed to, among other things, retain the inner race of the cartridge bearings 906. In the embodiment illustrated in FIG. 9R, the main axle 706 includes a bearing pilot portion 982 for supporting a bearing 118. The main axle 706 may additionally include a bearing race piloting surface 960A for supporting the bearing race 314 (see FIG. 3A and accompanying text).

Referring to FIG. 9S and FIG. 9T now, an input-side axial force generation assembly 985 can include, among other things, a traction ring 990 in contact with the power roller 802, and a load cam roller cage 992 cooperating with a load cam driver 994. Axial forces generated at the load cam driver 994 are reacted axially by a bearing 998 and thrust washer or race 999, which race 999 is in contact with the shell 702. In one embodiment, a torsion spring 996 can be coupled to the load cam roller cage 992 and to the cam driver 994 for providing preload on the load cam rollers 993. In some embodiments, a groove 995 can be formed on the circumference of the load cam driver 994 to receive, support, and/or house the torsion spring 996.

Figure 9W:
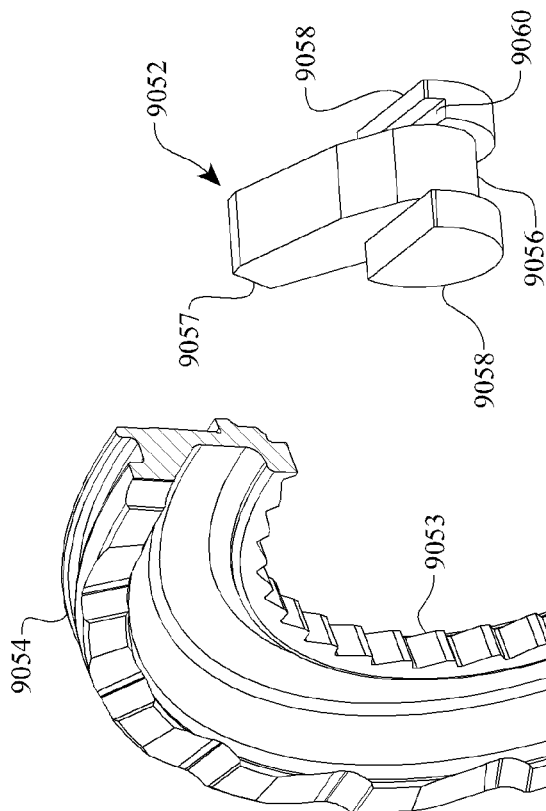
FIG. 9W is a perspective, cross-sectional view of a load cam driver that can be used with the torsion plate of FIG. 9U.
Figure 9U:
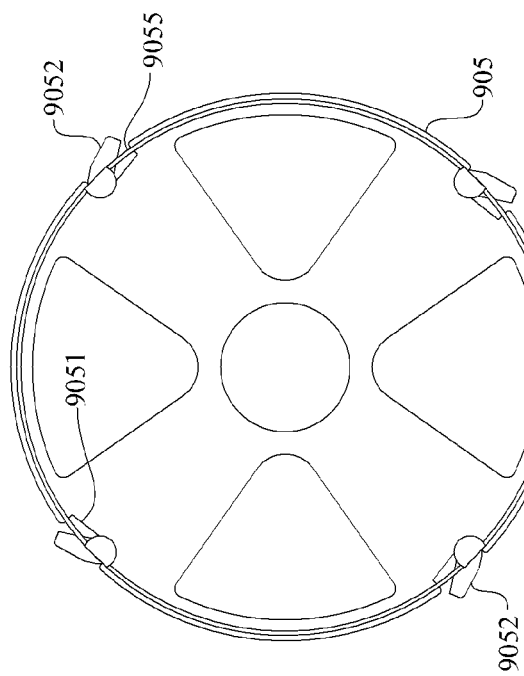
FIG. 9U is a perspective view of an embodiment of a torsion plate that can be used to facilitate an internal freewheel function in a variator.
Figure 9V:
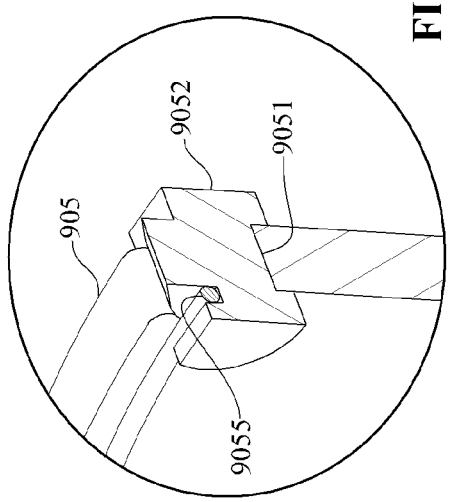
FIG. 9V is a cross-sectional, detailed view of the torsion plate of FIG. 9U.

Referring now to FIGS. 9U-9W, an embodiment of certain components of the power input assembly will be described. A CVT can be provided an internal freewheeling functionality with, among other things, a torsion plate 905 shown in FIG. 9U. The torsion plate 905 is provided with a number of radial slots 9051 configured to receive and support pawls 9052, which are configured to cooperate with a number of internal teeth 9053 formed into, for example, a cam driver 9054 (FIG. 9V); the cam driver 9054 is substantially similar in function to the cam driver 994 but also support the freewheeling of the CVT. In some embodiments, a retaining spring 9055 can be used to energize the pawls 9052. For some applications, it is preferable to have minimal angular rotation before engagement in order to minimize lost motion on the input during operation of the CVT 700. For example, if it is determined that, in a certain application of the CVT 700, the maximum angular rotation of the torsion plate 905 before engagement of the pawls 9052 with the internal teeth 9053 is five degrees, then there are several combinations of the number and radial arrangement of pawls 9052 on the torsion plate 905 and the number of internal teeth 9053. In one embodiment, there can be seventy-two internal teeth 9053 and at least one pawl 9052, or multiple pawls 9052 arranged symmetrically on the torsion plate 905 so that all pawls 9052 in this embodiment engage the internal teeth 9053 simultaneously. In other embodiments, the number of internal teeth may be fewer, such as thirty-six, to facilitate manufacturing, for example, and in this embodiment the pawls 9052 can be arranged asymmetrically so a number of the pawls 9052 will engage the internal teeth 9053 and the remaining pawls 9052 will not be engaged and be positioned radially between two internal teeth 9053. It should be readily apparent to a person having ordinary skill in the relevant technology, that the number of internal teeth 9053 and the number and arrangement of the pawls 9052 are configurable to achieve the desired angular engagement.

Turning now to FIG. 9W, an embodiment of a pawl 9052 will be described. The pawl 9052 can be a body having a pivot end 9056 and an engagement end 9057. On the pivot end 9056 there can be retaining flanges 9058 that couple to the torsion plate 905 in such a way that the pawl 9052 is constrained in the radial slots 9051. In some embodiments, there can be only one retaining flange 9058 on one side of the pawl 9052 and the other side of the pawl can be retained in the radial slot 9051 by the retaining spring 9055. The retaining flanges 9058 are generally "D" shaped, that is there is a flat and a curved portion. The flat portion is in contact with the retaining spring 9055 and positions the pawl 9052 in the radial slot 9051 so that the engagement end 9057 contacts the internal teeth 9053.

Figure 10A:
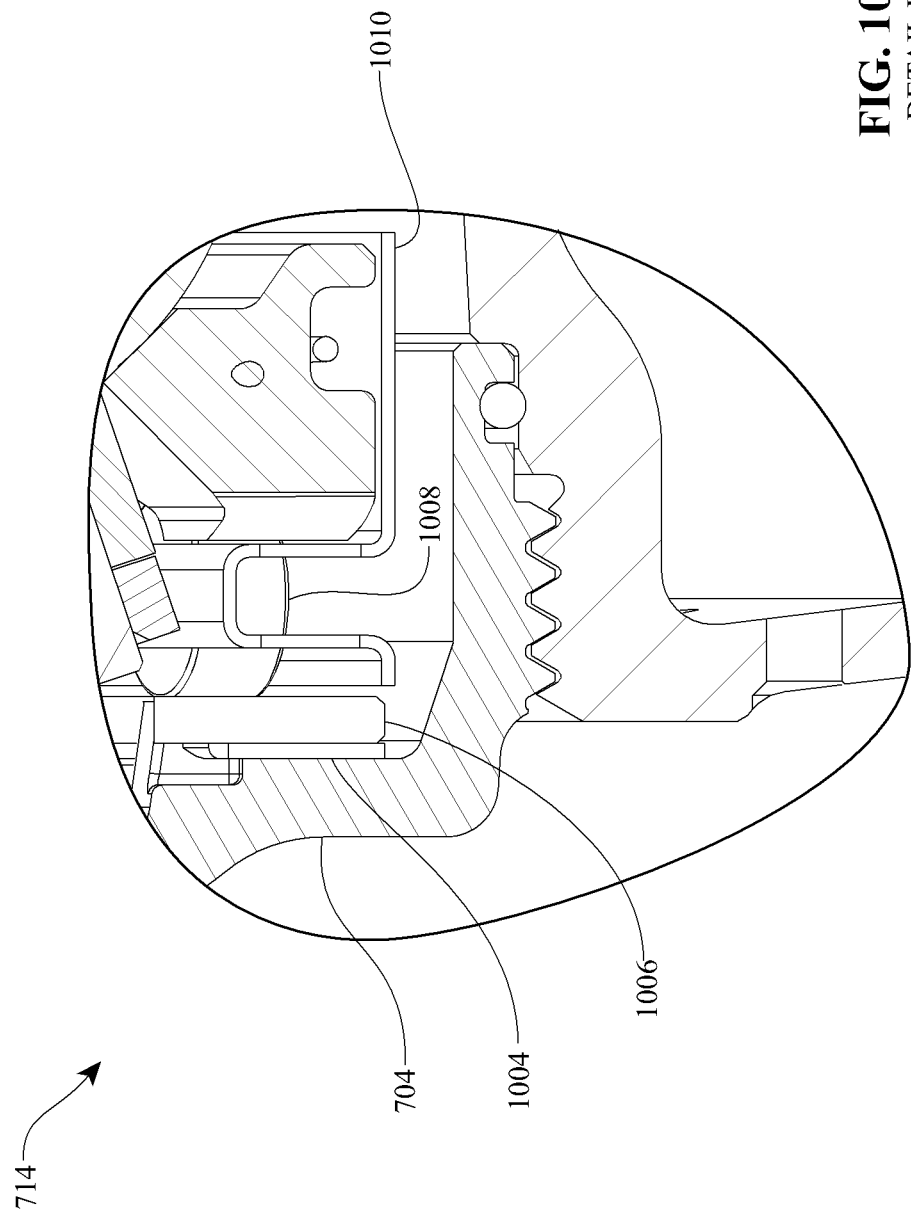
FIG. 10A is a detail view H, of the cross-section shown in FIG. 7, generally showing an output side axial force generation subassembly.
Figures 10B, 10C:
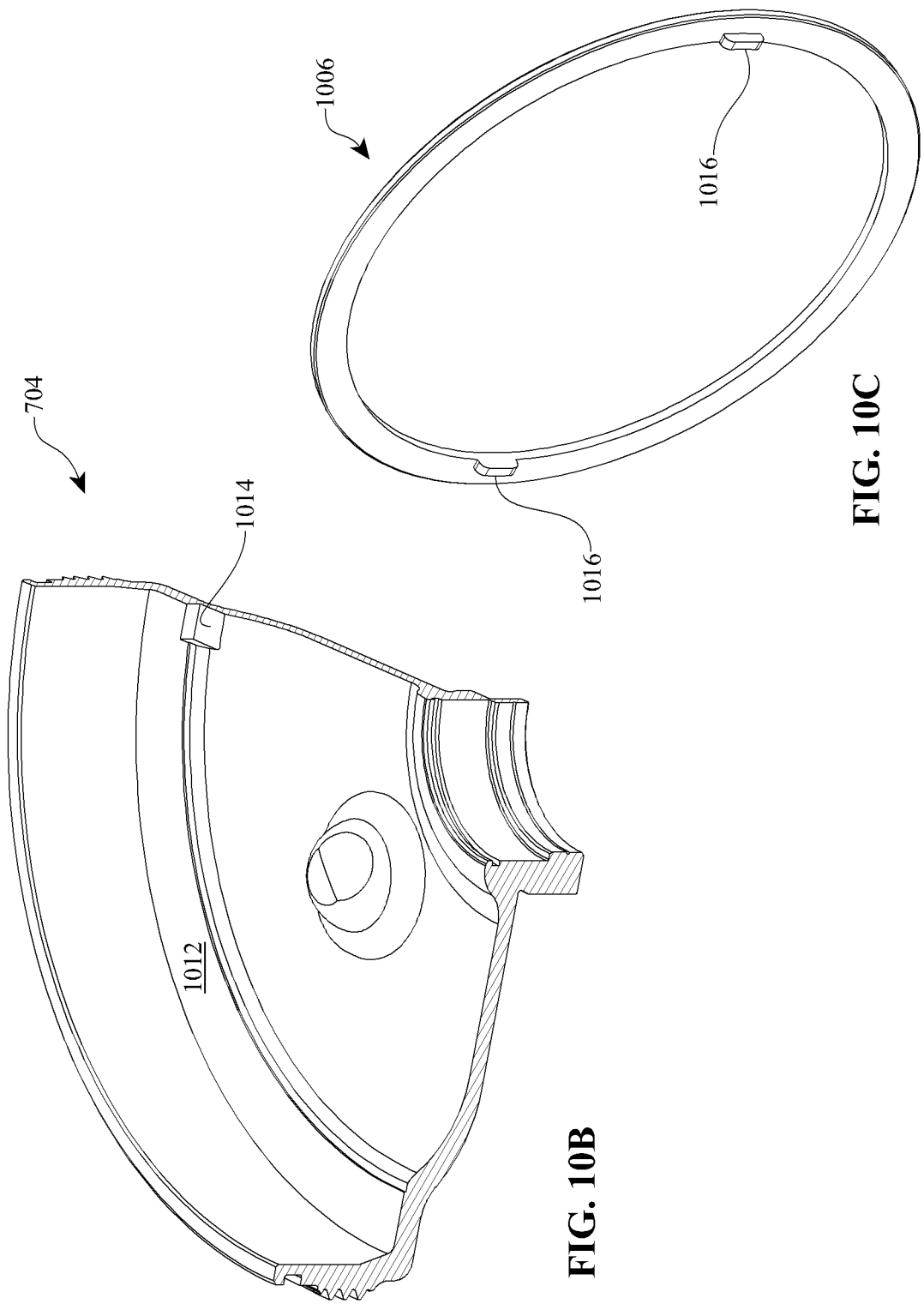
FIG. 10B is a perspective, cross-sectional view of a hub cover that can be used with the subassembly shown in FIG. 10A.
FIG. 10C is a perspective view of certain components of the input side axial force generation subassembly shown in FIG. 10A.

Turning to FIGS. 10A-10C now, one embodiment of an output-side axial force generation subassembly (output AFG) 714 is shown. In one embodiment, the output AFG 714 includes the cover 704, shim 1004, output drive washer 1006, load cam rollers 1008, and roller cage 1010. The shim 1004 is used in some embodiments to adjust the relative axial position of the input and output axial force generation subassemblies 712 and 714.

In some embodiments, referencing FIG. 10C, the cover 704 is made of steel or aluminum and can be provided with a thrust surface 1012 that is configured to contact either the load cam rollers 1008, the output drive washer 1006 or, as depicted in FIG. 10A, the shim 1004. In some embodiments, a slot 1014 can be formed into the cover 704 facilitate alignment and retention of the thrust washer 1006. In one embodiment, a tab 1016 is formed on the output drive washer 1006 and is configured to mate with the slot 1014. In some embodiments, there are two slots 1014 and two tabs 1016. In other embodiments, there can be, for example, four slots and four tabs for alignment.

Figure 11A:
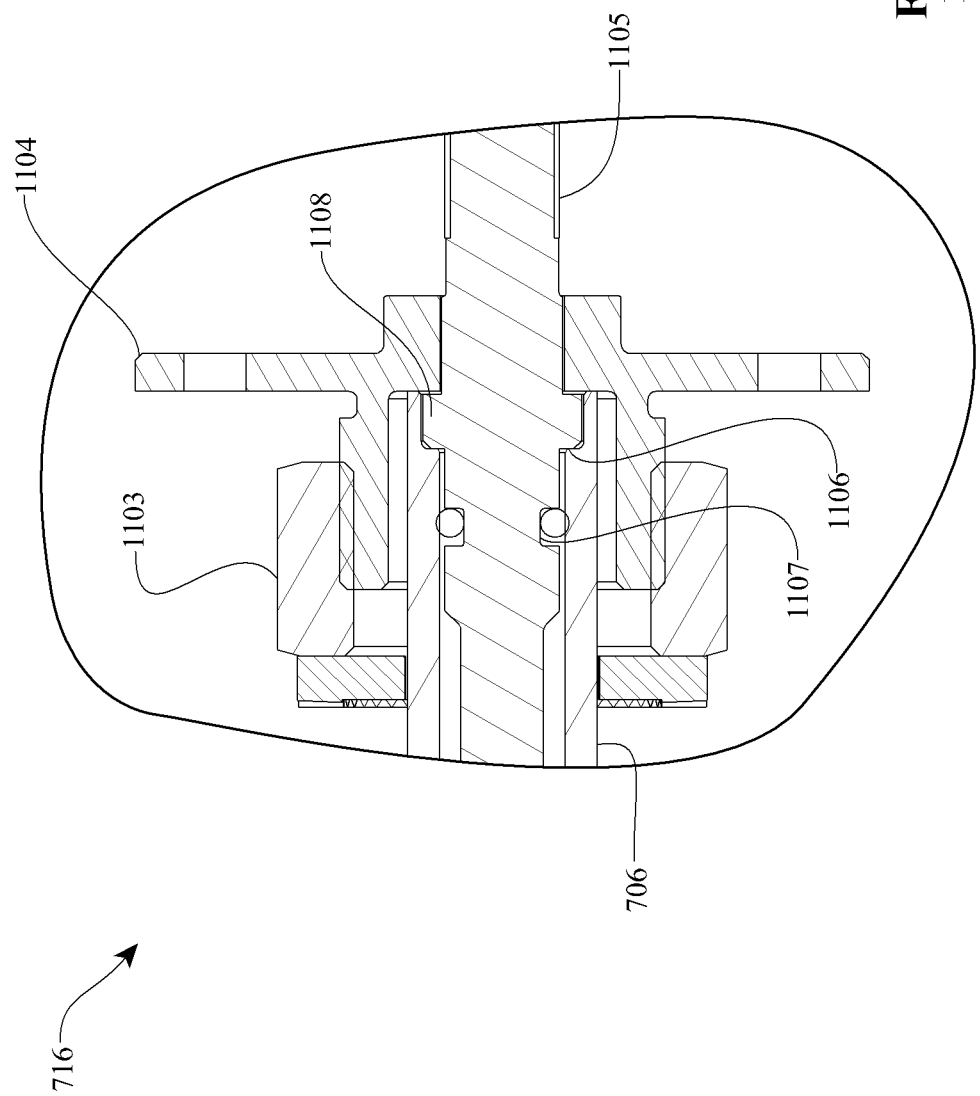
FIG. 11A is a detail view I, of the cross-section shown in FIG. 7, generally showing a shifter interface subassembly.

Referencing FIGS. 11A-11c, alternative embodiments of a shifter interface subassembly will be described now. In some embodiments, the shifting mechanism for CVT 700 includes a shift rod 1105 and the main axle 706 arranged concentrically, as depicted in FIG. 11A. The shift rod 1105 is retained by a shift rod retainer nut 1104 that is threaded onto the main axle 706. The shift rod 1105 is connected to a shifter mechanism (not shown) for changing the ratio of the CVT 700. In some embodiments, a rider interfaces with the shifter mechanism via a hand grip that controls cables which are operationally coupled to a shift pulley (not shown) and, thereby, to the shift rod 1105. The shift rod 1105 is operably coupled to the idler assembly 834. During operation, axial forces are generated on the idler assembly 834 due to forces at the traction contact formed between the traction power rollers 802 and the idler assembly 834. These axial forces are reacted at an interface between the shift rod 1105 and the main axle 706. In one embodiment, the interface includes a flange 1108 on the shift rod 1105 and a step 1106 on the main axle 706. In some embodiments, both the flange 1108 and the step 1106 are made of steel. The material hardness of the shift rod 1105 can be relatively soft (25-28 HRC) to accommodate the manufacturing processes to form other attributes on the shift rod 1105, such as acme threads, splines, and o-ring groove 1107. In some instances, the material softness can result in the flange 1108 having a poor surface finish. The idler forces reacting through the shift rod 1105 against the main axle 706 generate a friction force at the flange 1108. The friction force by be overcome by the rider through the shifter mechanism and the hand grip during a shift event.

Figure 11B:
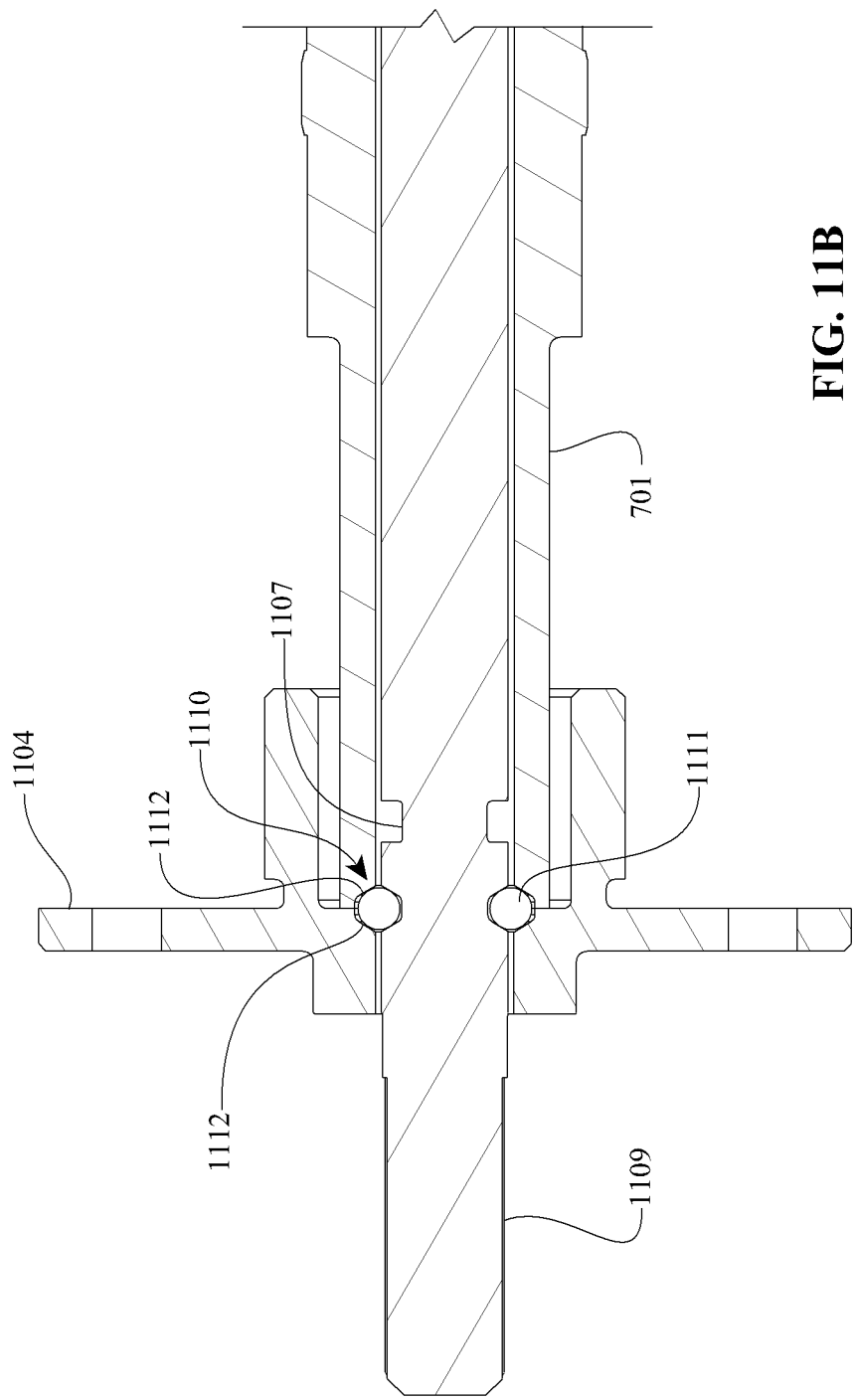
FIG. 11B is a cross-sectional view of certain components of an alternative shifter interface subassembly.

Passing to FIG. 11B now, an embodiment of an interface between a shift rod 1109 and a main shaft 701 includes a ball bearing 1110. Bearing races 1112 for bearing balls 1111 are formed into the shift retainer nut 1104, the main axle 706, and the shift rod 1105. In one embodiment, the races 1112 can be 30-degree flat faces and not fully conformal to the bearing balls 1111. In some embodiments, the bearing balls 1111 have a material hardness that is greater than a material hardness of the races 1112; consequently, the bearing balls 1111 can wear and form the softer races 1112 into a conformal race during operation. Alternatively, the races 1112 can be formed to be conformal to the bearing balls 1111 at the time of manufacture.

As shown in FIG. 11C, in one embodiment, a shift rod 1113 can be provided with a groove 1114 for receiving a clip 1116A to provide the reaction interface with a main shaft surface 1118 of the main axle 706. In some embodiments, the shift rod 1113 can be provided with an o-ring groove 1107 for receiving an o-ring 1115. The clip 1116A can be made from hardened steel wire and have, for example, a rectangular or circular cross section. In some embodiments, the clip 1116A can be constrained by the slot 1114. In this embodiment, the surface of the clip 1116A rotates during a shift event with respect to the main shaft face 1118 generating a friction force. In other embodiments, the clip 1116A can be constrained by the main axle 706 and the shift rod retainer nut 1104 so that the clip 1116A rotates in the shift rod slot 1114. In this embodiment the friction forces are generated between the faces of the slot 1114 and clip 1116A. It is generally preferable to reduce the friction forces, for example, through better surface finishes on the friction faces. Alternatively, the shift torque required can be reduced, for example, by reducing the radius where the friction forces are generated.

Figures 12C, 12D:
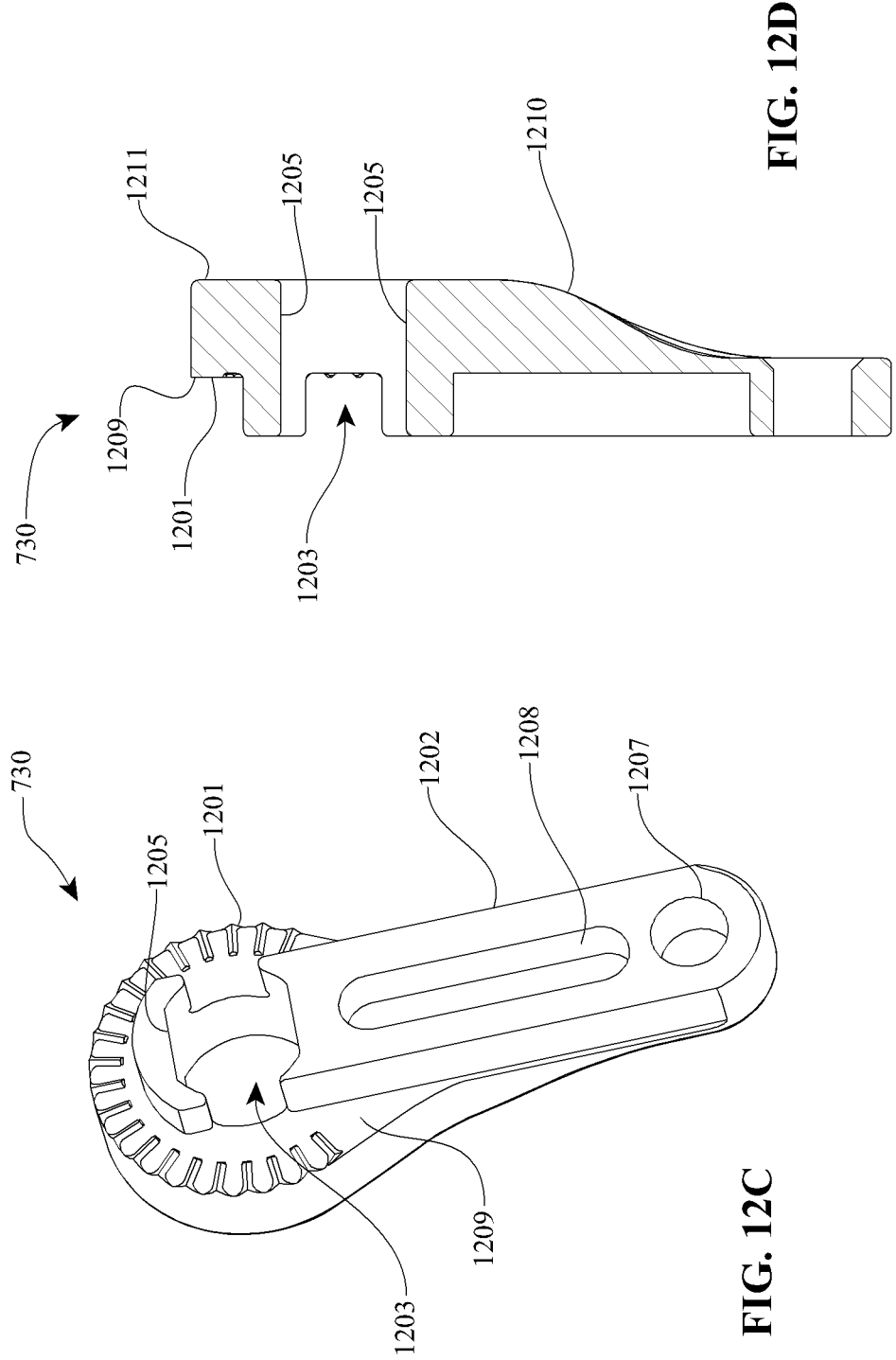
FIG. 12C is a perspective view of another anti-rotation washer that can be used with the variator of FIG. 7.
FIG. 12D is a cross-sectional view of the anti-rotation washer of FIG. 12C.

Turning to FIGS. 12A-12D now, alternative embodiments for anti-rotation washers are described. Shown in FIG. 12A and FIG. 12B is an embodiment of an anti-rotation washer 726 that can be used in, for example, bike frames having vertical or horizontal dropouts. In one embodiment, the anti-rotation washer 726 includes a cylindrical body having a front face 1200 and back face 1204, a central bore 1203 with parallel flats 1205, and a reaction shoulder 1202. The back face 1204 is preferably configured to cooperate with a jam nut similar to nut 1103 or other similar fastener. The front face 1200 has friction teeth 1201 located radially inward of an outer diameter of the cylindrical body and spaced angularly about an axis passing through the central bore 1203. In some instances, the friction teeth 1201 are preferably configured to engage surfaces of, for example, bike frame members. The reaction shoulder 1202 protrudes from the front face 1200. In one embodiment, the reaction shoulder 1202 has a plurality of faces in contact with the dropout of a bike frame and constrains the anti-rotation washer 726 from rotating with respect to the frame. A piloting surface 1212 can be provided to align the washer in the dropout of a bike frame, for example to equalize the two ends of the main axle 706 for horizontal alignment in vertical dropouts. The parallel flats 1205 are configured to mate to the main axle 706 and to prevent rotation of the main axle 706 with respect to the anti-rotation washer 726 and, consequently, the dropout of the bike frame.

An alternative anti-rotation washer 730 is shown in FIGS. 12C and 12D. The anti-rotation washer 730 has a front face 1209 and a back face 1211. The friction teeth 1201 are formed into a circumference of the front face 1209. The back face 1211 can have a profile 1210 in some cases. The through-hole 1207 can be used to support a bolt or fastener for coupling the anti-rotation washer 730 to, for example, a bike frame. A slot 1208 can be formed in the reaction arm 1202. The reaction arm 1202 protrudes from the front face 1209. The reaction arm 1202, in one embodiment, extends from the central bore to engage with the dropout of a bike frame. This engagement prevents rotation of the anti-rotation washer 730 with respect to the dropout. The parallel flats 1205 are preferably configured to mate to the main axle 706 and prevent rotation of the anti-rotation washer 730 with respect to the main axle 706 and, consequently, prevent rotation between the main axle 706 and bike frame dropout.

Figure 13A:
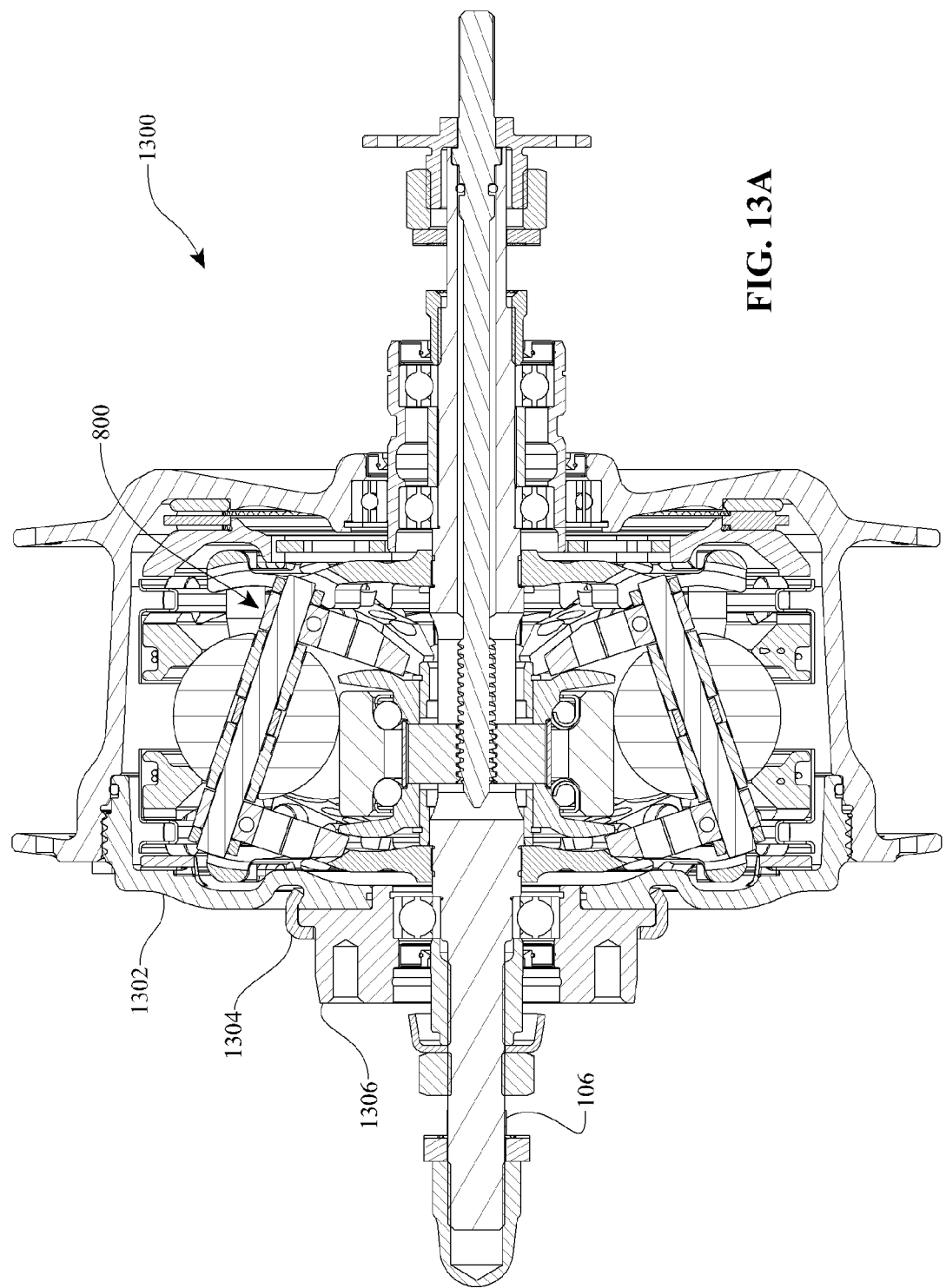
FIG. 13A is a cross-section of yet another embodiment of a continuously variable transmission (CVT).
Figure 13B:
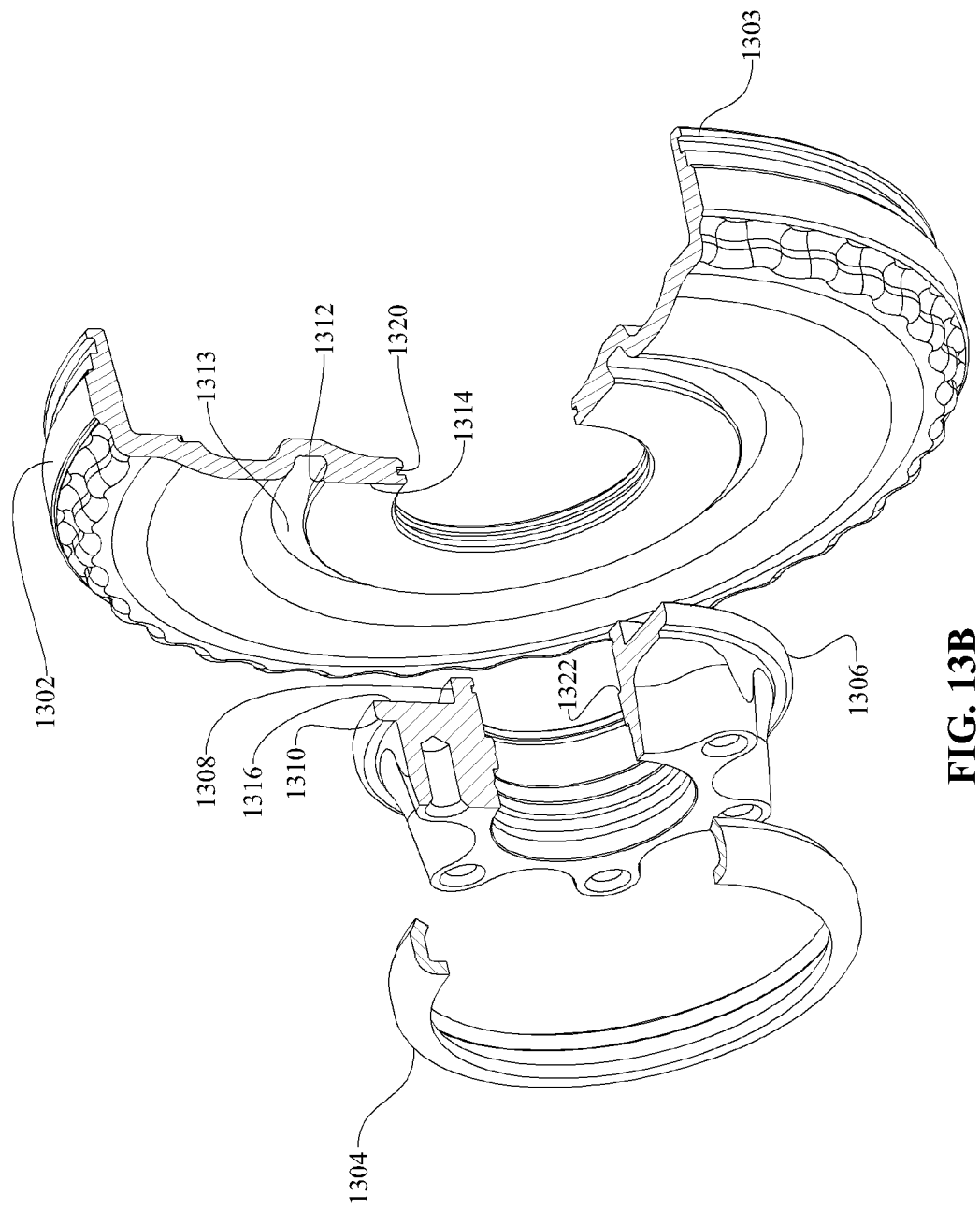
FIG. 13B is perspective, sectioned, exploded view of one embodiment of a cover and certain associated components that can be used with the variators described here.

Passing now to FIG. 13A, certain components of a CVT 1300 will be described now. In one embodiment, the CVT 1300 includes a cover 1302 having a threaded circumference 1303 configured to mate with the shell 702. A retaining ring 1304 is adapted to, among other things, secure or fasten a brake adapter 1306 to the cover 1302. In one embodiment, the cover 1302 has a substantially flat surface 1314 configured to mate to a substantially flat surface 1316 formed on the brake adapter 1306. The brake adapter 1306 can have a piloting surface 1308 that engages an internal diameter of the cover 1302 and be provided with a bearing shoulder 1322. In some embodiments, the retaining clip 1304 is a generally cylindrical ring with a retaining shoulder 1318 on the inner diameter. The retaining shoulder 1318 is preferably shaped to facilitate retaining the brake adapter 1306 against the cover 1302. In particular, in one embodiment, the inner diameter of the retaining clip 1304 is suitably formed into a shape that conforms to the combined profile of a shoulder 1310 on the brake adapter 1306 and an annular shoulder 1312 on the cover 1302 to, thereby, clamp or secure the brake adapter 1306 to the cover 1302. As shown in FIG. 13B, the annular shoulder 1312 can rise from an annular recess 1313 formed in the cover 1302. Since in some embodiments the cover 1302 and the brake adapter 1306 are provided as separate components, this facilitates the use of different materials for the cover 1302 and the brake adapter 1306. In some embodiments, an o-ring groove 1320 can also be formed in the cover 1302 to retain an o-ring (not shown) to provide a seal between the cover 1302 and the brake adapter 1306.

It should be noted that the description above has provided dimensions for certain components or subassemblies. The mentioned dimensions, or ranges of dimensions, are provided in order to comply as best as possible with certain legal requirements, such as best mode. However, the scope of the inventions described herein are to be determined solely by the language of the claims, and consequently, none of the mentioned dimensions is to be considered limiting on the inventive embodiments, except in so far as anyone claim makes a specified dimension, or range of thereof, a feature of the claim.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What we claim is:

1. A single-piece carrier for a continuously variable transmission (CVT), the single-piece carrier comprising:
    a generally cylindrical hollow body having a first end, a second end, and a side formed with a plurality of openings, the plurality of openings extending from an interior surface of the first end to an interior surface of the second end to form a plurality of carrier legs, wherein the plurality of carrier legs are configured to provide torsional strength to the carrier, wherein each opening of the plurality of openings is dimensioned to allow passage of a planet, and wherein the plurality of openings is asymmetrically arranged so that an idler assembly of the CVT can pass through at least one opening of the plurality of openings;
    a first plurality of radial grooves formed on the first end interior surface, wherein the first plurality of radial grooves are accessible through the plurality of openings, and wherein each radial groove of the first plurality of radial grooves is formed for contact with a first end of a planet axle; and
    a second plurality of radial grooves formed on the second end interior surface, wherein the second plurality of radial grooves are accessible through the plurality of openings, and wherein each radial groove of the second plurality of radial grooves is formed for contact with a second end of the planet axle.

2. The single-piece carrier of claim 1, wherein the first and second plurality of radial grooves comprise a substantially toriconical profile.

3. The single-piece carrier of claim 1, wherein the first and second plurality of radial grooves comprise a substantially hemi-cylindrical profile.

4. The single-piece carrier of claim 1, wherein the side of the generally cylindrical hollow body comprises a continuous arcuate side.

5. The single-piece carrier of claim 1, wherein the at least one opening through which the idler assembly can pass is larger than at least one other opening of the plurality of openings.

6. The single-piece carrier of claim 1, wherein at least one groove of the first plurality of grooves is accessible through each opening of the plurality of openings, and wherein more than one groove of the first plurality of grooves is accessible through at least one opening of the plurality of openings.

7. A system comprising:
a single-piece carrier for a continuously variable transmission (CVT), the single-piece carrier comprising
a generally cylindrical hollow body having a first end, a second end, and a side,
a plurality of openings formed in the side of the cylindrical hollow body and extending from an interior surface of the first end to an interior surface of the second end to form a plurality of carrier legs, wherein the carrier legs are configured to provide torsional strength to the carrier, wherein each opening of the plurality of openings is dimensioned to allow a planet to pass through the opening, and wherein the plurality of openings is asymmetrically arranged so that an idler assembly of the CVT can pass through at least one opening of the plurality of openings,
a first plurality of radial grooves formed on the first end interior surface, wherein the first plurality of radial grooves are accessible through the plurality of openings, and wherein each radial groove of the first plurality of radial grooves is formed for contact with a first end of a planet axle, and
a second plurality of radial grooves formed on the second end interior surface, wherein the second plurality of radial grooves are accessible through the plurality of openings, and wherein each radial groove of the second plurality of radial grooves is formed for contact with a second end of the planet axle.

8. The system of claim 7, wherein the first and second plurality of radial grooves comprise a substantially toriconical profile.

9. The system of claim 7, wherein the first and second plurality of radial grooves comprise a substantially hemicylindrical profile.

10. The system of claim 7, further comprising a first support axle coupled to the first end of the carrier, the first support axle extending axially from a first exterior surface of the carrier.

11. The system of claim 7, further comprising a second support axle coupled to the second end of the carrier, the second support axle extending axially from a second exterior surface of the carrier.

12. The system of claim 7, further comprising a power input assembly.

13. A method of forming a single-piece carrier, comprising:
forming a generally cylindrical hollow body having a first end, a second end, and a continuous arcuate side;
forming a plurality of openings in the side of the cylindrical hollow body, the plurality of openings extending from an interior surface of the first end to an interior surface of the second end to form a plurality of carrier legs, wherein the carrier legs are configured to provide torsional strength to the carrier, wherein each opening of the plurality of openings is dimensioned to allow a planet to pass through the opening, and wherein the plurality of openings is asymmetrically arranged so that an idler assembly of the CVT can pass through at least one opening of the plurality of openings;
forming a first plurality of grooves on the first end interior surface, wherein the first plurality of grooves are accessible through the plurality of openings, and wherein each radial groove of the first plurality of radial grooves is formed for contact with a first end of a planet axle; and
forming a second plurality of grooves on the second end interior surface, wherein the second plurality of grooves are accessible through the plurality of openings, and wherein each radial groove of the second plurality of radial grooves is formed for contact with a second end of the planet axle.

14. The method of claim 13, wherein the first plurality of grooves and the second plurality of grooves are formed for coupling to an axle for a power adjuster, and wherein each opening of the plurality of openings is formed to allow passage of the power adjuster.

* * * * *